US008295951B2

(12) United States Patent
Crisalle et al.

(10) Patent No.: US 8,295,951 B2
(45) Date of Patent: Oct. 23, 2012

(54) SYSTEMS AND METHODS FOR OFFSET-FREE MODEL PREDICTIVE CONTROL

(75) Inventors: Oscar D. Crisalle, Gainesville, FL (US); Ricardo Gomez Gonzalez, Monterrey (MX); Christopher S. Peek, Midlothian, VA (US)

(73) Assignee: The University of Florida Research Foundation, Inc., Gainesville, FL (US)

( * ) Notice: Subject to any disclaimer, the term of this patent is extended or adjusted under 35 U.S.C. 154(b) by 273 days.

(21) Appl. No.: 12/740,849

(22) PCT Filed: Dec. 20, 2008

(86) PCT No.: PCT/US2008/087864
§ 371 (c)(1),
(2), (4) Date: Jun. 24, 2010

(87) PCT Pub. No.: WO2009/086220
PCT Pub. Date: Jul. 9, 2009

(65) Prior Publication Data
US 2010/0268353 A1 Oct. 21, 2010

Related U.S. Application Data

(60) Provisional application No. 61/016,116, filed on Dec. 21, 2007, provisional application No. 61/043,994, filed on Apr. 10, 2008.

(51) Int. Cl.
*G06F 19/00* (2006.01)
(52) U.S. Cl. .......................................... 700/29; 700/42
(58) Field of Classification Search .................... 700/29, 700/31, 34, 41–42
See application file for complete search history.

(56) References Cited

U.S. PATENT DOCUMENTS

| 4,197,576 A | 4/1980 | Martin Sanchez |
| 5,519,605 A | 5/1996 | Cawlfield |
| 5,740,033 A | 4/1998 | Wassick et al. |

(Continued)

FOREIGN PATENT DOCUMENTS

JP 2006-268566 10/2006

(Continued)

OTHER PUBLICATIONS

International Search Report and Written Opinion dated Apr. 9, 2009.

(Continued)

*Primary Examiner* — Kidest Bahta
(74) *Attorney, Agent, or Firm* — Thomas, Kayden, Horstemeyer & Risley, LLP

(57) ABSTRACT

Techniques, systems and methods for designing, implementing, and operating model predictive controllers that can deliver perfect tracking of set points and that can reject the effect of disturbances when steady-state operation is reached are disclosed. High performance is achieved through the incorporation of set-point tracking costs, integral costs, and velocity costs, as well as the adoption of incremental model systems for prediction purposes. Embodiments can deliver offset-free performance for tracking set points with constant final values, set points of a ramp type, and set points of a parabolic form, while rejecting disturbances that have a constant final value. The approach reduces the complexity of model predictive control design, delivers improved performance, and requires modest computational power. An Incremental Model State Estimator (IMES) is disclosed that reduces the computation load required for producing estimated values for the unmeasured star vector of a model under the presence of unmeasured disturbances.

25 Claims, 14 Drawing Sheets

U.S. PATENT DOCUMENTS

| | | | |
|---|---|---|---|
| 6,715,690 | B2 | 4/2004 | Hull et al. |
| 7,197,485 | B2 | 3/2007 | Fuller |
| 7,203,555 | B2 | 4/2007 | Ogunnaike et al. |
| 7,216,497 | B2 | 5/2007 | Hull et al. |
| 7,292,899 | B2 | 11/2007 | Dadebo et al. |
| 7,400,933 | B2 * | 7/2008 | Rawlings et al. ............... 700/28 |
| 7,444,193 | B2 * | 10/2008 | Cutler ............................ 700/83 |
| 7,599,751 | B2 * | 10/2009 | Cutler ............................ 700/38 |
| 2006/0287741 | A1 * | 12/2006 | Cutler ............................ 700/83 |
| 2007/0090199 | A1 | 4/2007 | Hull et al. |

FOREIGN PATENT DOCUMENTS

| | | |
|---|---|---|
| WO | 2002-052365 A2 | 7/2002 |

OTHER PUBLICATIONS

International Search Report and Written Opinion in related co-pending PCT Application No. PCT/US2008-087864, issued Apr. 9, 2009.

Nunes, Giovani, et al., "Stability Analysis of Multivariable Predictive Control—A Polynomial Approach"; Proceedings of the American Control Conference, Jun. 25-27, 2001.

Clarke, D.W., and Tuffs, P.S., "Generalized predictive control—Part I. The basic algorithm"; Automatica, Feb. 11, 2003, vol. 23, Issue 2, pp. 137-148.

Clarke, D.W., et al., "Generalized Predictive Control—Part II Extensions and interpretations"; Automatica, Feb. 11, 2003, vol. 23, Issue 2, pp. 149-160.

Demirciolua, H. And Gawthropb, P.J., "Multivariable continuous-time generalized predictive control (MCGPC)"; Automatica; Feb. 2003, vol. 28, Issue 4, pp. 697-713.

Clarke, D.W. and Mohtadia, C., "Properties of generalized predictive control"; Automatica; Feb. 10, 2003, vol. 25, Issue 6, pp. 859-875.

De Schutter, B and van den Boom, TJJ ; "Model predictive control for max-min-plus-scaling systems"; American Control Conference, 2001; Feb. 10, 2003, vol. 25, Issue 6, pp. 859-875.

Dong, Jia and Krogh, BH ; "Distributed model predictive control"; American Control Conference, 2001; Jun. 25-27, 2001, vol. 4, pp. 2767-2772.

van der Lee, JH, Olsen, DG, Young, BR and Svrcek, WY; "A case study using an integrated, real-time computing environment for advanced process control development"; American Control Conference, 2001 , Jun. 25-27, 2001, vol. 2, pp. 1173-1177.

Xiaoning Du, Yugeng Xi and Shayuan Li; "Distributed model predictive control for large-scale systems"; American Control Conference, 2001 ; Jun. 25-27, 2001, vol. 4, pp. 3142-3143.

Zhou, Jian-Suo, Liu, Zhi-Yuan and Pei, Run; "A new nonlinear model predictive control scheme for discrete-time system based on sliding mode control"; American Control Conference, 2001; Jun. 25-27, 2001, vol. 4, pp. 3079-3084.

Muske, Kenneth. R. and Thomas a. Badgwell, "Disturbance Modeling for Offset-Free Linear Model Predictive Control", Journal of Process Control vol. 12, pp. 617-632, 2002.

Pannocchia, Gabriele and James B. Rawlings, "Disturbance Models for Offset-Free Model-Predictive Control", AlChE Journal, vol. 49, No. 2, pp. 426-437, 2003.

Peek, Christopher S., High Performance Control Theory, Design, and Applications, Thesis presented to the Graduate School of the Univ. of FL in Partial Fulfillment of Requirements for Degree of Doctor of Philosophy, May 2008.

Gomez-Gonzalez, Ricardo; "Design and Analysis of Offset Free Model Based Predictive Control", a Dissertation presented to the Graduate School of the University of Florida in Partial Fulfillment of the Requirements for the Degree of Doctor of Philosophy, Jun. 2007.

* cited by examiner

SYSTEMS AND METHODS FOR OFFSET-FREE MODEL PREDICTIVE CONTROL

RELATED APPLICATIONS

This application is the 35 U.S.C. §371 national stage of PCT application entitled "Systems and Methods for Offset-Free Model Predictive Control," having serial number PCT/US2008/087864, filed on Dec. 20, 2008, which claims priority to and the benefit of U.S. Provisional Application No. 61/016,116, filed Dec. 21, 2007 and entitled "Systems and Methods for Offset-Free Model Predictive Control", and U.S. Provisional Application No. 61/043,994, filed Apr. 10, 2008 and entitled "Systems and Methods for Offset-Free Model Predictive Control", both of which are incorporated herein by reference in their entirety.

FIELD OF THE INVENTION

Embodiments of the present invention relate generally to automatic controllers, including the class of model predictive controllers, and in particular to a model predictive controller that can provide offset free tracking of set points even under the presence of unmeasured disturbances.

BACKGROUND

Model predictive controllers (MPC) are in widespread use in industry to adjust manipulated variables (also known as inputs) with the goal of ensuring good performance of a set of controlled variables (also known as outputs). For example, U.S. Patent Publication No. 2005/50209714, to Rawlings et al. describes a single-input/single-output model predictive controller. The class of systems where MPC can be used to advantage is very large, and it includes chemical reactors, distillation columns, hydrocarbon crackers, entire refineries, as well as cement mills and kilns, robots, automobiles, aircraft, trains, amphibious vehicles, autonomous vehicles, gas turbines, and jet engines, among others. Additional systems of interest for which MPC can deliver appropriate automatic manipulations to ensure suitable functional performance include biological environments, encompassing, for example, bioreactors designed to produce insulin, and human organs such as the pancreas and its insulin and glucagons production processes, among many others. The systems of interest also include abstract human constructs that involve inputs and outputs that change with time, such as the stock market, financial models, manufacturing production models, scheduling networks for production and transportation, for example. These systems of interest are often referred to as the plant.

The popularity of MPC controllers stems from their ability to deliver good performance when deployed on complex systems featuring large numbers of inputs and outputs. Furthermore, the MPC controllers can satisfy constraints imposed by the user, such as ensuring that input values do not deviate from a range specified by maximum and minimum bounds. The MPC technology has established itself as the primary means of controlling industrial systems with multiple inputs and multiple outputs.

In spite of its high-value capabilities, it is well known that special measures must be taken to ensure that the MPC design makes the outputs achieve their specified set-point values at steady state without appreciable error. The error observed after all transient responses settle into approximately constant patterns, known as steady-state offset, is often magnified by the presence of disturbances affecting the plant.

A comprehensive discussion of design measures proposed for obtaining offset-free MPC performance at steady state is given in Muske, Kenneth. R. and Thomas A. Badgwell, "Disturbance Modeling for Offset-Free Linear Model Predictive Control", *Journal of Process Control* Vol. 12, pp. 617-632, 2002, and in Pannocchia, Gabriele and James B. Rawlings, "Disturbance Models for Offset-Free Model-Predictive Control", *AIChE Journal*, Vol. 49, No. 2, pp. 426-437, 2003.

The design measures advocated in the references mentioned in the preceding paragraph are challenging to deploy in a systematic fashion because they require including in the model used for designing the MPC Controller a dynamic representation of the disturbances that is often inconsistent with the structural form of the actual disturbances that affect the plant. Hence, the proposed disturbance representations are fictitious models adopted because, in cases of interest, they may bring about the beneficial consequence of eliminating steady-state offset. Unfortunately, different fictitious representations can cause different performance qualities during the transient period that precedes the onset of steady state. Furthermore, there are no systematic guidelines on how to specify an optimal disturbance structure. These approaches are therefore not of practical utility because the lack of systematic procedures in the control design process calls for significant investments of engineering effort to discriminate among many possible representations of disturbance dynamics.

In addition, some conventional techniques involve the inclusion of additional design variables, known as state and input targets, which are involved in the solution of a supplementary numerical optimization operation that often must be solved on line at every instant that the controller needs to make an adjustment. This optimization step increases the numerical cost of deploying the MPC algorithm, and introduces additional design complications because special cost matrices must be specified without the benefit of clear methodologies. Furthermore, no systematic guidelines are given to assist in the specification of effective values for the input target variable, an impediment to ensuring adequate transient performance without investing a significant amount of added engineering effort. It is often observed that the behavior of the model predictive controllers designed according to the suggestions given in the literature cited above behave in an unintuitive fashion, and thus the methodology lacks the robustness desirable in a mission-critical or high-performance control system. Performance degradation in the form of unacceptable steady-state offsets can also be observed when the operating conditions of the Plant change, which typically calls for a significant investment in additional engineering resources to redesign the MPC structure to effectively address needs of new environmental conditions.

Embodiments include a model predictive control design and deployment architecture described herein was conceived to address the shortcomings of conventional MPC systems and methods identified above. The model predictive control architecture described herein can deliver offset-free performance, and can be deployed in a systematic fashion. Furthermore, the numerical computational burden required by the technology can be significantly lower that of alternative conventional approaches documented in the literature. The MPC control scheme disclosed herein can be used to track, with little or no error, set points of a step, ramp, or parabolic type, and can reject measured or unmeasured state and output disturbances.

SUMMARY

Embodiments include a Model Predictive Controls (MPC) architecture that can be realized in the form of four base-case technological embodiments for designing controllers that deliver responses that are free from steady-state offset errors. Embodiments can be effective for eliminating offset, and hence ensure perfect set-point tracking at steady state, even when the plant being manipulated by the MPC Controller is subject to the presence of unmeasured state disturbances and/or output disturbances that adopt constant values at steady state.

MPC techniques for use in the unifying control architecture disclosed herein can reduce or eliminate a need for including in the typical MPC performance-index a number of computationally expensive and unintuitive concepts of steady-state targets that are characteristic of conventional MPC practice. In contrast, embodiments described herein can use an MPC Performance Index that includes an inexpensive and highly intuitive set-point error tracking cost. In particular, MPC Technique I can eliminate offset through the incorporation of integral states that are easily computed, MPC Technique II can eliminate offset by the adoption of input-velocity cost terms in the MPC Performance Index, and MPC Technique III can eliminate offset by a combination of the strategies that define MPC Technique I and MPC Technique II. Finally, MPC Technique IV can eliminate offset in the pursuit of set points of a ramp or parabolic type. An embodiment of MPC Technique III can also be utilized to eliminate offset with respect to ramp set-points.

Also disclosed herein is an Incremental MPC Estimation System (hereafter referred to as IMES) that can be used with great effectiveness to reduce the number of computations required to estimate unmeasured states. The IMES scheme is particularly useful in the context of MPC industrial practice where it is desirable to reject the effect of asymptotically constant disturbances that act on the states and outputs of the plant to be manipulated by the MPC controller.

DETAILED DESCRIPTION

Reference is now made in detail to the exemplary embodiments of the disclosure, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments that may be practiced. These illustrated embodiments, as well as the explanation of embodiments given in this section, are described in sufficient detail to enable those skilled in the art to practice the embodiments, and it is to be understood that other embodiments can be utilized, and that changes can be made without departing from the scope of the invention. The following description is, therefore, merely exemplary.

Notwithstanding that some numerical ranges and parameters setting forth broad concepts are approximations, the numerical values set forth in the specific examples are reported as precisely as possible. Any numerical value, however, inherently contains certain errors necessarily resulting from the standard deviation found in their respective testing measurements, or resulting from numerical approximations associated with computer calculations. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. It will also be appreciated by one of skill in the art that the equations presented herein are for purposes of illustrating exemplary embodiments and may contain minor clerical or derivation errors, and one of skill in the art would recognize such minor errors and be able to infer the meaning and correct form of the equation. Also, the graphs showing performance of the techniques of the various embodiments are for illustration purposes and may be based on an implementation that may differ from those described and may also include values such as weight or costs that may differ from those described, but which within the spirit and scope of the present invention. The examples of performance and the various embodiments described herein are not intended to be limiting, but rather provide by way of examples for illustrating various aspects of the embodiments. Also, it will be understood that there may be many algebraically equivalent forms of the expressions or equations described herein, and any equivalent form may used that produces the same value as an equation described herein when evaluated numerically.

Figure 1:
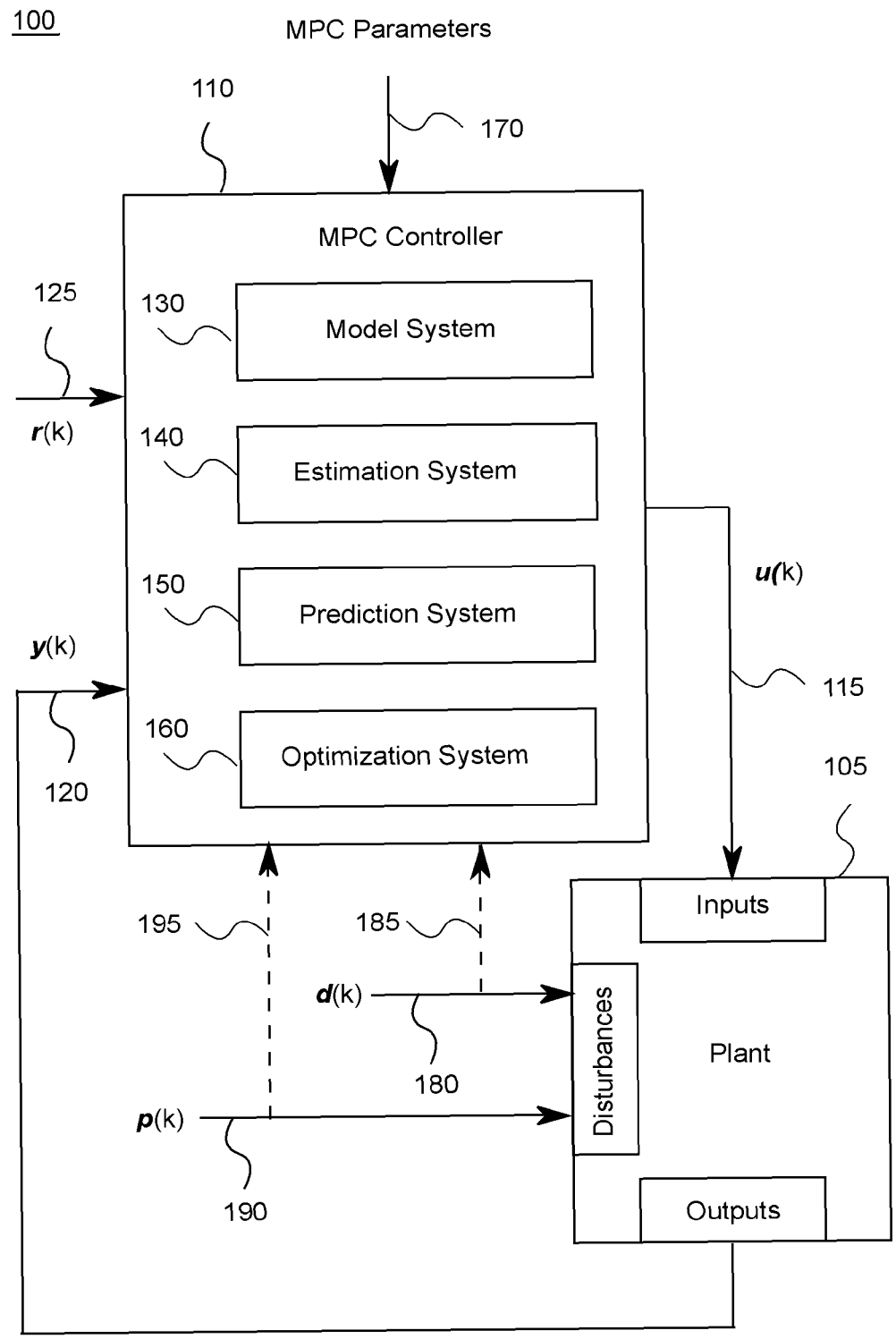
FIG. 1 is a block diagram representing an exemplary MPC controller architecture and its implementation on a plant according to the embodiments.

FIG. 1 is a block diagram illustrating a plant and MPC Controller system 100 with a Model Predictive Controller (herein denoted as MPC) according to embodiments. It should be readily apparent to those of ordinary skill in the art that system 100 depicted in FIG. 1 represents an exemplary schematic illustration and that other components can be added, or that existing components can be removed or modified.

As illustrated in FIG. 1, system 100 includes a Plant 105 and an MPC Controller 110. Plant 105 is a process or device to be controlled utilizing predictive control technology. For example, Plant 105 can be a physical apparatus or collection of physical devices, such as a chemical processing factory, a robotic mechanism, an automated vehicle; and can also be an abstract apparatus such as a production-planning system or a financial market.

Furthermore, Plant 105 can be a simulation of a physical plant. As such, it should be readily apparent to those skilled in the art that functions of Plant 105 can be implemented as software applications (programmed in C, C++, JAVA, LabVIEW, PHP, MATLAB, Simulink, Mathematica, Fortran, Neural Networks, etc.), hardware components (EEPROM, application specific integrated circuits, microprocessors, distributed-control systems hardware and software, FIELDBUS devices, etc.) or combinations thereof. Plant 105 can be simulated using software tools, including specialized software products written for the specific Plant 105 of interest, or commercially available products such as Hysys, Aspen Plus, Aspen Dynamics™, Hysim, Chemcad, PRO/II, PROSIM, and ProSimPlus, among others.

Plant 105 takes one or more inputs, indicated by the vector u(k), 115 and produces one or more outputs, indicated by the current output vector y(k), 120. Inputs 115 represent the current values of variables that manipulate Plant 105, and outputs 120 represent the current values of variables produced by Plant 105 and obtained from measurement devices, from known information, or from estimation techniques that can involve mathematical models. The inputs 115 and the outputs 120 are also respectively called manipulated variables and controlled variables. Plant 105 can be affected by the presence of state disturbances indicated by the vector d(k), 180, and by output disturbances indicated by the vector p(k), 190. These disturbances can be exogenous to the plant, as indicated in FIG. 1, or can be internal to the plant as in the case where they represent neglected dynamics. Furthermore, in other embodiments at least one of the elements of the state-disturbance vector or of the output-disturbance vector can be obtained from measurement devices, known information, or estimation techniques that can involve mathematical models, and made available to the MPC Controller 110 as indicated by the dashed-line paths 185 and 195 of FIG. 1.

Examples of output values obtained from measurement devices (often referred to as sensors) include: temperature values produced by thermocouples, thermistors, and pyromenters; pressure values produced by differential pressure gauges, sealed pressure sensors, and piezoelectric pressure sensors; chemical composition values produced by gas-liquid chromatographs, light-absorption spectroscopy, titration systems, and nuclear-magnetic-resonance sensors; velocity values produced by speedometers; acceleration values produced by accelerometers, and position values produced by rulers, and by laser interferometers. Examples of output values obtained from known information include the percentage of opening of a valve that is implemented at a given time and for a given duration by an automatic scheduling apparatus, and the value of weight of a load of an elevator that is charged with materials at a known time and for a known duration. Examples of output values obtained from mathematical models a temperature value that is determined from a table that relates temperature to the time the number of hours that an apparatus has been in operation, and the value of the viscosity of a polymer melt that is obtained from a mathematical expression that relates viscosity to the measured temperature and the measured chemical composition of the melt. It is possible to consider sensors as part of Plant 105 of FIG. 1, even though some sensors can reside in physical locations different from the location of the plant hardware, such as in a remote site connected to the plant via a wireless digital-data network, for example.

Examples of input values and the devices (often referred to as actuators) used to implement those inputs in the plant include: the value of a digital signal sent to an electrical motor that implements the signal by adjusting its rotational speed, the value of an electrical-current signal sent to motor that implements the signal by adjusting the opening of a valve that regulates the flow of gasoline to the cylinders of an internal combustion engine, the value of an electrical-voltage signal sent to a heater that implements the signal by adjusting the resistance of a variable-resistance element for the purpose of generating a heat flow that pasteurizes milk, among others. The conversion of numerical input values produced by the MPC Controller 110 to signals that can be used by actuators is accomplished via transducers (such as digital-to-analog transducers and electropneumatic transducers, for example). It is possible to consider actuators and transducers as part of Plant 105 of FIG. 1, even though some actuators can reside in physical locations different from the location of the plant hardware.

The current output vector y(k), 120, and a value of the current set-point vector, r(k), 125, are fed to MPC Controller 110. In other embodiments the set-point signal 125 can contain past, current, and future, values of the set point. At specific sampling instants associated with a time-index k, MPC Controller 110 determines the input u(k), 115, into Plant 105 by making use of a Model System 130 for Plant 105, an Estimation System 140, a Prediction System 150, and an Optimization System 160. In other embodiments, at sampling instant k MPC Controller 110 can also determine future inputs u(k+1), u(k+2), and so on, and then implement those calculated inputs values at future instants k+1, k+2, and so on.

It should be readily apparent to those skilled in the art that functions of MPC Controller 110 (input-output, calculations, estimation, prediction, optimization, and the like) including all functions in Model System 130, Prediction System 150, and Optimization System 160, can be implemented as software applications (programmed in C, C++, JAVA, LabVIEW, MATLAB, Simulink, PHP, Neural Networks, etc.), hardware components (EEPROM, application specific integrated circuit, microprocessor, distributed-control systems hardware and software, FIELDBUS devices, etc.) or combinations thereof, including commercially available products such as Hysys, Aspen Plus, Aspen Dynamics™, Hysim, Chemcad, PRO/II, PROSIM, and ProSimPlus, among others.

The MPC Techniques I, II, III, and IV can be used to improve the set-point tracking performance of commercially available MPC controllers, including for example Dimples, Profit Control, INCA, Connoisseur, RMPCT, SMCA, IDCOM, PFC, PCT, Process Perfecto, APCS, and 3dMPC, among other commercial products that will be known to one of skill in the art.

DEFINITIONS a) Offset

A typical control performance specification is that the input prescribed by MPC Controller 110 must produce a sequence of output values {y(0), y(1), y(2), . . . } that are element-by-element close to a specified sequence of values of the set-point vectors indicated as {r(0), r(1), r(2), . . . }.

The steady-state offset, herein referred to as offset and denoted by the symbol $e_{ss}$, is defined as the value adopted by the feedback-error vector $$e(k)=r(k)-y(k) \quad (0\text{-}1)$$

after the elapsing of a sufficiently long time to allow all transient changes in the output to disappear and allow the output to adopt a well-defined pattern such as a constant, a ramp, or a parabolic trajectory, for example. Mathematically, the offset is represented as a limit, namely $e_{ss}$=lim e(k) as k tends to infinity, whereas in practice the concept of an infinitely long time index is replaced by a sufficiently long but finite time index k. The offset is therefore a measure of how much the output differs from the specified values of the set-point after a relatively long period of operation. The MPC control design architecture and its techniques disclosed here ensures that the resulting controllers attain zero offset, hence forcing the output to match the set point at steady state even under conditions where there is a change in the set point or where Plant 105 is subject to the presence of disturbances that are not measured. Thus, the desirable feature delivered by the MPC designs disclosed here is the attainment of the condition $$e_{ss}=0 \quad (0\text{-}2)$$

b) Model System

The Model System 130 of MPC Controller 110 can be a mathematical object that describes the operation of Plant 105. The Model System can comprise equations, look-up tables, look-up figures and other mathematical entities that establish relationships between the outputs, inputs, states, state-disturbances, and output-disturbances, of the Plant 105, and can include a number of other variables classified as model parameters that can include physical characteristics of the plant (such weight, mass, inertia, specific heat, viscosity, etc.). The most common mathematical model used to describe the Plant is comprised of the Disturbance-Free Standard State Equation $$x(k+1)=Ax(k)+Bu(k) \quad (0\text{-}3)$$

and the Disturbance-Free Standard Output Equation $$y(k)=Cx(k) \quad (0\text{-}4)$$

where equation (0-3) is typically referred to as the standard state-equation, and equation (0-4) as the standard output-equation, and where the system matrices A, B, and C, which can be constant or can change value as a function of time, are known as the Linear Model Parameters. The time index k denotes the current sampling instant; therefore, x(k) refers to the current state value, x(k+1) to the value of the state in the next sampling instant, and so on. We refer to the relationships (0-3) and (0-4) as a Model System. The dimensions of the system matrices are determined to correctly represent the number of inputs, outputs, and states in the plant. The Model System defined by equations (0-3)-(0-4) is able to represent single-input/single-output (also denoted as SISO) or multiple-input/multiple-output (MIMO) plants.

The Model System given in equations (0-3)-(0-4) can be modified to include the presence of disturbances in Plant 105. For example, the dynamics of the Plant 105 can be represented by the Model System 130 via the Standard State Equation $$x(k+1)=Ax(k)+Bu(k)+d(k) \quad (0\text{-}5)$$

and the Standard Output Equation $$y(k)=Cx(k)+p(k) \quad (0\text{-}6)$$

where d(k) is the current state-disturbance vector and p(k) is the current output-disturbance vector. In one embodiment, the state and output disturbances are respectively represented in an exemplary fashion by the exogenous (i.e., external) effects 180 and 190 shown in FIG. 1.

The disturbance equations given in expressions (0-5)-(0-6) are presented as an illustrative example of the types of disturbance representations that can be used to describe Plant 105. One of ordinary skill in the art can define other disturbances types to incorporate into the Model System, including for example the case where $$d(k)=B_d d_1(k) \quad (0\text{-}7)$$

and $$p(k)=C_p p_1(k) \quad (0\text{-}8)$$

where $B_d$ and $C_p$ are known matrices, $d_1(k)$ is an alternative state disturbance and $p_1(k)$ is an alternative output disturbance. The state and output disturbances can be measured, unmeasured, or can be a combination of measured and unmeasured variables.

Other forms of Model System 130 that will be obvious to one of skill in the art include neural networks, nonlinear relationships, as well as numerical, hybrid, transfer-function, convolution, step-response, impulse-response, Laguerre or Volterra models, and models based on commercially available software/hardware products of which Aspen Plus and PRO/II are two representative examples. The Model System 130 comprised of equations (0-5)-(0 -6) is a particular instance of the Nonlinear Standard State Equation $$x(k+1)=f_{nl}(x(k), u(k), d(k), k) \quad (0\text{-}8b)$$

and the Nonlinear Standard Output Equation $$y(k)=g_{nl}(x(k), u(k), p(k), k) \quad (0\text{-}8c)$$

where $f_{nl}$ and $g_{nl}$ represent nonlinear relationships in the form of equations, integrals, computer models, neural-network models, fuzzy-logic models, cybernetic models, etc.

The MPC controller 110 engages in a model-generation operation when the necessary elements needed to define a Model System 130 are specified. For example, the specification of the values of matrices A, B, and C for the Model System defined in (0-3) and (0-4) is a model generation operation. This can be accomplished by reading values for the matrix elements from a storage device, such as a hard disk or computer memory; using numerical estimation techniques that use current and prior input, output, and state data to produce a set of fit-parameters to describe the equations describing the Model System 130; or carrying out an on-line linearization operation that involves appropriate manipulations on nonlinear relationships representations of the Plant 105; or utilizing other techniques available for generating appropriate matrix values for linear models that are well known to one of skill in the art.

c) MPC Vectors

The following nomenclature is defined and adopted hereafter regarding vectors associated with MPC Controller 110: current set-point vector r (k), current output vector y(k), current state vector x(k), current first-integral-state vector z(k), current second-integral-state vector w(k), current third-integral-state vector v(k), and current state-disturbance vector d(k). The vectors y(k−1), x(k−1), u(k−1), d(k−1), and p(k−1) are respectively defined as the one-step-behind output vector, one-step-behind state vector, one-step-behind input vector, one-step-behind state-disturbance vector, and one-step-behind output-disturbance vector. In addition, the following definitions for vector-increments are adopted: current output-increment vector $\Delta y(k)$ which is in turn defined as the difference y(k)−y(k−1), current state-increment vector $\Delta x(k)$ which is in turn defined as the difference x(k)−x(k−1), current state-disturbance-increment vector $\Delta d(k)$ which in turn is defined as the difference d(k)−d(k−1), current output-disturbance vector p(k), current output-disturbance-increment vector $\Delta p(k)$ which in turn is defined as the difference p(k)−p(k−1), current input vector u(k), and current input-increment vector $\Delta u(k)$ which in turn is defined as the difference u(k)−u(k−1). The number of elements in the current state vector x(k) is defined as n, and the number of elements in the current input vector u(k) is defined as p.

For convenience of exposition we adopt the following vector notation:

$$r = \begin{bmatrix} r(k+1) \\ r(k+2) \\ \vdots \\ r(k+N_p) \end{bmatrix} \quad (0\text{-}9)$$

$$\hat{y} = \begin{bmatrix} \hat{y}(k+1) \\ \hat{y}(k+2) \\ \vdots \\ \hat{y}(k+N_p) \end{bmatrix}, \hat{x} = \begin{bmatrix} \hat{x}(k+1) \\ \hat{x}(k+2) \\ \vdots \\ \hat{x}(k+N_p) \end{bmatrix}, z = \begin{bmatrix} z(k+1) \\ z(k+2) \\ \vdots \\ z(k+N_p) \end{bmatrix}, \quad (0\text{-}10)$$

$$w = \begin{bmatrix} w(k+1) \\ w(k+2) \\ \vdots \\ w(k+N_p) \end{bmatrix}, v = \begin{bmatrix} v(k+1) \\ v(k+2) \\ \vdots \\ v(k+N_p) \end{bmatrix}$$

$$\hat{d} = \begin{bmatrix} \hat{d}(k) \\ \hat{d}(k+1) \\ \vdots \\ \hat{d}(k+N_p-1) \end{bmatrix}, \hat{p} = \begin{bmatrix} \hat{p}(k+1) \\ \hat{p}(k+2) \\ \vdots \\ \hat{p}(k+N_p) \end{bmatrix} \quad (0\text{-}11)$$

$$u = \begin{bmatrix} u(k) \\ u(k+1) \\ \vdots \\ u(k+N_c-1) \end{bmatrix} \quad (0\text{-}12)$$

and $$\Delta u = \begin{bmatrix} \Delta u(k) \\ \Delta u(k+1) \\ \vdots \\ \Delta u(k+N_c-1) \end{bmatrix} \quad (0\text{-}13)$$

where the vectors (0-9) to (0-13) and their elements are hereafter defined as follows: one-step-ahead set-point vector r(k+1), j-step-ahead set-point vector r(k+j), future set-point vector r; one-step-ahead output vector $\hat{y}(k+1)$, j-step-ahead output vector $\hat{y}(k+j)$, future output vector $\hat{y}$; one-step-ahead state vector $\hat{x}(k+1)$, j-step-ahead state vector $\hat{x}(k+j)$, future state vector $\hat{x}$; one-step-ahead first-integral-state vector z(k+1), j-step-ahead first-integral-state vector z(k+j), future first-integral-state vector z; one-step-ahead second-integral-state vector w(k+1), j-step-ahead second-integral-state vector w(k+j), future second-integral-state vector w; one-step-ahead third-integral-state vector v(k+1), j-step-ahead third-integral-state vector v(k+j), future third-integral-state vector v; current state-disturbance-estimate vector $\hat{d}(k)$, one-step-ahead state-disturbance vector $\hat{d}(k+1)$, j-step-ahead state-disturbance vector $\hat{d}(k+j)$, future state-disturbance vector $\hat{d}$; one-step-ahead output-disturbance vector $\hat{p}(k+1)$, j-step-ahead output-disturbance vector $\hat{p}(k+j)$, future output-disturbance vector $\hat{p}$; one-step-ahead input vector u(k+1), j-step-ahead input vector u(k+j), current-and-future input vector u; one-step-ahead input-increment vector $\Delta u(k+1)$, j-step-ahead input-increment vector $\Delta u(k+j)$, and current-and-future input-increment vector $\Delta u$.

The following additional vector nomenclature associated with MPC Controller 110 is defined and adopted hereafter: current output estimate vector $\hat{y}(k)$ which in turn is defined as equal to the current output vector y(k) through the equation $\hat{y}(k) = y(k)$, current state-estimate vector $\hat{x}(k)$, current state-increment-estimate vector $\Delta \hat{x}(k)$ which is in turn defined as the difference $\hat{x}(k) - \hat{x}(k-1)$, current state-disturbance-increment-estimate vector $\Delta \hat{d}(k)$ which in turn is defined as the difference $\hat{d}(k) - \hat{d}(k-1)$, and current output-disturbance-increment-estimate vector $\Delta \hat{p}(k)$ which in turn is defined as the difference $\hat{p}(k) - \hat{p}(k-1)$. Furthermore, the vectors $\hat{x}(k-1)$, $\hat{d}(k-1)$, and $\hat{p}(k-1)$ are defined respectively defined as the one-step-behind state-estimate vector, one-step-behind state-disturbance-estimate vector, and the one-step-behind output-disturbance-estimate vector.

The current-and-future input vector u in (0-12) is a vector of future inputs (except for the first vector element, u(k), which represents the current input vector). Analogously, current-and-future input-increment vector $\Delta u$ in (0-13) is a vector of future input increments, except for its first vector element $\Delta u(k)$, which represents the current input-increment vector and is defined by the difference $$\Delta u(k) = u(k) - u(k-1) \quad (0\text{-}14)$$

where u(k−1) is the previous-instance input vector. The other elements of the input-increment are defined in an analogous fashion, namely $$\Delta u(k+j) = u(k+j) - u(k+j-1), j=1, 2, \ldots, N_c-1 \quad (0\text{-}15)$$

The indices $N_p$ and $N_c$ are respectively known as the prediction horizon and control horizon of the model predictive controller. The number of scalar elements in the current input vector u(k) is denoted by p. Therefore, the MPC Controller 110 adjusts a total of p manipulated variables, and each of the vectors u and $\Delta u$ contains a total of $p \times N_c$ rows. Furthermore, the first p rows of u contain the current input vector u(k), and the first p rows of $\Delta u$ contain the current input-increment vector $\Delta u(k)$.

Herein we adopt the convention that at a given current instant denoted by the time index k, the value of the j-step-ahead input vector is assumed to remain constant at future instants starting at a the instant $k+N_c$, where $N_c$ is the control horizon, as quantified by the expression $$u(k+j) = u(k+N_c-1) \text{ for } j = N_c, N_c+1, N_c+2, \ldots \quad (0\text{-}16)$$

As a consequence, the j-step-ahead input-increment vectors satisfy the relationship $$\Delta u(k+j)=0 \text{ for } j=N_c, N_c+1, N_c+2, \ldots \quad (0\text{-}17)$$

The current-and-future input vector u can be obtained from the current-and-future incremental-input vector $\Delta u$ through the Incremental-Input Shift Relationship $$u=\Delta_0^{-1}\Delta u+\Delta_2 u(k-1) \quad (0\text{-}17b)$$

and in addition, the current-and-future incremental-input vector can be obtained from the current-and-future input vector through the Input Shift Relationship $$\Delta u=\Delta_0 u-\Delta_1 u(k-1) \quad (0\text{-}17c)$$

where matrices $\Delta_0^{-1}$, $\Delta_2$, $\Delta_1$, and $\Delta_0$ are the MPC Structural Matrices defined in (0-48) and (0-49), and where $u(k-1)$ is the one-step-behind input vector. The Input Shift Relationship (0-17c) can be derived by one of skill in the art through the recursive application of equations (0-14) through (0-17), and the Incremental-Input Shift Relationship (0-17b) by standard matrix-algebra manipulation of (0-17c).

d) Prediction System

The Prediction System 150 of MPC Controller 110 can be a mathematical object that describes the anticipated future values of the variables associated with the Model System 130 and the Plant 110. At sampling interval k, the Prediction System 150 can produce numerical estimates of the future values of outputs collected as elements of the vector $\hat{y}$ described in equations (0-10), future values of states collected as elements of the state vectors $\hat{x}$, z, w, and v also described in equations (0-10), and of current and future values of the input and input-increment vectors collected as elements of the current-and-future input vector u and the current-and-future input-increment vector $\Delta u$ respectively described in equations (0-12) and (0-13).

The Prediction System 150 can use the Model System 130 to calculate predicted future values, and can also incorporate additional information about Plant 105, including for example heuristics and available physical insight into the behavior of Plant 105. Prediction System 150 can also make its predictions using a model that is different from the Model System.

Prediction System 150 takes into account the restrictions imposed by a Constraint Set when making numerical predictions, and can compute predictions for the limiting case where the prediction and control horizons are very large, effectively emulating or exactly replicating the mathematical behavior of infinitely long horizons.

e) Constraint Set

The variables in the Model System 130 are required to satisfy a number of constraints that are typically described by the set of inequalities $$u_{min} \leq u(k+j) \leq u_{max}, j=0, 1, \ldots, N_c-1 \quad (0\text{-}18)$$

$$\Delta u_{min} \leq \Delta u(k+j) \leq \Delta u_{max}, j=0, 1, \ldots, N_c-1 \quad (0\text{-}19)$$

$$\hat{x}_{min} \leq \hat{x}(k+j) \leq \hat{x}_{max}, j=0, 1, \ldots, N_p \quad (0\text{-}20a)$$

$$y_{min} \leq \hat{y}(k+j) \leq y_{max}, j=1, 2, \ldots, N_p \quad (0\text{-}20b)$$

and by a set of equalities $$A_e \hat{x}(k+j)+B_e u(k+j)+C_e \Delta u(k+j)=f_e(k+j), j=0, 1, \ldots, N_p \quad (0\text{-}21)$$

where $\Delta u(k+j)=u(k+j)-u(k+j-1)$ represents the present and future increments in the input-vector signal, and the matrices $A_e$, $B_e$, $C_e$, and the vector $f_e$ are known. The expressions (0-18)-(0-21) are known as the Constraint Set, hereafter denoted as CS. The vectors with sub-indices min and max appearing in the constraint-set equations (0-18)-(0-20b) are respectively designated as lower (denoted by the subscript "min") and upper (denoted by the subscript "max") bounds, and in embodiments the elements of the upper bound and lower bound vectors can be chosen to be constant or to change their values with time, for example, as functions of the time-shift index j. In other embodiments a subset of the inequalities in the CS may only have an upper bound, in which case the variables in that subset are not constrained to adopt values higher than a given upper bound. Conversely, in other embodiments a subset of the inequalities in the CS may only have a lower bound, in which case the variables in that subset are not constrained to adopt values lower than a given upper bound.

We say that a set of vectors $\{\hat{x}, u, \Delta u, \hat{y}\}$ satisfies the constraint set (CS) if all the inequalities and equalities in expressions (0-18)-(0-21) are satisfied by the components of the vectors in the set $\{\hat{x}, u, \Delta u, \hat{y}\}$. Each equality or inequality in the expressions (0-18)-(0-21) is referred to as a constraint. We use the notation $$\{\hat{x}, u, \Delta u, \hat{y}\} \in CS \quad (0\text{-}22)$$

to indicate that the vectors in the set $\{\hat{x}, u, \Delta u, \hat{y}\}$ satisfy all the constraints. The expression (0-22) represents the following statement: the quadruplet of vectors $\{\hat{x}, u, \Delta u, \hat{y}\}$ lies in the constraint set (CS).

f) Estimation System

The Estimation System 140 of MPC Controller 110 is utilized to compute exact or approximate values of the state vector using available measurements and information provided by the Model System 130. More specifically, Estimation System 140 generates a sequence of estimated state values $$\{\hat{x}(0), \hat{x}(1), \hat{x}(2), \ldots, \hat{x}(k), \ldots\} \quad (0\text{-}23)$$

that correspond exactly or approximately to the sequence of state values $$\{x(0), x(1), x(2), \ldots, x(k), \ldots\} \quad (0\text{-}24)$$

of Plant 105.

We say that the current value x(k) of the state vector of Plant 105 is measured when (1) the value of x(k) is obtained using sensor instruments available in Plant 105, or (2) the value of x(k) is determined using the output equation of the Model System 130, the available measurements of the current value for the current output vector y(k), and optionally any available measurements of the elements of the current output-disturbance vector p(k). For example, the current state vector x(k) is measured when the output equation of a Model System 130 is of the form $$y(k)=Cx(k) \quad (0\text{-}25)$$

and the output equation (0-25) can be solved for a physically meaningful current state vector solution x(k) given a measurement of the current output vector y(k) and the output matrix C. This method of measuring the state vector involves solving for the desired state value from a memoryless relationship, defined as a relationship such as (0-25), whose terms contain no value of the time index k, or contain the same value of the index. Memoryless relationships are also known as static relationships. When the state x(k) is measured, the Estimation System 140 of MPC Controller 110 assigns to the current state-estimate vector î(k) the value of the measured current state vector x(k), and uses $\hat{x}(k)$ to populate the entries of the sequence (0-23).

When the state vector is not measured, the sequence of estimated states (0-23) can be calculated using an Estimation System 140 using schemes for state estimation that are available in the literature, and that are well known to one of skill in the art. In such cases the Estimation System 140 can also generate the following sequences of estimates of state-disturbance and output-disturbance values $$\{\hat{d}(0), \hat{d}(1), \hat{d}(2), \ldots, \hat{d}(k), \ldots\} \quad (0\text{-}26)$$

$$\{\hat{p}(0), \hat{p}(1), \hat{p}(2), \ldots, \hat{p}(k), \ldots\} \quad (0\text{-}27)$$

which respectively correspond exactly or approximately to the following sequences of estimates of state-disturbance and output-disturbance values $$\{d(0), d(1), d(2), \ldots, d(k), \ldots\} \quad (0\text{-}28)$$

$$\{p(0), p(1), p(2), \ldots, p(k), \ldots\} \quad (0\text{-}29)$$

For example, a common embodiment of Estimation System 140 includes the Conventional Estimation Scheme comprised of at least one of the following equations:

$$\hat{x}(k+1) = A\hat{x}(k) + Bu(k) + \hat{d}(k) + L_x[y(k) - C\hat{x}(k) - \hat{p}(k)] \quad (0\text{-}30)$$

$$\hat{d}(k+1) = A_d\hat{d}(k) + L_d[y(k) - C\hat{x}(k) - \hat{p}(k)] \quad (0\text{-}31)$$

$$\hat{p}(k+1) = A_p\hat{p}(k) + L_p[y(k) - C\hat{x}(k) - \hat{p}(k)] \quad (0\text{-}32)$$

where $L_x$, $L_d$, and $L_p$ are the gains of the Conventional Estimation System 140. This Conventional Estimation System is well documented in the MPC literature, where it is primarily used to estimate unmeasured states and disturbances of the type described by the Model System equations (0-5)-(0-6) with constant disturbances (0-7) and (0-8), or by asymptotically constant disturbances which are defined as disturbances that may not be constrained for a period of time but that eventually adopt a constant value. The initial value of the state estimate, $\hat{x}(0)$, is typically set as an engineering guess. Techniques for state estimation can be developed and implemented by MPC Controller 110 using a variety of well known approaches, including linear filtering theory, Luenberger observers, non-linear technologies such as extended Kalman-filter techniques, as well as proprietary methodologies.

To appropriately describe asymptotically constant disturbances, the disturbance matrices $A_d$ and $A_p$ in (0-31) and (0-32) must have eigenvalues located at a point on the complex plane that has a real component of unity and an imaginary component of zero (namely, the complex-point 1), to give rise to constant non-zero disturbance values at long times. To adequately represent asymptotically constant disturbances, the two disturbance matrices must satisfy other requirements that are known to one skilled in the art, such as, for example, allowing for no eigenvalue to be located outside the unit circle of the complex plane, and limiting the multiplicity of the eigenvalues located at the complex-point 1 on the complex plane.

In theoretical and practical MPC deployments, the most common embodiment of the Conventional Estimation System 140 includes selecting $$A_d = I \quad (0\text{-}33)$$

and $$A_p = I \quad (0\text{-}34)$$

in equations (0-31) and (0-32), respectively, which implies that the Model System includes the equations $$d(k+1) = d(k) \quad (0\text{-}35)$$

$$p(k+1) = p(k) \quad (0\text{-}36)$$

and that leads to the Standard MPC Estimation System defined by the equations $$\hat{x}(k+1) = A\hat{x}(k) + Bu(k) + \hat{d}(k) + L_x[y(k) - C\hat{x}(k) - \hat{p}(k)] \quad (0\text{-}37)$$

$$\hat{d}(k+1) = \hat{d}(k) + L_d[y(k) - C\hat{x}(k) - \hat{p}(k)] \quad (0\text{-}38)$$

$$\hat{p}(k+1) = \hat{p}(k) + L_p[y(k) - C\hat{x}(k) - \hat{p}(k)] \quad (0\text{-}39)$$

Obvious variations of the estimation scheme (0-37)-(0-39) include the special cases where the state disturbance is not present, in which case equation (0-38) is removed from the Estimation System, and the state disturbance variable $\hat{d}(k)$ is set to zero in equation (0-37). Other variations of the estimation scheme (0-37)-(0-39) are known to one of skill in the art.

It will be appreciated by one of skill in the art that in the case where the disturbances are measured they do not need to be estimated, and hence the preferred Estimation System 140 given by equations (0-37)-(0-39) reduces to only equation (0-37), where the variables $\hat{d}(k)$ and $\hat{p}(k)$ represent the measured values rather than the estimated values of the corresponding disturbances. If only one disturbance variable is measured (say, for example $\hat{p}(k)$), then the Estimation System 140 is modified by dropping the corresponding estimation equation for that disturbance (in this example, equation (0-39), while keeping the estimation equation for the unmeasured disturbance (in this example, equation (0-38)).

This disclosure defines an embodiment of Estimation System 140 called Incremental MPC Estimation System (IMES), which realizes significant advantages over the Conventional Estimation Systems in practical use.

g) Optimization System

The Optimization System 160 of MPC Controller 110 can be a mathematical object that finds the optimal value of the current-and-future input vector u or of the current-and-future incremental-input vector $\Delta u$, used to deliver optimal inputs to the Plant 105, where optimal is understood as the minimal value the MPC Performance Index $$PI(k) = \frac{1}{2}(r - \hat{y})^T Q_a (r - \hat{y}) + \frac{1}{2}u^T R_a u + \quad (0\text{-}39a)$$

$$\frac{1}{2}(f_a - F_a u)^T S_a (f_a - F_a u) + \frac{1}{2}\Delta u^T T_a \Delta u + \frac{1}{2}z^T Z_a z +$$

$$\frac{1}{2}w^T W_a w + \frac{1}{2}v^T V_a v + \frac{1}{2}\hat{x}^T X_a \hat{x} + q_a^T \hat{y} + r_a^T u + t_a^T \Delta u + x_a^T \hat{x}$$

comprised of cost terms and weights that hereafter are defined as follows: quadratic tracking-error cost $(r-\hat{y})^T Q_a (r-\hat{y})$ and quadratic tracking-error weight $Q_a$; quadratic input cost $u^T R_a u$ and quadratic input weight $R_a$; quadratic input-translation cost $(f_a - F_a u)^T S_a (f_a - F_a u)$, input-translation vector $f_a$ input-translation matrix $F_a$, and quadratic input-translation weight $S_a$; quadratic input-increment cost $\Delta u^T T_a \Delta u$ and quadratic input-increment weight $T_a$; quadratic first-integral-state cost $z^T Z_a z$ and quadratic first-integral weight $Z_a$; quadratic second-integral-state cost $w^T W_a w$ and quadratic second-integral weight $W_a$; quadratic third-integral-state cost $v^T V_a v$ and quadratic third-integral weight $V_a$; quadratic state cost $\hat{x}^T X_a \hat{x}$ and quadratic state weight $X_a$; linear output cost $q_a^T \hat{y}$ and linear output weight $q_a$; linear input cost $r_a^T u$ and linear input weight $r_a$; and linear input-increment cost $t_a^T \Delta u$, and linear input-increment weight $t_a$; linear state cost $x_a^T \hat{x}$, and linear state weight $x_a$. One of skill in the art can recognize that each factor ½ appearing in the quadratic-cost terms of (0-39) can be omitted when all the linear weights are zero, and that all quadratic weights are symmetric matrices since the anti-symmetric part of a matrix does not contribute to change the value of the quadratic form in which it participates.

In addition, the optimization of the MPC Performance Index must be carried out subject to the satisfaction of all the equations that comprise the Prediction Model 150, as well as subject to the satisfaction of all the equalities and inequalities that define the constraint set CS.

The Optimization System 160 of MPC Controller 110 can utilize numerical or symbolic optimization techniques. A non-exhaustive list of suitable techniques include the use of quadratic programming and interior-point methods, techniques based on the theory of linear or bilinear matrix inequalities, among other strategies known to one of skill in the art.

h) MPC Parameters

MPC Controller 110 can use a set of MPC Parameters 170 that are defined by the user of the control system. Two of these are the prediction horizon $N_p$ and the control horizon $N_c$, which can be specified to MPC Controller 110 as fixed values in the stream 170 or can be specified as rules in stream 170. One example of a prediction horizon rule is where the stream 170 is used to instruct MPC Controller 110 to use time-varying values of the prediction horizon.

Other elements of the MPC Parameters stream 170 include the values of cost-weight matrices, upper and lower bounds for the Constraint Set, heuristic information, such as the variance of measurement and disturbance noise, for example, as well as specific rules to manage the parameters, such as whether they should remain constant or be adjusted in a specific time-varying fashion. The MPC Parameters 170 can also include constants, variables, and rules utilized by the Estimation System 140 and the Optimization System 160.

i) MPC Structural Matrices

The following family of matrices contain elements that often play a role in the MPC Model System, Prediction, System, and Optimization System:

$$C_I = \begin{bmatrix} CA \\ CA^2 \\ \vdots \\ CA^{N_c-1} \\ CA^{N_c} \\ CA^{N_c+1} \\ \vdots \\ CA^{N_p} \end{bmatrix} \quad (0\text{-}40)$$

$$D_I = \begin{bmatrix} CB & 0 & \cdots & 0 & 0 \\ CAB & CB & \cdots & 0 & 0 \\ \vdots & \vdots & \ddots & \vdots & \vdots \\ CA^{N_c-1}B & CA^{N_c-2}B & \cdots & CB & 0 \\ CA^{N_c}B & CA^{N_c-1}B & \cdots & CAB & CB \\ CA^{N_c+1}B & CA^{N_c}B & \cdots & CA^2B & C\sum_{i=0}^{1}A^iB \\ \vdots & \vdots & \ddots & \vdots & \vdots \\ CA^{N_p-1}B & CA^{N_p-2}B & \cdots & CA^{N_p-N_c+1}B & C\sum_{i=0}^{N_p-N_c}A^iB \end{bmatrix} \quad (0\text{-}41)$$

$$F_I = \begin{bmatrix} C \\ C\sum_{i=0}^{1}A^i \\ \vdots \\ C\sum_{i=0}^{N_p-1}A^i \end{bmatrix}, \quad E_I = \begin{bmatrix} I \\ I \\ \vdots \\ I \end{bmatrix} \quad (0\text{-}42)$$

$$M_I = \begin{bmatrix} I \\ I \\ I \\ \vdots \\ I \\ I \end{bmatrix}, \quad N_I = \begin{bmatrix} 0 & 0 & 0 & \cdots & 0 & 0 \\ I & 0 & 0 & \cdots & 0 & 0 \\ I & I & 0 & \cdots & 0 & 0 \\ \vdots & \vdots & \vdots & \ddots & \vdots & \vdots \\ I & I & I & \cdots & 0 & 0 \\ I & I & I & \cdots & I & 0 \end{bmatrix} \quad (0\text{-}43)$$

$$C_{II}^0 = \begin{bmatrix} C\sum_{i=0}^{1}A^i \\ C\sum_{i=0}^{2}A^i \\ \vdots \\ C\sum_{i=0}^{N_p}A^i \end{bmatrix} \quad (0\text{-}44)$$

$$C_{II} = \begin{bmatrix} C\left(\sum_{i=0}^{1}A^i - I\right) \\ C\left(\sum_{i=0}^{2}A^i - I\right) \\ \vdots \\ C\left(\sum_{i=0}^{N_p}A^i - I\right) \end{bmatrix} \quad (0\text{-}45)$$

$$D_{II} = \begin{bmatrix} CB & 0 & \cdots & 0 \\ C\sum_{i=0}^{1}A^iB & CB & \cdots & 0 \\ \vdots & \vdots & \ddots & \vdots \\ C\sum_{i=0}^{N_p-1}A^iB & C\sum_{i=0}^{N_p-2}A^iB & \cdots & C\sum_{i=0}^{N_p-N_c}A^iB \end{bmatrix} \quad (0\text{-}46)$$

$$E_{II} = \begin{bmatrix} I \\ I \\ \vdots \\ I \end{bmatrix} \quad (0\text{-}47)$$

$$\Delta_0 = \begin{bmatrix} I & 0 & 0 & 0 & \cdots & 0 & 0 \\ -I & I & 0 & 0 & \cdots & 0 & 0 \\ 0 & -I & I & 0 & \cdots & 0 & 0 \\ 0 & 0 & -I & I & \cdots & 0 & 0 \\ \vdots & \vdots & \vdots & \vdots & \ddots & \vdots & \vdots \\ 0 & 0 & 0 & 0 & \cdots & -I & I \end{bmatrix}, \quad (0\text{-}48)$$

$$\Delta_0^{-1} = \begin{bmatrix} I & 0 & 0 & 0 & \cdots & 0 & 0 \\ I & I & 0 & 0 & \cdots & 0 & 0 \\ I & I & I & 0 & \cdots & 0 & 0 \\ I & I & I & I & \cdots & 0 & 0 \\ \vdots & \vdots & \vdots & \vdots & \ddots & \vdots & \vdots \\ I & I & I & I & \cdots & I & I \end{bmatrix}$$

$$\Delta_1 = \begin{bmatrix} I \\ 0 \\ 0 \\ 0 \\ \vdots \\ 0 \end{bmatrix}, \Delta_2 = \begin{bmatrix} I \\ I \\ I \\ I \\ \vdots \\ I \end{bmatrix} \quad (0\text{-}49)$$

wherein A, B, and C are matrices of a linear or linearized Model System, wherein I denotes an identity matrix of the appropriate size, and can include the case of a scalar size The matrices and vectors appearing in equations (0-40) to (0-49) are hereafter referred to as MPC Structural Matrices. One of skill in the art can establish the size of each MPC C Structural Matrix from the context of mathematical expression in which the matrix is used to carry out matrix-matrix additions, differences and multiplications as well as matrix-vector multiplications. The symbol I appearing in an MPC C Structural Matrix denotes an identity matrix of the appropriate size, and can include the case of a scalar size.

Incremental MPC Models and Estimators a) Incremental Model System for MPC

As an alternative to the Model System 130 for the Plant 105, the Estimation System, Prediction System, and Optimization System can use the following Disturbance-Free Incremental Model System 130

$$x(k+1)=(A+I)x(k)-Ax(k-1)+B\Delta u(k) \quad (0\text{-}50)$$

$$y(k)=y(k-1)+Cx(k)-Cx(k-1) \quad (0\text{-}51)$$

where equation (0-50) is the Disturbance Free Incremental State-Equation, and (0-51) is the Disturbance Free Incremental Output-Equation. The incremental state-space equation (0-50) can be obtained from the subtraction of the one-step-behind state-space Model System $$x(k)=Ax(k-1)+Bu(k-1) \quad (0\text{-}52)$$

from the one-step-behind state-space Model System (0-3), and the incremental output equation (0-51) can be obtained from the subtraction of the one-step-behind output equation $$y(k-1)=Cx(k-1) \quad (0\text{-}54)$$

from the undelayed output equation (0-4). Note that (0-50) and (0-51) can respectively be represented in the equivalent incremental forms $\Delta x(k+1)=A\Delta x(k)+B\Delta u(k)$ and $\Delta y(k)=C\Delta x(k)$, where $\Delta x(k)=x(k)-x(k-1)$ and $\Delta y(k)=y(k)-y(k-1)$.

The incremental-model approach is particularly effective when the Model System 130 includes an unmeasured current state-disturbance vector and/or an unmeasured current output-disturbance vector, according to the form given in (0-5) and (0-6). In this case the Incremental Model System 130 is given by the expression $$x(k+1)=(A+I)x(k)-Ax(k-1)+B\Delta u(k)+\Delta d(k) \quad (0\text{-}57a)$$

$$y(k+1)=y(k-1)+Cx(k)-Cx(k-1)+\Delta p(k) \quad (0\text{-}57b)$$

where $$\Delta d(k)=d(k)-d(k-1) \quad (0\text{-}58)$$

$$\Delta p(k)=p(k)-p(k-1) \quad (0\text{-}59)$$

which explicitly include the increments (0-58) and (0-59) of the state and output perturbations.

In the case where the state disturbances and output disturbances have a constant value or eventually adopt a constant value, which is an instance of primary relevance in the context of design for offset elimination, the difference between consecutive disturbance values becomes essentially equal zero or the difference eventually becomes essentially equal to zero. Mathematically this scenario is represented by the equations $$\Delta d(k)=0 \quad (0\text{-}60)$$

$$\Delta p(k)=0 \quad (0\text{-}61)$$

Hence in such cases the state equation of the Incremental Model System 130 given in (0-57a) and (0-57b) reduces to the disturbance-free form (0-50)-(0-51). Hence, in the context of MPC design and implementation, the use of an Incremental Model System 130 is a distinct advantage because it can capture in a precise fashion the evolution of the states and outputs without requiring the measurement or estimation of the constant or piecewise-constant disturbances.

b) Incremental Prediction System for MPC

The Incremental-Model System (0-72) can be used to build an Incremental MPC Prediction System 150 that can be composed of the prediction equations $$\hat{x}(k+j)=(A+I)\hat{x}(k+j-1)-A\hat{x}(k+j-2)+B\Delta u(k+j-1) \quad (0\text{-}62b)$$

$$\hat{y}(k+j)=\hat{y}(k+j-1)+C\hat{x}(k+j)-C\hat{x}(k+j-1) \quad (0\text{-}62c)$$

for values of the time-shift index j=1, 2, . . . , $N_p$, where $\hat{y}(k)=y(k)$, and where $\hat{x}(k)$ can be obtained by the IMES technique (0-63) or (0-68).

Incremental MPC Estimation System (IMES)

The Estimation System 140 can use the Incremental MPC Estimation System (IMES) comprised of the equations $$\hat{x}(k+1)=(A+I)\hat{x}(k)-A\hat{x}(k-1)+B\Delta u(k)+L_{IMES}\epsilon(k) \quad (0\text{-}63)$$

and $$\epsilon(k)=y(k)-y(k-1)-C\hat{x}(k)-C\hat{x}(k-1) \quad (0\text{-}64)$$

where $\hat{x}(k)$ is the current state-estimate vector, $\epsilon(k)$ is the Innovations Vector, and $L_{IMES}$ is the IMES Gain Matrix, Matrices A, B, and C are Linear Model Parameters, which can play a role in the Model System 130 through their appearance in modeling equations of the form (0-5) and (0-6), and y(k) and y(k-1) are measured or estimated output vectors at the current and past time indices k and k-1, respectively. The number of elements in the current state-estimate vector $\hat{x}(k)$ is denoted as n; therefore, equation (0-63) leads to the estimation of n scalar state variables collected as elements the current state-estimate vector.

Equation (0-63) is referred to as the preferred Linear IMES State Equation, and (0-64) as the preferred IMES Innovations Equation. Equations (0-63) and (0-64) represent the preferred embodiment of the Linear Incremental MPC Estimation System, which can be adopted by MPC Controller 110 for service as Estimation System 140. Equation (0-63) is based on the disturbance-free incremental state-space equation of the linear form given in (0-57a), as can be recognized after comparing the first two terms on the right-hand side of (0-63) with the corresponding terms of equation (0-57a).

The IMES Innovations Equation (0-64) features an innovations vector based on a Model System 130 that features an incremental output equation of the linear form y(k)=y(k-1)+Cx(k)-Cx(k-1) given in equation (0-57b). Equation (0-64) indicates that the innovations vector is constructed by taking the difference between the value of the current measurement, y(k) and the right-hand side of the incremental output equation (0-57b). Hence, the innovations vector represents the value of the mismatch between the current output vector and the output vector that is predicted by the output equation on which the innovations vector is based.

One of skill in the art can use the definitions $\Delta\hat{x}(k)=\hat{x}(k)-\hat{x}(k-1)$ and $\Delta y(k)=y(k)-y(k-1)$, and proceed to represent the preferred Linear Incremental MPC Estimation System (0-63) in terms of the following set of relationships, executed in the order given:

$$\Delta u(k)=u(k)-u(k-1) \quad (0\text{-}65a)$$

$$\Delta y(k)=y(k)-y(k-1) \quad (0\text{-}65b)$$

$$\Delta\hat{x}(k)=\hat{x}(k)-\hat{x}(k-1) \quad (0\text{-}65c)$$

$$\epsilon(k)=\Delta y(k)-C\Delta\hat{x}(k) \quad (0\text{-}65d)$$

$$\Delta\hat{x}(k+1)=A\Delta\hat{x}(k)+B\Delta u(k)+L_{IMES}\epsilon(k) \quad (0\text{-}65e)$$

$$\hat{x}(k)=\hat{x}(k-1)+\Delta\hat{x}(k) \quad (0\text{-}65f)$$

A key advantage of the preferred linear IMES embodiment is that it does not require the estimation of disturbances, hence leading to savings in computational effort relative to conventional state estimators. The preferred IMES embodiment can be used with high effectiveness for estimating states in the case where the state disturbances and output disturbances are constant, asymptotically constant, or slowly varying in time.

Figure 8:
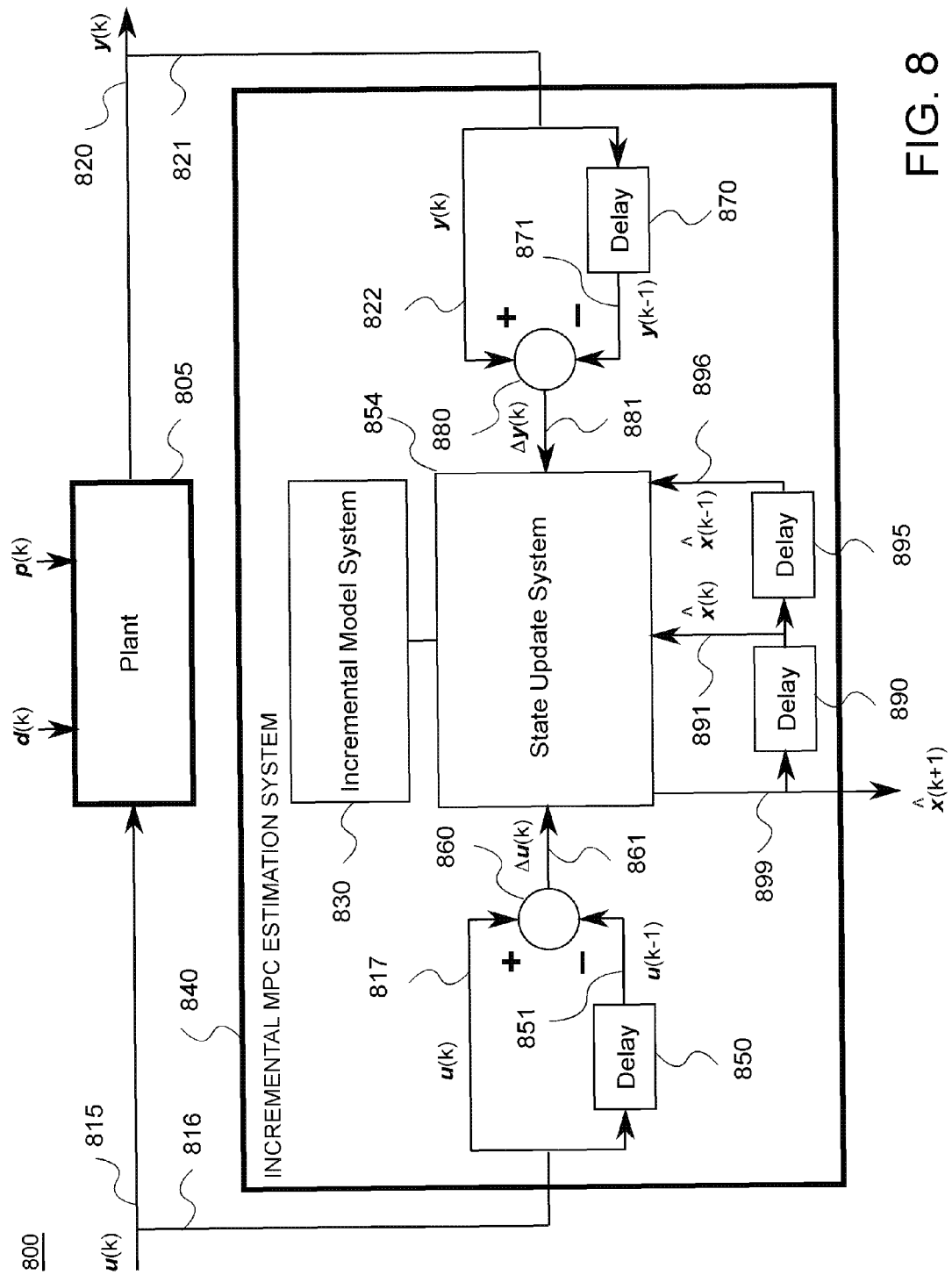
FIG. 8 is a block diagram illustrating the architecture of an exemplary Incremental MPC Estimation System according to an embodiment.

The elements of the Incremental MPC Estimation System 840 are illustrated in an exemplary fashion in FIG. 8, where the state-estimate vector $\hat{x}(k+1)$ is shown as being produced at the current instant k. The current input vector u(k) that is fed to Plant 805 is also delivered to the Incremental MPC Estimation System 840 via the stream 816. The input vector is processed by the one-step-delay operator 850, indicated as Delay block 850 in the figure, to produce the one-step-behind input vector u(k−1) 851. The current input vector and the one-step-behind input vector are then processed by the summation junction 860, where a difference operation is implemented to generate the current input-increment vector $\Delta u(k)$, 861. This accomplishes the operation indicated in equation (0-65a). Analogous operations are conducted on the output vector y(k), 820, from Plant 805. The stream 821 sends the current output vector to the Incremental MPC Estimation System 840, the delay operator 870 is used to generate the one-step-behind output vector, and the summation junction 880 is used to generate the current output-increment vector $\Delta y(k)$, 881. This accomplishes the operation indicated in equation (0-65b).

The State Update System 854 can retrieve the value of the current state-estimate vector $\hat{x}(k)$, 891, generated in the previous instant k−1, and the value of the one-step-behind state-estimate vector $\hat{x}(k−1)$, 896, generated at the previous instant k−2. The process for retrieving these two state estimates is shown in FIG. 8 where the one-step-ahead state estimate $\hat{x}(k+1)$, 899, generated at the current instant is processed by the Delay 890 to produce the current estimate 891, and then again by the Delay 895 to produce the one-step-behind estimate 896. The State Update System 854 used the equations defined in the Incremental Model System 830, and calculates an IMES Gain Matrix to produce all the elements required to configure IMES Estimation Equation (0-65e). Finally, the State Update System executes the calculations prescribed by the IMES Estimation Equation (0-65e) to produce the one-step-ahead state estimate $\hat{x}(k+1)$, 899.

Figure 9:
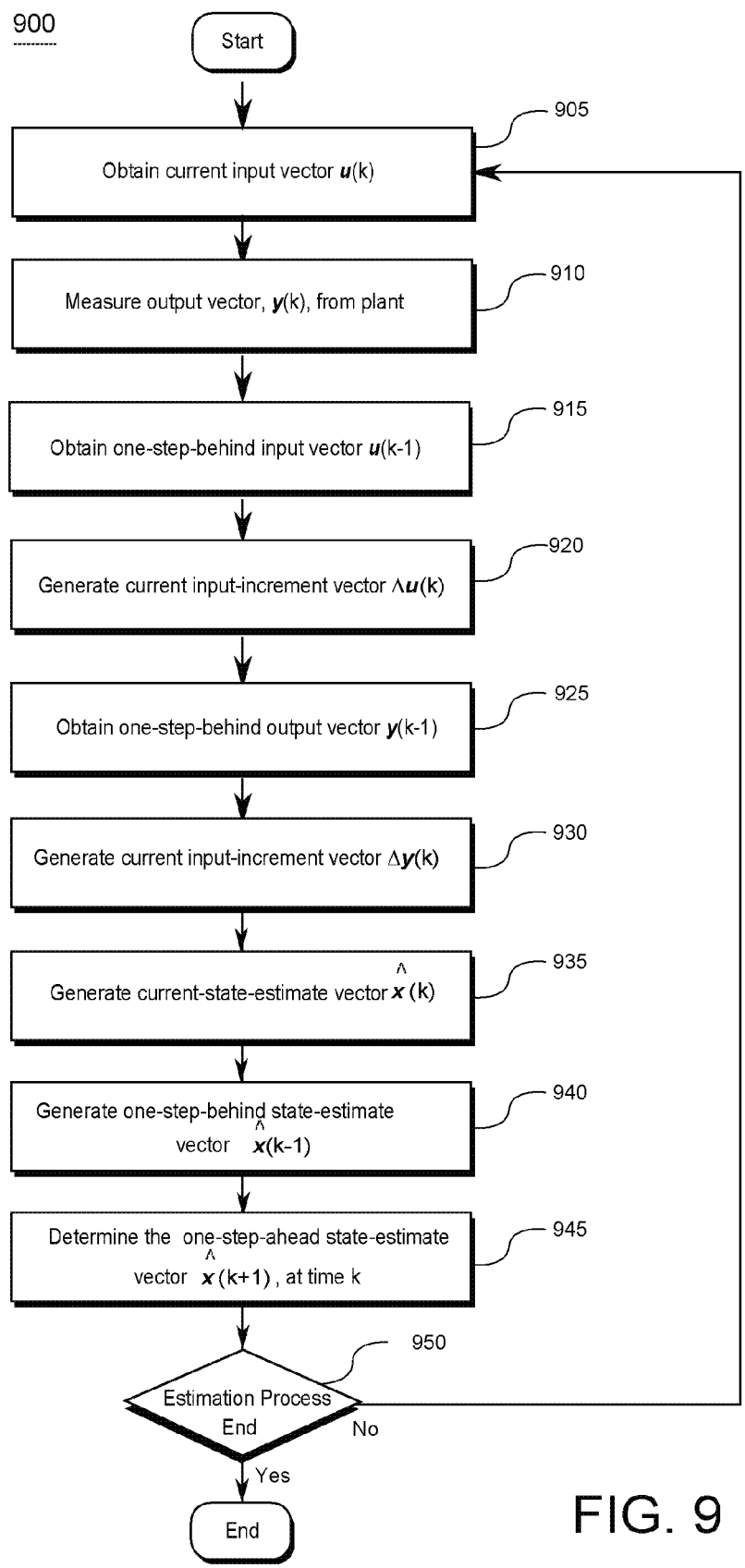
FIG. 9 is a flow diagram illustrating the architecture of an exemplary Incremental MPC Estimation System according to an embodiment.

FIG. 9 is an illustrative flow diagram for an exemplary implementation of the preferred Incremental MPC Estimation System 840. In step 905, the Incremental MPC Estimation System 840 obtains a value of the current input vector, and in step 910 obtains a value of the output vector. In step 915, the one-step-behind input vector is retrieved from storage, and in step 920 the current input-increment vector is calculated as prescribed by equation (0-65a). In step 925, the one-step-behind output vector is obtained from storage, and in step 930 the current output-increment vector is calculated as prescribed by equation (0-65b). In step 935, the current state-estimate vector is retrieved from storage, and in step 940 the one-step-behind state-estimate vector is retrieved from storage.

In step 945, the Incremental MPC Estimation System 840 can proceed to determine the one-step-ahead state-estimate vector $\hat{x}(k+1)$ using the Incremental MPC Estimation Equation. Step 945 can consist of (i) retrieving from storage the value of the IMES Matrix Gain $L_{IMES}$, (ii) retrieving from storage a value for the current state-estimate vector $\hat{x}(k)$ and a value for the one-step-behind state-estimate vector $\hat{x}(k−1)$, (iii) generating a value for the state-estimate increment vector $\Delta\hat{x}(k)$ as prescribed by equation (0-65c), (iv) generating a value for the innovations vector $\epsilon(k)$ as prescribed by equation (0-65d), (v) calculating a value for the one-step-ahead state-increment estimate $\Delta\hat{x}(k+1)$ according to equation (0-65e), and finally, (vi) generating a value for the one-step-ahead state estimate $\hat{x}(k+1)$ according to equation (0-65f).

At the next sampling instant, Incremental MPC Estimation System 840 determines if the control process of estimation for Plant 805 is at an end, in step 960. If the estimation process is not at an end, Incremental MPC Estimation System 840 repeats steps 905-940.

Figure 7:
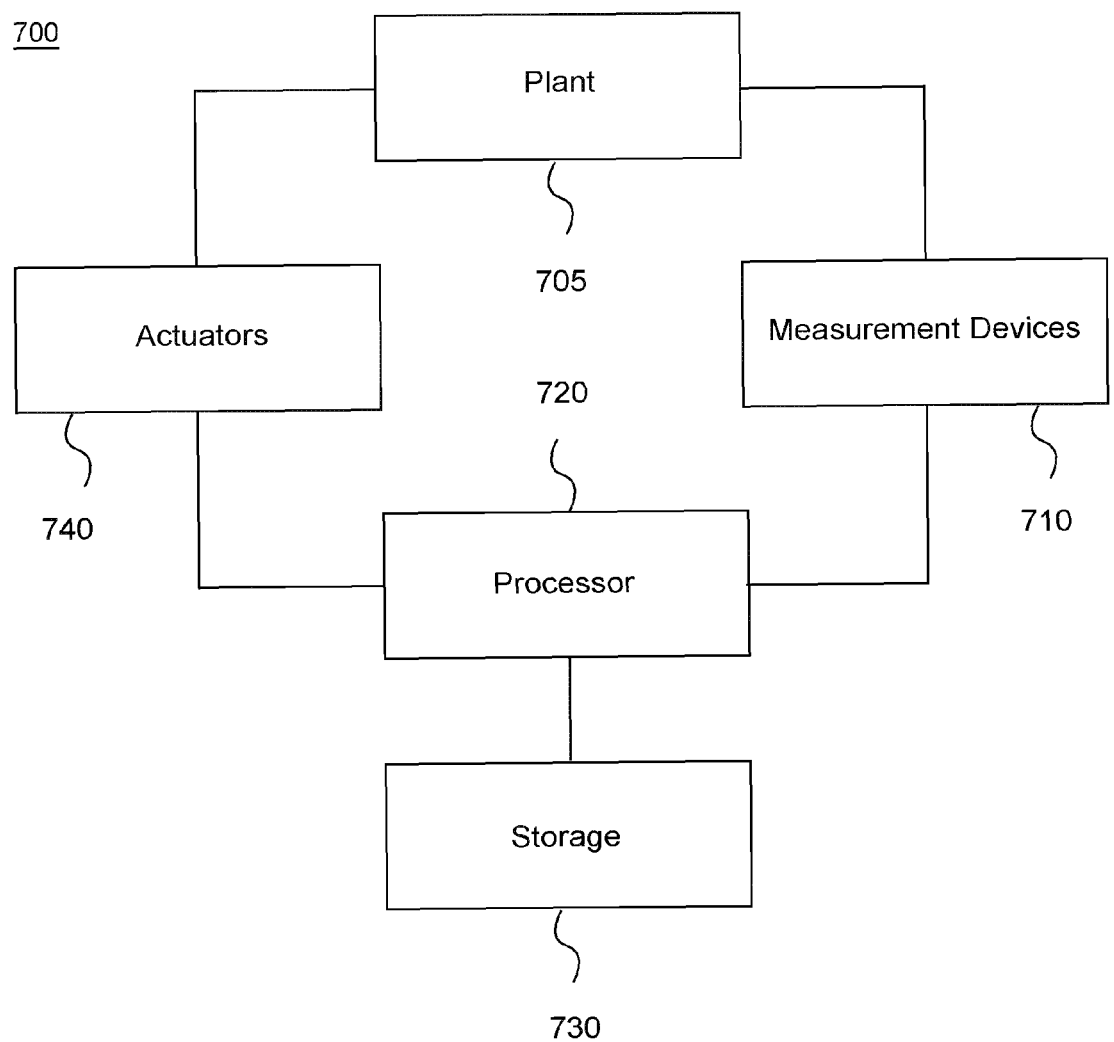
FIG. 7 is a hardware diagram illustrating an exemplary MPC controller architecture and its implementation on a plant according to an embodiment.

FIG. 7 illustrates a hardware configuration that can be used to deploy the Incremental MPC Estimation System. The Processor 720 of FIG. 7 receives values of the output vector of Plant 705 through communication with various measurement sensors 710. The Processor 720 receives values of the input vector to Plant 705 through communications with various actuators that can broadcast such information, from communication with the MPC Controller that is also implemented by Processor 720, or from accessing values of the input vector saved in Storage 730. Processor 720 can implement all the operations required to implement the Delay operations 850, 870, 890, and 895, and the summation operations 860 and 880. Processor 720 can implement all the operations required by State Update System 854, and can access the modeling information contained in System 830 via access to the Storage resource 730.

The IMES State Equation (0-63) of the preferred embodiment does not include in an explicit fashion the effect of disturbance changes on the estimated states. In other embodiments, the IMES can be based on the following Linear Incremental MPC State Equation which includes a state-disturbance-increment-estimate vector $\Delta\hat{d}(k)$:

$$\hat{x}(k+1)=(A+I)\hat{x}(k)-A\hat{x}(k-1)+B\Delta u(k)+\Delta\hat{d}(k)+L_{IMES}\epsilon(k) \quad (0\text{-}66)$$

In one embodiment of the Linear Incremental MPC State-Estimation System, the innovations vector used in the state equation (0-66) is based on the linear incremental output equation $y(k)=y(k-1)+C[x(k)-x(k-1)]+\Delta p(k)$, and is given by $$\epsilon(k)=y(k)-y(k-1)-C[\hat{x}(k)-\hat{x}(k-1)]-\Delta\hat{p}(k) \quad (0\text{-}67)$$

Furthermore, the disturbance-increment vectors appearing in (0-66) and (0-67) can be estimated using the following IMES Disturbance Equations:

$$\Delta\hat{d}(k+1)=A_d\Delta\hat{d}(k)+L_d\epsilon(k) \quad (0\text{-}68a)$$

$$\Delta\hat{p}(k+1)=A_p\Delta\hat{p}(k)+L_p\epsilon(k) \quad (0\text{-}68b)$$

where $L_d$ is the IMES state-disturbance gain, $L_p$ is the IMES output-disturbance gain, and $A_d$ and $A_p$ are state matrices used to model the dynamics of the disturbance signals.

Hence, in this embodiment the Estimation System 140 comprises a Linear Incremental MPC Estimation System consisting of equations (0-66) to (0-68b). In an embodiment, the state-disturbance state-matrix $A_d$ can be set equal to the zero matrix, which can be effective for modeling state-disturbances that are constant or piecewise constant. In other embodiments, $A_d$ can be set to be equal to an identity matrix, which can be effective for modeling state-disturbances whose incremental changes in time are constant. In another embodiment, $A_d$ can be constructed with complex-conjugate eigenvalue pairs to model state-disturbance changes that evolve in an oscillatory or sinusoidal fashion. In other embodiments, the element of matrix $A_d$ can be specified so that it can adequately model slowly changing state-disturbances. Analogous embodiments can be realized for the output-disturbance state-matrix $A_p$.

In another embodiment of the Linear Incremental MPC State-Estimation System, the innovations vector used in the state equation (0-66) can be of the form $$\epsilon(k)=y(k)-C\hat{x}(k)-\hat{p}(k) \qquad (0\text{-}69)$$

which is based on the linear standard output equation $y(k)=Cx(k)+p(k)$. Estimation System 140 can then adopt any scheme documented in the open literature to produce an estimate of the output-disturbance vector that appears in equation (0-69).

In another embodiment of the Linear Incremental MPC State-Estimation System, the innovations vector used in the state equation (0-66) can be of the form $$\epsilon(k)=y(k)-y(k-1)-g_{nl}(\hat{x}(k),u(k),\hat{p}(k),k)+g_{nl}(\hat{x}(k-1),u(k-1),\hat{p}(k-1),k-1) \qquad (0\text{-}70)$$

which is based on the nonlinear incremental output equation $$y(k)=y(k-1)+g_{nl}(x(k),u(k),p(k),k),-g_{nl}(x(k-1),u(k-1),p(k-1),k-1) \qquad (0\text{-}71)$$

Estimation System 140 can then adopt any scheme documented in the open literature to produce an estimate of the output-disturbance vectors that appear in the equation (0-70).

In another embodiment of the Linear Incremental MPC State-Estimation System, the innovations vector used in the state equation (0-66) can be of the form $$\epsilon(k)=y(k)-g_{nl}(\hat{x}(k),u(k),\hat{p}(k),k) \qquad (0\text{-}72)$$

which is based on the nonlinear standard output equation $$y(k)=g_{nl}(x(k),u(k),p(k),k) \qquad (0\text{-}73)$$

Estimation System 140 can then adopt any scheme documented in the open literature to produce an estimate of the output-disturbance vector that appears in the equation (0-72).

In other embodiments the Estimation System 140 can adopt the following nonlinear state equation of Model System 130

$$x(k+1)=f_{nl}(x(k),u(k),d(k),k) \qquad (0\text{-}74)$$

where $f_{nl}$ is a non-linear relationship, and can formulate a Nonlinear Incremental MPC Estimation System with state equation $$\hat{x}(k+1)=\hat{x}(k)+f_{nl}(\hat{x}(k),u(k),\hat{d}(k),k)-f_{nl}(\hat{x}(k-1),u(k-1),\hat{d}(k-1),k-1)+L_{IMES}\epsilon(k) \qquad (0\text{-}75)$$

where (0-75) is referred to as the Nonlinear IMES State Equation. In turn, in embodiments the innovations vector $\epsilon(k)$ used in the state equation (0-75) can adopt the form (0-67) based on a linear incremental output equation, the form (0-69) based on a linear standard output equation, or the form (0-70) based on a nonlinear incremental output equation, or the form (0-72) based on a nonlinear standard output equation. Furthermore, Estimation System 140 can then adopt any scheme documented in the open literature to produce an estimate of the state-disturbance vectors that appears in equation (0-75).

For example, Estimation System 140 can configure a Nonlinear Incremental MPC Estimation System consisting of the following equations:

$$\hat{x}(k+1)=\hat{x}(k)+f_{nl}(\hat{x}(k),u(k),\hat{d}(k),k)-f_{nl}(\hat{x}(k-1),u(k-1),\hat{d}(k-1),k-1)+L_{IMES}\epsilon(k) \qquad (0\text{-}76)$$

$$\epsilon(k)=y(k)-y(k-1)-g_{nl}(\hat{x}(k),u(k),\hat{p}(k),k)+g_{nl}(\hat{x}(k-1),u(k-1),\hat{p}(k-1),k-1) \qquad (0\text{-}77)$$

$$\hat{d}(k+1)=A_d\hat{d}(k)+L_d\epsilon(k) \qquad (0\text{-}78a)$$

$$\hat{p}(k+1)=A_p\hat{p}(k)+L_p\epsilon(k) \qquad (0\text{-}78b)$$

where the disturbance-estimation equations (0-78a) and (0-78b) can be implemented by one of skill in the art using a Conventional Estimation Scheme whose details are available in the open technical literature.

The value of the IMES Gain Matrix $L_{IMES}$ can be determined via trial-and-error approaches, where successive guesses for the matrix elements are produced until a set of element that successfully identifies the states in a reasonable span of time is identified. The trial-and-error method is particularly useful when a Model System and the IMES can be coded in a computer and the effect of trial values for the element matrix is evaluated via computer simulation.

In the preferred embodiment, the IMES Gain Matrix $L_{IMES}$ can be obtained by defining the IMES State Matrix $$A_{IMES}=A-L_{IMES}C \qquad (0\text{-}79)$$

and then selecting the values of the elements of the matrix $L_{IMES}$ in a fashion that forces the eigenvalues of $A_{IMES}$ to adopt specified values. This approach is known in the literature as eigenvalue placement. In the preferred embodiment, the eigenvalues are chosen to be real, positive, and smaller than unity.

In another embodiment, the IMES Gain Matrix $L_{IMES}$ can be determined by first constructing the IMES Equivalent Estimator $$\begin{bmatrix} \hat{v}_1(k+1) \\ \hat{v}_2(k+1) \end{bmatrix} = (\overline{A}-K_v\overline{C})\begin{bmatrix} \hat{v}_1(k) \\ \hat{v}_2(k) \end{bmatrix} + \overline{B}\Delta u(k)+K_v(y(k)-y(k-1)) \qquad (0\text{-}80)$$

where $$\overline{A}=\begin{bmatrix} A+I & -A \\ I & 0 \end{bmatrix}, \overline{B}=\begin{bmatrix} B \\ 0 \end{bmatrix}, \overline{C}=[C \quad -C] \qquad (0\text{-}81)$$

and where $v_1(k)=x(k)$ and $v_2(k)=x(k-1)$. Then, values of the elements of the IMES Equivalent Gain Matrix $K_v$ can then be specified by requiring that it place the eigenvalues of the IMES Equivalent State Matrix $$\overline{A}_{IMES}=\overline{A}-K_v\overline{C} \qquad (0\text{-}82)$$

at specified values. Then, the entries of the IMES Gain Matrix $L_{IMES}$ are obtained from the top n rows of the IMES Equivalent Gain Matrix $K_v$.

In another embodiment the matrices A and B, required for the calculation of the IMES Gain Matrix $L_{IMES}$, are respectively obtained by a procedure of linearization of the right-hand side of the nonlinear state equation $x(k+1)=f_{nl}(x(k),u(k),d(k),k)$ and nonlinear output equation $y(k)=g_{nl}(x(k),u(k),p(k),k)$ using procedures that are well known to one of skill in the art.

In another embodiment, the IMES Gain Matrix is obtained following a standard Linear Quadratic Gaussian (LQG) technique, where the disturbances are assigned statistical properties. In another embodiment, the IMES Gain Matrix is obtained by processing the nonlinear state equation and the nonlinear output equation following a standard Extended Kalman Filter (EKF). The LQG and EKF methodologies should be well known to one of skill in the art.

MPC Controller Architecture

Figure 6:
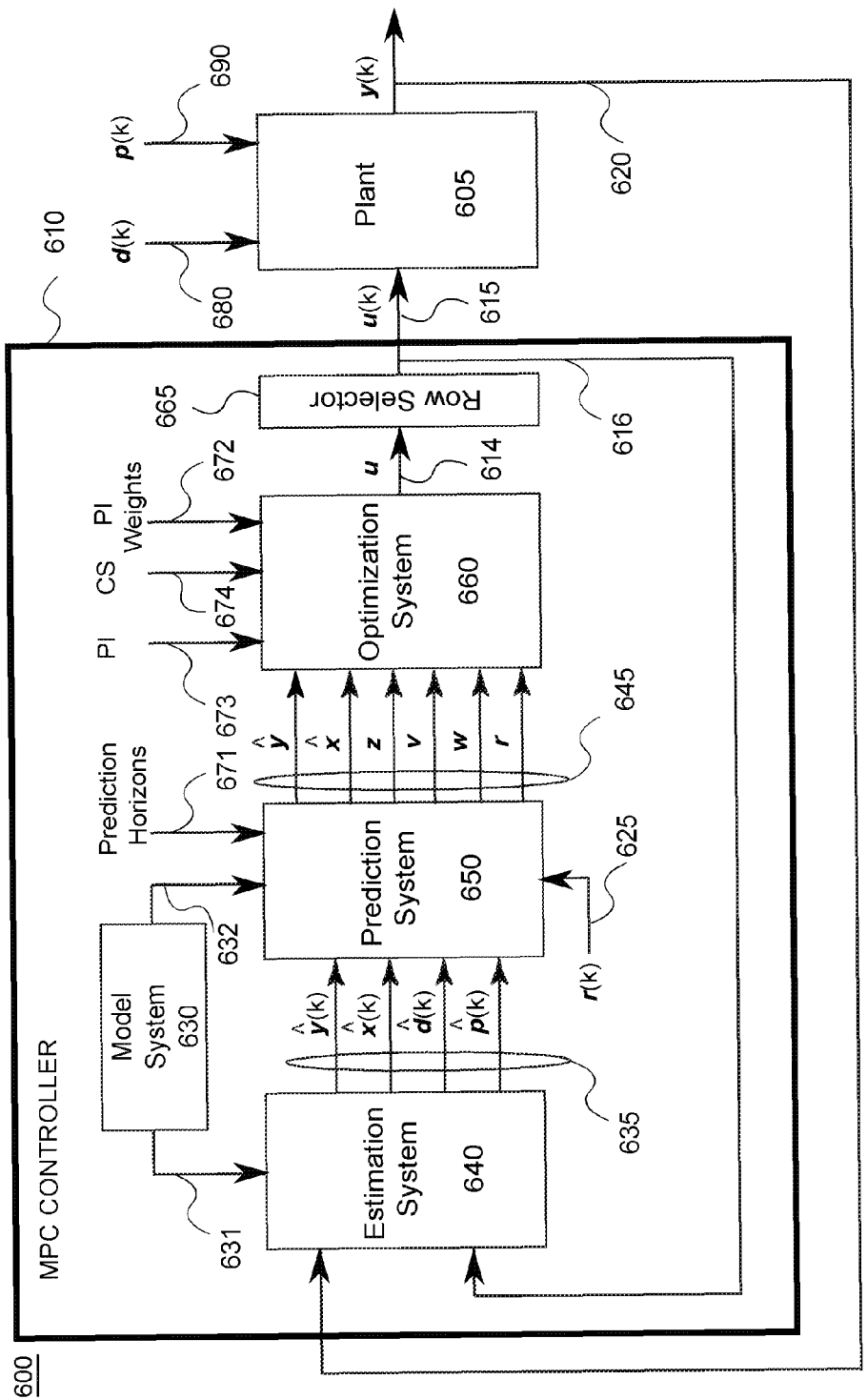
FIG. 6 is a signal-flow diagram illustrating interconnections among the systems that comprise an exemplary MPC controller architecture according to an embodiment.

FIG. 6 is a signal-flow diagram in a system 600 where an exemplary set of interconnections in the MPC Controller architecture of this disclosure and their relationship to the plant are shown for illustrative purposes. The figure shows that Plant 605 receives an input vector u(k), 615, and produces an output vector y(k), 620. The outputs produced by Plant 605 can be affected by the presence of state disturbances d(k), 680, and of output disturbances p(k), 690. For illustrative purposes, the figure shows the disturbances as external signals injected into the plant. In other embodiments one or more of the disturbance signals can appear as internal signals to the Plant 605. The exemplary MPC Controller 610 is comprised of a Model System 630, an Estimation System 640, a Prediction System 650, an Optimization System 660, and a Row Selector 695.

The Model System 630 in FIG. 6 establishes relationships between the outputs, inputs, states, state-disturbances, and output-disturbances. The information stored by MPC Controller 610 in the Model System 630 is made available to the Estimation System 640, as indicated by the connecting path 631. Estimation System 640 can utilize the measured output vector y(k), 620, and the signal path 616 to access the value of the current input vector u(k), 615, to produce one or more of the estimated-vector values 635, namely, a current state-estimate vector $\hat{x}(k)$, a current output-estimate vector $\hat{y}(k)$, a current state-disturbance-estimate vector $\hat{d}(k)$, and a current output-disturbance-estimate vector $\hat{p}(k)$. Estimation System 640 can adopt a modified version of the modeling relationships included in the Model System 630, for example, by modifying a Standard State Equation in the Model System 630 to convert it to an Incremental State Equation for use by Estimation System 640.

The information stored by MPC Controller 610 in the Model System 630 of FIG. 6 is also made available to the Prediction System 640, as indicated by the connecting path 632. The Prediction System 650 can receive MPC Parameters via path 671, such as the Prediction Horizons indicated in path 671 as an example, and can also receive current set-point information r(k), 625. In other embodiments of the MPC Controller 610, information stream 625 can also convey past and future values of the set-point vector. Stream 671 can also deliver to Prediction System 650 information about the MPC Constraint Set. The constraints and all other information available through the streams pointing into 650 can be processed by Prediction System 650 to produce one or more of the future-vector values 645, namely, a future-outputs vector $\hat{y}$, a future-states vector $\hat{x}$, a future first-integral-state vector z, a future second-integral-state vector w, and a future third-integral-state vector v. In other embodiments of the MPC Controller 610, the signal stream 645 can also include predictions of a future state-disturbance vector d and of a future output-disturbance vector p. Prediction System 650 can adopt a modified version of the modeling relationships included in the Model System 630, for example, by modifying a Standard State Equation in the Model System 630 to convert it to an Incremental State Equation for use by Prediction System 650.

The Optimization System 660 in FIG. 6 can receive from MPC Controller 610 values of MPC Parameters via path 672, such as the Performance Index (PI) weights indicated in 672 as an example, can receive information about the Performance Index 673, and can receive information about the Constraint Set (CS) 674. Optimization System 660 can utilize the future-vector predictions 645 provided by the Prediction System 650 to execute the minimization of the PI, 673, subject to the constraint set CS, 674, and generate the optimal vector of future inputs u, 614. In other embodiments of MPC Controller 610, the Optimization System 660 generates the optimal vector of current-and-future input-increments Δu, which can be unambiguously transformed to a corresponding optimal vector of future inputs. For illustration purposes, the arrows in the streams 645 in FIG. 6 are shown as pointing in only one direction. In other embodiments of MPC Controller 610, the Optimization System may make frequent information-inquiries to Prediction System 650 to retrieve future-vector predictions, as needed to satisfy the needs of specific optimization routines executed by Optimization System 660; thus the arrows in stream 645 can point in both directions as dictated by specific embodiment of MPC Controller 610.

The Row Selector 665 in FIG. 6 can extract the top p rows of the current-and-future input-vector u, 614, to produce the current input vector u(k), 615, which is delivered to the actuators in Plant 605 at instant k. In other embodiments, at instant k Row Selector 665 can extract more than p rows from current input vector 615, to also produce the one-step-ahead input vector u(k+1) (not shown in the figure), the two-step-ahead input vector u(k+2) (not shown in the figure), and so on, which can in turn be respectively delivered to the actuators of Plant 605 at instants k+1, k+2, and so on over a given period of time over which no recalculation of the current-and-future input vector is done. In the latter embodiment MPC Controller 610 can be said to be operating in open-loop mode. When the optimal current-and-future input vector u is produced by the Optimization System in the form of a product of a gain matrix times a given vector, then the Row Selector can be used to extract a number of rows from the gain matrix so that the product of the matrix of extracted rows times the given vector produces the optimal current input vector u(k).

The MPC Controller 610 represented in FIG. 6 can be configured using one of four techniques selected to achieve zero-offset tracking of step, ramp, or parabolic set-point trajectories. MPC Technique I delivers offset-free tracking of a step or a constant set point, and includes a prediction model that makes use of an integral state created by MPC Controller 610. MPC Technique II also delivers offset-free performance with respect to constant or step set points, but instead of computing the evolution of an integral state, MPC Controller 610 adopts a Prediction System 650 that uses an Incremental State Equation to produce vectors of future states and adopts an Optimization System 660 that includes a nonzero increment-input weight matrix in a Performance index of the type (0-39a). MPC Technique III incorporates the essential features of Methods I and II, and can track without offset set points of a ramp type. Finally, MPC Technique IV is an extension of MPC Technique I where second and third integral states are adopted for the purpose of respectively following without error the ramp and parabolic set point trajectories. All four techniques can also maintain zero-offset performance when Plant 605 is subjected to the presence of constant state and input disturbances.

FIG. 7 illustrates a hardware configuration that can be used to deploy the MPC Controller whose functional components are shown in the block diagram of FIG. 6. The Processor 720 of FIG. 7 receives values of the output vector of Plant 605 through communication with various Measurement Sensors 710. The Processor 720 receives values of the input vector to Plant 605 through communications with various actuators that can broadcast such information, or from accessing values of the input vector saved in Storage 730. Processor 720 can implement all the operations required to implement the functions and services of MPC Controller 610, including, the functions of Model System 630, Estimation System 640, Prediction System 660, and Row Selector 685. Processor 720 can access model parameters, MPC parameters and other look-up data housed in Storage 730.

MPC Technique I

Figure 2:
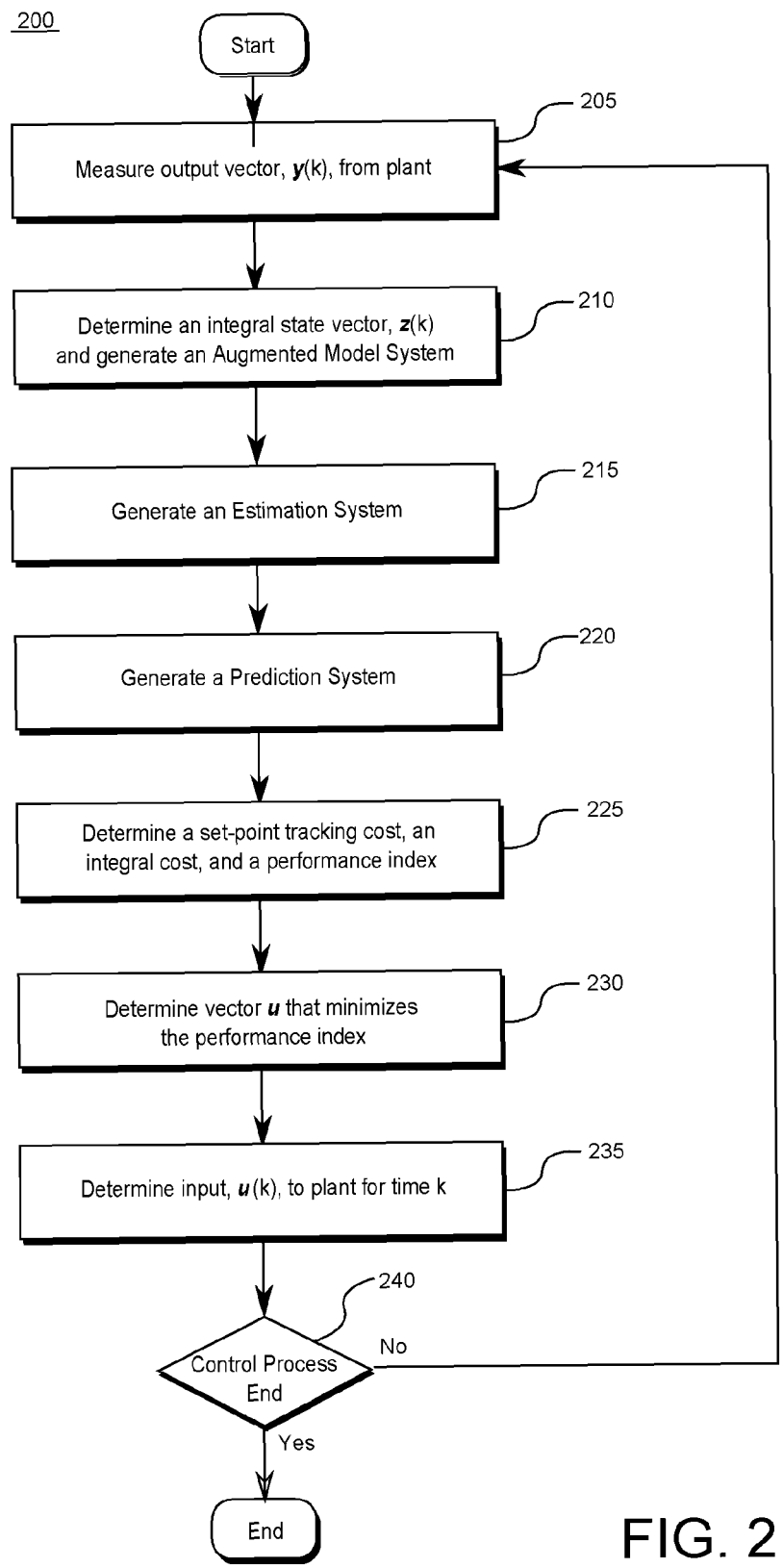
FIG. 2 is a flow diagram illustrating an exemplary MPC Technique I according to an embodiment.

According to an embodiment described herein as MPC Technique I, an MPC Controller 110 can be configured to implement a predictive control technique that utilizes integral-state vectors and integral-state costs. FIG. 2 is a flow diagram illustrating a process flow 200 for MPC Controller 110 utilizing MPC Technique I. This disclosure includes two base-case embodiments of MPC Technique I. The first one, denoted as MPC Technique IA, can be used when the states are measured. The second, denoted as MPC Technique IB, can be used when the states are not measured but can be estimated.

a) MPC Technique IA: Measured States

MPC Technique IA can be used when the states are measured. MPC Controller 110 can implement a process according to Technique IA that includes steps 205-235 carried out at the instant indicated by the time index k. The technique proceeds as described below.

MPC Controller 110 measures the current output vector y(k) from Plant 105, in step 205. MPC Controller 110 can construct a first-integral-state vector using the integral state equation $$z(k+1) = z(k) + r(k) - y(k) \tag{I-1}$$

where z(k) is the current first-integral-state vector, and in step 210 can generate an Augmented Model System 130 for Plant 105. The Augmented Model System 130 can consist of the matrices A, B, and C, and the equations $$x(k+1) = Ax(k) + Bu(k) + d(k) \tag{I-2}$$

$$z(k+1) = z(k) + r(k) - y(k) \tag{I-3}$$

$$y(k) = Cx(k) + p(k) \tag{I-4}$$

In step 215, MPC Controller 110 can generate an Estimation System 140 to produce an estimate of the value of the state vector. Estimation System 140 can assign to the current state-estimate vector $\hat{x}(k)$ the value of the current state vector x(k) produced by sensor instruments located in Plant 105, or Estimation System 140 can assign to the current state-estimate vector $\hat{x}(k)$ the value of the current state vector obtained by solving equation (I-4) for x(k) using available measurements of the current output vector y(k) and of the current output-disturbance vector p(k).

In step 220, MPC Controller 110 generates a Prediction System 150 for Plant 105. MPC Controller 110 can utilize the equations (I-1) to (I-4) comprising Model System 130 to produce the following equations that comprise a Prediction System 150:

$$\hat{x}(k+j) = A\hat{x}(k+j-1) + Bu(k+j-1) \tag{I-5}$$

$$z(k+j) = z(k+j-1) + r(k+j-1) - \hat{y}(k+j-1) \tag{I-6}$$

$$\hat{y}(k+j) = C\hat{x}(k+j) \tag{I-7}$$

for values of the time-shift index j=1, 2, . . . , $N_p$, where $\hat{y}(k) = y(k)$, and where $u(k+j) = u(k+N_c-1)$ for $j = N_c, N_c+1, \ldots, N_p-1$.

MPC Controller 110 determines a tracking-error cost term, a quadratic first-integral-state cost term, and an MPC Performance Index, in step 225. MPC Controller 110 can define the tracking-error cost term $$C_T(k) = \sum_{j=1}^{N_p} [r(k+j) - \hat{y}(k+j)]^T Q [r(k+j) - \hat{y}(k+j)] \tag{I-8}$$

where Q is the tracking-error weight matrix, the quadratic first-integral-state cost term $$C_I(k) = \sum_{j=1}^{N_p} z(k+j)^T Z z(k+j) \tag{I-9}$$

where Z is the quadratic first-integral weight matrix, and the MPC Performance Index is $$PI_I(k) = C_T(k) + \sum_{j=0}^{N_p-1} u(k+j)^T R u(k+j) + C_I(k) \tag{I-10}$$

where the summation that includes the quadratic input weight matrix R is referred to as the quadratic input cost term.

In step 230, the Optimization System 160 of MPC Controller 110 determines the vector u that minimizes the MPC Performance Index (I-10). The Optimization System 160 of MPC Controller 110 can solve the following optimization operation:

$$u = \mathrm{argmin}\, PI_I(k) \tag{I-11}$$

subject to the equations (I-5)-(I-7) of the Prediction System 150, and subject to the constraint restrictions $$\{\hat{x}, u, \Delta u, \hat{y}\} \in CS \tag{I-12}$$

where the expression (I-11) represents the following statement: find the current-and-future input vector solution u that minimizes the value of the MPC Performance Index $PI_I(k)$. The vectors $\hat{x}$, u, $\Delta u$, and $\hat{y}$ appearing in (I-12) are defined as indicated in equations (0-10)-(0-13).

MPC Controller 110 determines current input vector u(k) to Plant 105 at instant k, and sends the current input vector signal u(k) to Plant 105, in step 235. MPC Controller 110 can extract vector u(k) from the top p rows of the current-and-future vector solution u, and MPC Controller 110 can deploy the current input vector u(k) at instant k as the input to Plant 105. MPC Controller 110 can utilize Row Selector 665 shown in FIG. 6 to perform required row-extraction operations.

At the next sampling instant, MPC Controller 110 determines if the control process of Plant 105 is at an end, in step 240. If the control process is not at an end, MPC controller repeats steps 205-235.

MPC Technique I can ensure the tracking of an arbitrary set-point sequence in a fashion that ensures zero offset in the case where the set-point sequence has a constant final value. In addition, MPC Technique I can deliver disturbance rejection leading to zero offset in the presence of constant measured or unmeasured state-disturbances and/or output-disturbances.

All weights used in the performance index can be time varying. For example, the tracking-error cost term (I-8) can be written in the summation form $$C_T(k) = \sum_{j=1}^{N_p} [r(k+j) - \hat{y}(k+j)]^T Q(k+j)[r(k+j) - \hat{y}(k+j)] \quad \text{(I-12a)}$$

where the argument k+j appearing in Q(k+j) is introduced to indicate that the matrix can adopt different values as a function of time. When the tracking-cost term (I-12a) is written in the more compact and equivalent vector-matrix form $$C_T(k) = [r - \hat{y}]^T Q_a(k+j)[r - \hat{y}] \quad \text{(I-12b)}$$

which avoids the use of the summation symbol and that puts (I-8) in a form compatible with the MPC Performance Index (0-39a), it is understood that the augmented quadratic tracking-error weight matrix can be of the time-varying form $$Q_a = \text{diag}(Q(k+1), Q(k+2), \ldots, Q(k+N_p-1), Q(k+N_p)) \quad \text{(I-12c)}$$

In the remainder of this disclosure it is assumed that all the weight matrices and vectors in the performance index can be time-varying matrices, even when the notation adopted to represent one or more of such weights does not explicitly include the argument k+j appearing next to the weight.

One of skill in the art can recognize that the MPC Performance Index (I-10) can be written in the form of MPC Performance Index (0-39a) by using the equivalent matrix-vector notation $$PI_f(k) = (r - \hat{y})^T Q_a (r - \hat{y}) + u^T R_a u + z^T Z_a z$$

where $Q_a = \text{diag}(Q, Q, \ldots, Q, Q)$, $R_a = \text{diag}(R, R, \ldots, R, R)$, and $Z_a = \text{diag}(Z, Z, \ldots, Z, Z)$.

Analytical Control Policy for Unconstrained MPC Technique IA

In one exemplary embodiment of MPC Technique IA utilized by MPC Controller 110 the following conditions are met: the system-model matrices A, B, and C are constant, the weight matrices Q, R and S are also constant, and the constraint set condition (I-12) is ignored thus defining an unconstrained predictive control operation.

Given that the constraints are not active in this case, the predicted future values of the state can be obtained by recursive substitution from the state equations of the Prediction System 150 defined in (I-5) to yield the expression $$\begin{bmatrix} \hat{x}(k+1) \\ \hat{x}(k+2) \\ \vdots \\ \hat{x}(k+N_c-1) \\ \hat{x}(k+N_c) \\ \hat{x}(k+N_c+1) \\ \vdots \\ \hat{x}(k+N_p) \end{bmatrix} = \begin{bmatrix} A \\ A^2 \\ \vdots \\ A^{N_c-1} \\ A^{N_c} \\ A^{N_c+1} \\ \vdots \\ A^{N_p} \end{bmatrix} \hat{x}(k) + \quad \text{(I-13)}$$

$$\begin{bmatrix} B & 0 & \cdots & 0 & 0 \\ AB & B & \cdots & 0 & 0 \\ \vdots & \vdots & \ddots & \vdots & \vdots \\ A^{N_c-1}B & A^{N_c-2}B & \cdots & B & 0 \\ A^{N_c}B & A^{N_c-1}B & \cdots & AB & B \\ A^{N_c+1}B & A^{N_c}B & \cdots & A^2B & \sum_{i=0}^{1} A^i B \\ \vdots & \vdots & \ddots & \vdots & \vdots \\ A^{N_p-1}B & A^{N_p-2}B & \cdots & A^{N_p-N_c+1}B & \sum_{i=0}^{N_p-N_c} A^i B \end{bmatrix}$$

$$\begin{bmatrix} u(k) \\ u(k+1) \\ \vdots \\ u(k+N_c-2) \\ u(k+N_c-1) \end{bmatrix}$$

which makes use of the control-horizon convention that specifies that $u(k+j) = u(k+N_c-1)$ for values of the time-shift index $j = N_c, N_c+1, \ldots, N_p-1$.

Now the vector of predicted future values of the output is obtained by combining (I-13) with the output equations (I-7) of the Prediction System 150 to yield $$\begin{bmatrix} \hat{y}(k+1) \\ \hat{y}(k+2) \\ \vdots \\ \hat{y}(k+N_c-1) \\ \hat{y}(k+N_c) \\ \hat{y}(k+N_c+1) \\ \vdots \\ \hat{y}(k+N_p) \end{bmatrix} = \begin{bmatrix} CA \\ CA^2 \\ \vdots \\ CA^{N_c-1} \\ CA^{N_c} \\ CA^{N_c+1} \\ \vdots \\ CA^{N_p} \end{bmatrix} \hat{x}(k) + \quad \text{(I-14)}$$

$$\begin{bmatrix} CB & 0 & \cdots & 0 & 0 \\ CAB & CB & \cdots & 0 & 0 \\ \vdots & \vdots & \ddots & \vdots & \vdots \\ CA^{N_c-1}B & CA^{N_c-2}B & \cdots & CB & 0 \\ CA^{N_c}B & CA^{N_c-1}B & \cdots & CAB & CB \\ CA^{N_c+1}B & CA^{N_c}B & \cdots & CA^2B & C\sum_{i=0}^{1} A^i B \\ \vdots & \vdots & \ddots & \vdots & \vdots \\ CA^{N_p-1}B & CA^{N_p-2}B & \cdots & CA^{N_p-N_c+1}B & C\sum_{i=0}^{N_p-N_c} A^i B \end{bmatrix}$$

$$\begin{bmatrix} u(k) \\ u(k+1) \\ \vdots \\ u(k+N_c-2) \\ u(k+N_c-1) \end{bmatrix}$$

Analogously, recursive substitutions on the integral-state equation (I-6) of the Prediction System 150 yield the vector of predicted future values for the future first-integral-state vector $$\begin{bmatrix} z(k+1) \\ z(k+2) \\ z(k+3) \\ \vdots \\ z(k+N_p-1) \\ z(k+N_p) \end{bmatrix} = \begin{bmatrix} I \\ I \\ I \\ \vdots \\ I \\ I \end{bmatrix}(z(k)+r(k)-\hat{y}(k))+ \quad \text{(I-15)}$$

$$\begin{bmatrix} 0 & 0 & 0 & \cdots & 0 & 0 \\ I & 0 & 0 & \cdots & 0 & 0 \\ I & I & 0 & \cdots & 0 & 0 \\ \vdots & \vdots & \vdots & \ddots & \vdots & \vdots \\ I & I & I & \cdots & 0 & 0 \\ I & I & I & \cdots & I & 0 \end{bmatrix}(r-\hat{y})$$

Equations (I-14) and (I-15) can be rewritten in the compact vector-matrix form $$\hat{y}=C_I\hat{x}(k)+D_I u \quad \text{(I-16)}$$

$$z=M_I[z(k)+r(k)-y(k)]+N_I(r-\hat{y}) \quad \text{(I-17)}$$

where matrices bearing the subscript I are the MPC Structural Matrices defined in equations (0-40), (0-41), and (0-43).

Next, the MPC Performance Index (I-10) is also expressed in vector-matrix form, replacing the summations terms in (I-10), yielding $$PI_I(k)=(r-\hat{y})^T Q_a(r-\hat{y})+u^T R_a u+z^T S_a z \quad \text{(I-18)}$$

where $$Q_a=\text{diag}(Q, Q, \ldots, Q, Q) \quad \text{(I-19)}$$

$$R_a=\text{diag}(R, R, \ldots, R, R) \quad \text{(I-20)}$$

and $$Z_a=\text{diag}(Z, Z, \ldots, Z, Z) \quad \text{(I-21)}$$

are block-diagonal matrices of appropriate dimensions. Substituting (I-16) and (I-17) into (I-18) leads to the following form for the MPC Performance Index for MPC Technique I:

$$PI_I(k)=[r-C_I\hat{x}(k)-D_I u]^T Q_a[r-C_I\hat{x}(k)-D_I u]+u^T R_a u+[M_I(z(k)+r(k)-y(k))+N_I(r-C_I\hat{x}(k)-D_I u)]^T Z_a \times [M_I(z(k)+r(k)-y(k))+N_I(r-C_I\hat{x}(k)-D_I u)] \quad \text{(I-22)}$$

Now the unconstrained optimization operation (I-11) can be solved by the Optimization System 160 of MPC Controller 110 by executing the following operations: (a) taking the derivative of the MPC Performance Index given in equation (I-18) with respect to the vector u, (b) equating the result to zero, (c) solving the resulting equation for the current-and-future input vector u, and (d) using Row Selector 665 for extracting the top p rows of the current-and-future vector solution u to obtain the elements of the current input vector u(k). These operations yield the following input-manipulation law that we call *Exemplary Analytical Control Policy for Unconstrained MPC Technique IA:*

$$u(k)=(k_I^T+k_z^T N_I)[r-C_I\hat{x}(k)]+k_z^T M_I[z(k)+r(k)-y(k)] \quad \text{(I-23)}$$

where the gain submatrix $k_I^T$ is defined as the top p rows of the gain matrix $$K_I=[D_I^T(Q_a+N_I^T Z_a N_I^T)D_I+R_a]^{-1}D_I^T Q_a \quad \text{(I-24)}$$

and the gain submatrix $k_z^T$ is defined as the top p rows of the gain matrix $$K_z=[D_I^T(Q_a+N_I^T Z_a N_I^T)D_I+R_a]^{-1}D_I^T N_I^T Z_a \quad \text{(I-25)}$$

MPC Controller 110 can utilize Row Selector 665 to perform required row-extraction operations from the gain matrices (I-24) and (I-25).

MPC Controller 110 determines current input vector u(k) to Plant 105 at instant k and sends the current input vector signal u(k) to Plant 105, in step 235. MPC Controller 110 can determine the value of the current input vector u(k) utilizing the unconstrained analytical control policy (I1-23), and MPC Controller 110 can deploy the current input vector u(k) at instant k as the input signal to the Plant 105.

MPC Controller 110 can utilize the unconstrained predictive control policy (I-23) and apply it to the Plant 105, producing offset-free outputs when the dynamics of Plant 105 follow the disturbance-free model (0-3) and (0-4). Furthermore, the MPC Controller 110 can utilize the unconstrained predictive control policy (I-23) to also deliver offset-free output behavior when the dynamics of Plant 105 follow the disturbance-affected model (0-5) and (0-6), even though the MPC design procedure 200 of MPC Technique I leading to the control policy (I-23) is executed using a Model System 130 and a Prediction System 150 that did not include in an explicit fashion the presence of state disturbances and output disturbances.

Additional conditions that must be met in order to realize offset-free performance when predictive controller 110 implements control policy (I-23) are well known to one skilled in the art, and they include the requirement that the set-point and the disturbances have constant final values, that no constraints are active at steady state, that the state-space system (I-2) is controllable, and that the unconstrained control policy (I-23) stabilizes the closed loop when the dynamics of Plant 105 are given by equations (0-3) and (0-4). Another well-known condition is that the states must meet standard state observability criteria that ensure that the effects of changes in the values of the states are adequately reflected as corresponding changes in the value of the MPC Performance Index. The user-specified prediction and control horizons as well as the cost-weight matrices for MPC Controller 110 can be adjusted until a stabilizing control policy is obtained. The additional conditions for offset-free performance identified in this paragraph, as well as other conditions that are obvious to those of skill in the art, are applicable to all the MPC control techniques and control policies disclosed.

b) MPC Technique IB: Estimated States

MPC Technique IB can be used when the states are estimated. MPC Controller 110 can implement a process according to Technique IB that includes steps 205-235 carried out at the instant indicated by the time index k. The technique proceeds as described below.

MPC Technique I is modified to incorporate the estimation of state, input and output disturbance vectors, as indicated in the following scheme hereafter referred to as *Exemplary Analytical Control Policy for Unconstrained MPC Technique IB*. The exemplary technique is developed for the case where all disturbances are constants, a scenario of primary interest when the objective is to obtain zero-offset performance under the presence of asymptotically constant disturbances.

MPC Controller 110 measures the current output vector y(k) from Plant 105, in step 205. MPC Controller 110 can construct the current first-integral-state vector z(k) using the integral state equation $$z(k+1)=z(k)+r(k)-y(k) \quad \text{(I-26)}$$

and in step 210 can generate an Augmented Model System 130 for Plant 105. The Augmented Model System 130 can consist of the matrices A, B, and C, and the equations $$x(k+1) = Ax(k) + Bu(k) + d(k) \quad (I-27)$$

$$z(k+1) = z(k) + r(k) - y(k) \quad (I-28)$$

$$d(k+1) = d(k) \quad (I-29)$$

$$p(k+1) = p(k) \quad (I-30)$$

$$y(k) = Cx(k) + p(k) \quad (I-31)$$

In step 215, MPC Controller 110 can generate an Estimation System 140 to produce an estimate of the value of the state vector. MPC Controller 110 can estimate the state, state disturbance, and output disturbance vectors using the Estimation System 140 defined by the Conventional Estimation equations $$\hat{x}(k+1) = A\hat{x}(k) + Bu(k) + L_x[y(k) - C\hat{x}(k) - \hat{p}(k)] \quad (I-32)$$

$$\hat{d}(k+1) = \hat{d}(k) + L_d[y(k) - C\hat{x}(k) - \hat{p}(k)] \quad (I-33)$$

$$\hat{p}(k+1) = \hat{p}(k) + L_p[y(k) - C\hat{x}(k) - \hat{p}(k)] \quad (I-34)$$

where $\hat{x}(k)$ is the current state-estimate vector.

In step 220, MPC Controller 110 generates a Prediction System 150 for Plant 105. MPC Controller 110 can utilize the equations (I-27) to (I-31) comprising Model System 130 to produce the following equations that comprise a Prediction System 150:

$$\hat{x}(k+j) = A\hat{x}(k+j-1) + Bu(k+j-1) + \hat{d}(k) \quad (I-35)$$

$$z(k+j) = z(k+j-1) + r(k+j-1) - \hat{y}(k+j-1) \quad (I-36)$$

$$\hat{y}(k+j) = C\hat{x}(k+j) + \hat{p}(k) \quad (I-37)$$

for values of the time-shift index $j=1, 2, \ldots, N_p$, where $\hat{y}(k) = y(k)$, and where $u(k+j) = u(k+N_c-1)$ for $j=N_c, N_c+1, \ldots, N_p-1$.

MPC Controller 110 determines a tracking-error cost term, a first-integral-state cost term, and an MPC Performance Index, in step 225. MPC Controller 110 can define the tracking-error cost term $$C_T(k) = \sum_{j=1}^{N_p} [r(k+j) - \hat{y}(k+j)]^T Q [r(k+j) - \hat{y}(k+j)] \quad (I-38)$$

the first-integral-state cost term $$C_I(k) = \sum_{j=1}^{N_p} z(k+j)^T Z z(k+j) \quad (I-39)$$

and the MPC Performance Index $$PI_I(k) = C_T(k) + \sum_{j=0}^{N_p-1} u(k+j)^T R u(k+j) + C_I(k) \quad (I-40)$$

where Q is the quadratic tracking-error weight matrix, Z is the first-integral-state weight matrix, and R is the input weight matrix.

In step 230, the Optimization System 160 of MPC Controller 110 determines the vector u that minimizes the MPC Performance Index (I-40). The Optimization System 160 of MPC Controller 110 can solve the following optimization operation:

$$u = \text{argmin } PI_I(k) \quad (I-41)$$

subject to the equations (I-35)-(I-37) of the Prediction System 150, and subject to the constraint restrictions $$\{\hat{x}, u, \Delta u, \hat{y}\} \in CS \quad (I-42)$$

where the expression (I-41) represents the following statement: find the current-and-future input vector solution u that minimizes the value of the MPC Performance Index $PI_I(k)$. The vectors $\hat{x}$, u, $\Delta u$, and $\hat{y}$ appearing in (0-49) are defined as indicated in equations (0-10)-(0-13).

MPC Controller 110 determines the current input vector u(k) to Plant 105 at instant k, and sends the current input vector u(k) to Plant 105, in step 235. MPC Controller 110 can use Row Selector 665 to extract the current input vector u(k) from the top p rows of the current-and-future input-vector solution u, and MPC Controller 110 can deploy the current input vector u(k) at instant k as the input to the Plant 105.

At the next sampling instant, MPC Controller 110 determines if the control process of Plant 105 is at an end, in step 240. If the control process is not at an end, MPC controller repeats steps 205-235.

Analytical Control Policy for Unconstrained MPC Technique IB

In one exemplary embodiment of MPC Technique IB with state estimation utilized by MPC Controller 110 the following conditions are met: the system matrices A, B, and C are constant, the cost-weight matrices Q, R, and S are also constant, and the constraint set condition (I-42) is ignored thus defining an unconstrained predictive control operation. Furthermore, state and output disturbances with final constant values are present in the Model System 130, as represented by the expressions (0-27) to (0-31), and, for the purposes of illustration of the technique, it is assumed that state values are calculated using the Estimation System 140 defined by the Conventional Estimation Scheme given in equations (0-32) to (0-34).

Given that the constraints are not active in this case, the predicted future values of the state can be obtained by recursive substitution from the state equations given in (I-35) of Prediction System 150 to yield the expression $$\begin{bmatrix} \hat{x}(k+1) \\ \hat{x}(k+2) \\ \vdots \\ \hat{x}(k+N_c-1) \\ \hat{x}(k+N_c) \\ \hat{x}(k+N_c+1) \\ \vdots \\ \hat{x}(k+N_p) \end{bmatrix} = \begin{bmatrix} A \\ A^2 \\ \vdots \\ A^{N_c-1} \\ A^{N_c} \\ A^{N_c+1} \\ \vdots \\ A^{N_p} \end{bmatrix} \hat{x}(k) + \quad (I-45)$$

$$\begin{bmatrix} B & 0 & \cdots & 0 & 0 \\ AB & B & \cdots & 0 & 0 \\ \vdots & \vdots & \ddots & \vdots & \vdots \\ A^{N_c-1}B & A^{N_c-2}B & \cdots & B & 0 \\ A^{N_c}B & A^{N_c-1}B & \cdots & AB & B \\ A^{N_c+1}B & A^{N_c}B & \cdots & A^2B & \sum_{i=0}^{1} A^i B \\ \vdots & \vdots & \ddots & \vdots & \vdots \\ A^{N_p-1}B & A^{N_p-2}B & \cdots & A^{N_p-N_c+1}B & \sum_{i=0}^{N_p-N_c} A^i B \end{bmatrix}$$

$$\begin{bmatrix} I \\ I \\ \vdots \\ I \\ I \\ \vdots \\ I \end{bmatrix} \hat{p}(k) + \begin{bmatrix} CB & 0 & \cdots & 0 & 0 \\ CAB & CB & \cdots & 0 & 0 \\ \vdots & \vdots & \ddots & \vdots & \vdots \\ CA^{N_c-1}B & CA^{N_c-2}B & \cdots & CB & 0 \\ CA^{N_c}B & CA^{N_c-1}B & \cdots & CAB & CB \\ CA^{N_c+1}B & CA^{N_c}B & \cdots & CA^2B & C\sum_{i=0}^{1} A^i B \\ \vdots & \vdots & \ddots & \vdots & \vdots \\ CA^{N_p-1}B & CA^{N_p-2}B & \cdots & CA^{N_p-N_c+1}B & C\sum_{i=0}^{N_p-N_c} A^i B \end{bmatrix}$$

$$\begin{bmatrix} u(k) \\ u(k+1) \\ \vdots \\ u(k+N_c-2) \\ u(k+N_c-1) \end{bmatrix}$$

Analogously, recursive substitutions on the integral-state equation (I-36) of Prediction System 150 yield future first-integral-state vector of a form identical to (I-15), namely $$z=\{M_I[z(k)+r(k)-y(k)]+N_I r\}-N_I \hat{y} \tag{I-47}$$

Equations (I-46) and (I-47) can be rewritten in the compact vector-matrix form $$\hat{y}=\{C_I \hat{x}(k)+E_I \hat{p}(k)+F_I \hat{d}(k)\}+D_I u \tag{I-48}$$

and $$z=\{M_I[z(k)+r(k)-y(k)]+N_I r\}-N_I \hat{y} \tag{I-49}$$

where matrices bearing the subscript I are the MPC Structural Matrices defined in equations (0-40)-(0-43).

Next, the MPC Performance Index (I-40) is also expressed in vector-matrix form as $$PI(k)=(r-\hat{y})^T Q_a (r-\hat{y})+u^T R_a u+z^T Z_a z \tag{I-50}$$

and then substituting (I-48) and (I-49) into (I-50) leads to the following form for the MPC Performance Index for MPC Technique I:

$$PI_I(k)=[r-C_I \hat{x}(k)-D_I u-E_I \hat{p}(k)-F_I \hat{d}(k)]^T Q_a [r-C_I \hat{x}(k)-D_I u-E_I \hat{p}(k)-F_I \hat{d}(k)]+u^T R_a u+[\{M_I[z(k)+r(k)-y(k)]+N_I r\}-N_I\{C_I \hat{x}(k)+E_I \hat{p}(k)+F_I \hat{d}(k)\}-N_I D_I u]^T Z_a \times [\{M_I[z(k)+r(k)-y(k)]+N_I r\}-N_I\{C_I \hat{x}(k)+E_I \hat{p}(k)+F_I \hat{d}(k)\}-N_I D_I u] \tag{I-51}$$

Now the unconstrained optimization operation (I-40) can be solved by the following algebraic and differential operations: (a) taking the derivative of the Performance Index given in equation (I-51) with respect to the vector u, (b) equating the result to zero, (c) solving the resulting equation for the current-and-future input vector u, and (d) using Row Selector 665 to extract the top p rows of the current-and-future input vector solution u to obtain the elements of the current input vector u(k). These operations yield the following input-manipulation law that we call Exemplary Analytical Control Policy for Unconstrained MPC Technique IB:

$$u(k)=(k_I^T+k_z^T N_I)[r-C_I \hat{x}(k)-E_I \hat{p}(k)-F_I \hat{d}(k)]+k_z^T M_I [z(k)+r(k)-y(k)] \tag{I-52}$$

where the gain submatrix $k_I^T$ is defined as the top p rows of the gain matrix $K_I$ given in equation (I-24), and $k_z^T$ is defined as the top p rows of the gain matrix $K_z$ given in equation (I-25).

Now the vector of predicted future values of the output is obtained by combining (I-45) with the output equations (I-37) of the Prediction System 150 to yield $$\begin{bmatrix} \hat{y}(k+1) \\ \hat{y}(k+2) \\ \vdots \\ \hat{y}(k+N_c-1) \\ \hat{y}(k+N_c) \\ \hat{y}(k+N_c+1) \\ \vdots \\ \hat{y}(k+N_p) \end{bmatrix} = \begin{bmatrix} CA \\ CA^2 \\ \vdots \\ CA^{N_c-1} \\ CA^{N_c} \\ CA^{N_c+1} \\ \vdots \\ CA^{N_p} \end{bmatrix} \hat{x}(k) + \begin{bmatrix} C \\ C\sum_{i=0}^{1} A^i \\ \vdots \\ C\sum_{i=0}^{N_c-2} A^i \\ C\sum_{i=0}^{N_c-1} A^i \\ C\sum_{i=0}^{N_c} A^i \\ \vdots \\ C\sum_{i=0}^{N_p-1} A^i \end{bmatrix} \hat{d}(k) + \begin{bmatrix} I \\ \sum_{i=0}^{1} A^i \\ \vdots \\ \sum_{i=0}^{N_c-2} A^i \\ \sum_{i=0}^{N_c-1} A^i \\ \sum_{i=0}^{N_c} A^i \\ \vdots \\ \sum_{i=0}^{N_p-1} A^i \end{bmatrix} \begin{bmatrix} u(k) \\ u(k+1) \\ \vdots \\ u(k+N_c-2) \\ u(k+N_c-1) \end{bmatrix} \quad \text{(I-46)}$$

MPC Controller 110 determines the current input vector u(k) to Plant 105 at instant k and sends the current input vector u(k) to Plant 105, in step 235. MPC Controller 110 can determine the value of the current input vector u(k) utilizing the unconstrained analytical control policy (I-52), and MPC Controller 110 can deploy the current input vector u(k) at instant k as the input to the Plant 105.

MPC Controller 110 can utilize the unconstrained predictive control policy with state estimation (I-52) and apply it to the Plant 105, producing offset-free outputs when the dynamics of Plant 105 follow the disturbance-free expressions (0-3) and (0-4). Furthermore, the MPC Controller 110 can utilize the unconstrained predictive control policy (I-52) to also deliver offset-free output behavior when the dynamics of Plant 105 follow the disturbance-affected expressions (0-5) and (0-6).

The relationships $\hat{d}(k)=0$ and $\hat{p}(k)=0$ are applicable when the Estimation System 140 is not configured to produce estimates of the state and output disturbances, and when these zero identities are used in equation (I-52), equation (I-52) reduces to the Exemplary Analytical Control Policy for Unconstrained MPC Technique IA given in equation (I-23).

c) Other Embodiments of MPC Technique I

The description of MPC Technique I and its analytical variations MPC Technique IA and MPC Technique IB are exemplary embodiments, and are given in sufficient detail so that those skilled in the art can be enabled to practice these embodiments. It will be apparent to one of skill in the art that other embodiments can be utilized, and that changes can be made without departing from the scope of this disclosure. A non-exhaustive discussion of modified embodiments is given below to better illustrate the interpretation and implementation of MPC Technique I in MPC Controller 110.

In a preferred embodiment, the cost-weight matrices Q, Z and R are diagonal, positive-definite matrices. If some of the diagonal entries of matrix Q are set to zero, thus making the matrix positive semidefinite, specific outputs associated with the zero entries of the matrix can develop undesirable offset. Furthermore, matrix S must be such that each element of the current first-integral-state vector z(k) can have an effect on the MPC Performance Index $PI_f$. If some of the diagonal entries of matrix Z are set to zero, thus making the matrix positive semidefinite, specific outputs associated with the zero entries of the matrix can develop undesirable offset. The cost-weight matrices can adopt particular values that are highly dependent on the dynamics of the specific Plant 105, hence defining alternative embodiments of the technique. In other embodiments, the matrices can be chosen to have a nondiagonal structure, and/or to change their value in time. In other embodiments the weight matrices are time-varying, and their dependence on time can be represented through the notation Q(k), Z(k), and R(k), for example.

Several possible embodiments are obtained through design choices regarding the management of the prediction and control horizons in the predictive control process utilized by MPC Controller 110. The prediction horizon $N_p$ can be allowed to adopt positive values, including an infinitely large value in the case of an infinite-horizon scheme. The control horizon $N_c$ can be allowed to adopt positive values that are normally smaller than $N_p$. The lower limits of all the summations appearing in the performance-index expressions (I-8)-(I-10) are indicated in the disclosure as j=1 only for succinctness of exposition, since in embodiments a lower limit of the form $j=j_p$ for the prediction-horizon summations, or of the form $j=j_c$ for the control-horizon summations can be used, where both $j_p$ and $j_c$ are allowed to have values greater than unity. In another embodiment the lower-limit for the prediction horizon or for the control horizon can be implemented by making the weight matrices and weight vectors be time-varying, and defining them such that they are equal to zero at all instants that correspond to prediction instances that are smaller than the lower limits. In another embodiment, the values of the prediction and control horizons can be changed at every sampling instant, hence defining time-dependent horizons $N_p(k)$ and $N_c(k)$.

In another exemplary embodiment, the constraint set CS defined by the relationships (0-18)-(0-21) can be modified by excluding some or all of the relationships from the set. Alternatively, the set CS can be expanded to include other relationships of relevance to the Plant 105 being controlled. Examples of additional relationships include bilinear, quadratic, integral, and general nonlinear equalities and inequalities. Other embodiments include constraint relaxation strategies where MPC Controller 110 is allowed to violate some or all the equality or inequalities in CS in a temporary or permanent fashion.

Additional embodiments of MPC Technique I utilized by MPC Controller 110 can be realized by allowing the Optimization System to adopt alternative numerical methods for solving the constrained optimization operation, such as sequential quadratic programming, interior-point methods, linear matrix-inequalities, global numerical or symbolic optimization techniques, branch-and-bound techniques, Nealder-Meade searches, computer-aided symbolic manipulations, etc.

Additional embodiments of MPC Technique I utilized by MPC Controller 110 can be realized by implementing in the Estimation System 140 linear and/or nonlinear state-estimation techniques that incorporate heuristics, theoretical developments, available experience with Plant 105, and known or partially known dynamics of the state and output disturbances.

In embodiments where no other information about the disturbance is available, then for the purposes of prediction the disturbance $\hat{d}(k+j)$ can be assumed to be constant at future instants $j=1, 2, \ldots, N_p$, and equal to its estimated value $\hat{d}(k)$ at instant k. An analogous assumption can be made about the disturbance $\hat{p}(k)$.

In an another embodiment, MPC Controller 110 can be implemented to avoid state-estimation operations by producing the predicted values $\hat{y}(k), \hat{y}(k+1), \ldots, \hat{y}(k+N_p)$ needed to deploy MPC Technique I using an equivalent input-output Model System 130 that does not include state variables. For example, for the purpose of prediction of future outputs the state-space Model System 130 comprised of the equations (I-2)-(I-4) can be replaced by an equivalent input-output model $$y(k)=G(q)u(k) \qquad (I-53)$$

where q is the forward-shift operator and where G(q) can be a rational transfer function of the form $$G(q)=C[qI-A]^{-1}Bu(k) \qquad (I-54)$$

or an impulse response transfer function of the form $$G(q) = \sum_{m=1}^{N_m} H_m u(k-m) \qquad (I-55)$$

where $H_m$ represents a matrix of impulse-response coefficients, or a step-response transfer function of the form $$G(q) = \sum_{m=1}^{N_m} S_m \Delta u(k-m) \qquad (I-56)$$

where $S_m$ represents a matrix of impulse-response coefficients. Other input-output models that can be used in MPC Controller 110 include, for example, general time-series models, neural-networks models, piece-wise linear input-output models, fuzzy-logic models, data-driven models, etc.

In another embodiment, MPC Controller 110 can utilize a controlled output vector $y_c(k)$ that is required to follow the set-point trajectory, where the controlled outputs are a subset or a linear combination of the elements of the current output vector $y(k)$ as described by the controlled-output relationship $$y_c(k)=Ey(k) \qquad (I-57)$$

where E is a matrix that characterizes the relationship between the controlled output vector and the current output vector. In this case, MPC Technique I is applied with the following modifications: (a) modifying the tracking-error cost term to adopt the form $$C_T(k) = \sum_{j=1}^{N_p} [r(k+j) - \hat{y}_c(k+j)]^T Q [r(k+j) - \hat{y}_c(k+j)] \qquad (I-58)$$

and (b) pre-multiplying by matrix E all the equations of the Prediction System 150 that are specialized to the prediction of the j-step ahead output vectors $\hat{y}(k+j)$, and thus obtain predictors for the j-step ahead controlled output vector values $\hat{y}_c(k+j)$ for values of the time-shift index $j=1, 2, \ldots, N_p$, where $\hat{y}(k)=y(k)$ and $\hat{y}_c(k)=y_c(k)$.

In another embodiment of MPC Technique I, the Prediction System 150 is based on a standard state equation and an incremental output equation, and includes the prediction equation $$\hat{y} = \{E_I y(k) + [C_I - E_I C]\hat{x}(k) + F_I \hat{d}(k)\} + D_I u \qquad (I-59)$$

resulting in the analytical control policy for MPC Technique I $$u(k)=(k_I^T+k_z^T N_I)[r-(C_I-E_I C)\hat{x}(k)-E_I y(k)-F_I \hat{d}(k)] + k_z^T M_I [z(k)+r(k)-y(k)] \qquad (I-60)$$

where the gain submatrix $k_I^T$ is defined as the top p rows of the gain matrix $K_I$ defined in (I-23), and $k_z^T$ is defined as the top p rows of the gain matrix $K_z$ defined in (I-24).

In another embodiment of MPC Technique I, the Prediction System 150 is based on an incremental state equation and a standard output equation, and includes the prediction equation $$\hat{y}\{C_{II}^0 \hat{x}(k)+C_{II}\hat{x}(k-1)-D_{II}\Delta_1 u(k-1)+E_I \hat{p}(k)\}+D_{II}\Delta_0 u \qquad (I-61)$$

resulting in the analytical control policy for MPC Technique I $$u(k)=(k_{I\Delta}^T+k_{z\Delta}^T N_I)[r-C_{II}^0 \hat{x}(k)-C_{II}\hat{x}(k-1)+D_{II}\Delta_1 u(k-1)-E_I \hat{p}(k)]+k_{z\Delta}^T M_I[z(k)+r(k)-y(k)] \qquad (I-62)$$

where the gain submatrix $k_{I\Delta}^T$ is defined as the top p rows of the gain matrix $$K_{I\Delta}=[(D_{II}\Delta_0)^T(Q_a+N_I^T Z_a N_I)(D_{II}\Delta_0)+R_a]^{-1}(D_{II}\Delta_0)^T Q_a \qquad (I-63)$$

and where the gain submatrix $k_{z\Delta}^T$ is defined as the top p rows of the gain matrix $$K_{z\Delta}=[(D_{II}\Delta_0)^T(Q_a+N_I^T Z_a N_I)(D_{II}\Delta_0)+R_a]^{-1}(D_{II}\Delta_0)^T N_I^T Z_a \qquad (I-64)$$

and where matrices $\Delta_0$ and $\Delta_1$ are defined in equations (0-48) and (0-49). MPC Controller 110 can utilize Row Selector 665 to perform required row-extraction operations.

In another embodiment of MPC Technique I, the Prediction System 150 is based on an incremental state equation and an incremental output equation, and includes the prediction equation $$\hat{y}=\{C_{II}[\hat{x}(k)-\hat{x}(k-1)]-D_{II}\Delta_1 u(k-1)+E_I y(k)\}+D_{II}\Delta_0 u \qquad (I-65)$$

resulting in the analytical control policy for MPC Technique I $$u=(k_{I\Delta}^T+k_{z\Delta}^T N_I)[r-C_{II}(\hat{x}(k)-\hat{x}(k-1))+D_{II}\Delta_1 u(k-1)-E_I y(k)]+k_{z\Delta}^T M_I[z(k)+r(k)-y(k)] \qquad (I-66)$$

where the gain submatrix $k_{I\Delta}^T$ is defined as the top p rows of the gain matrix $K_{I\Delta}$ defined in equation (I-63), and the gain submatrix $k_{z\Delta}^T$ is defined as the top p rows of the gain matrix $K_{z\Delta}$ are defined in and (I-64), where matrices $\Delta_0$ and $\Delta_1$ are defined in equations (0-48) and (0-49).

In other embodiments, MPC Controller 110 can implement MPC Technique I for cases where the Prediction System 150 includes the equations:

$$\hat{x}=v_x+V_x u \qquad (I-67)$$

$$\hat{y}=v_y+V_y u \qquad (I-68a)$$

$$z=v_z-V_z \hat{y} \qquad (I-68b)$$

$$v=v_v-V_v \hat{y} \qquad (I-68c)$$

$$w=v_w-V_w \hat{y} \qquad (I-68d)$$

where vectors $v_y$, $v_x$, $v_z$, $v_v$, and $v_w$, and matrices $V_y$, $V_x$, $V_z$, $V_w$, and $V_v$ do not depend on the current-and-future input vector u, and can depend on the current, past, and future values other variables, including states, outputs, and disturbances, and where the Optimization System 160 includes the MPC Performance Index (0-39a), resulting in the following General Analytical Control Policy for MPC Technique I:

$$u=k^T\{V_y^T[Q_a(r-v_y)+V_z^T Z_a(v_c-V_z v_y)+V_w^T W_a(v_w-V_w v_y)+V_v^T V_a(v_v-V_v v_y)]+V_x^T[-x_a-X_a v_x]-F_a^T S_a f_a+\Delta_0^T T_a \Delta_1 u(k-1)-V_y^T q_a-\Delta d_0^T t_a-r_a\} \qquad (I-69)$$

where the gain submatrix $k^T$ is defined as the top p rows of the gain matrix $$K=\{V_y^T(Q_a+V_z^T Z_a V_z+V_w^T W_a V_w+V_v^T V_a V_v)V_y+V_x^T X_a V_x+F_a^T S_a F_a+\Delta_0^T T_a \Delta_0+R_a\}^+ \qquad (I-70)$$

where the superscript notation "+" denotes a generalized matrix-inverse operation, including the Moore-Penrose pseudoinverse matrix which is known to one of skill in the art. When the inverse-matrix exists, the generalized matrix inverse in (I-70) is equal to the inverse matrix. MPC Controller 110 can utilize Row Selector 665 to perform required row-extraction operations. Note that the output predictor equation (I-67) is a general form that can be adopted by future state vectors derived using a Standard State Space Equation. The General Analytical Control Policy for MPC Technique I (I-69) is also applicable to the case of MPC Technique IV.

In this disclosure we adopt the convention that a matrix inverse operation indicated through the notation $K^{-1}$, is to be interpreted as a pseudoinverse operation $K^+$, whenever the inverse matrix of K does not exist.

In another embodiment, the elements of the future set-point vector $$r = \begin{bmatrix} r(k+1) \\ r(k+2) \\ \vdots \\ r(k+N_p) \end{bmatrix} \quad (I\text{-}71)$$

used in the tracking-error cost term of the MPC performance indices described in this disclosure are kept constant and equal to the value of the current set-point vector through the assignment $$r(k+j)=r(k) \quad (I\text{-}72)$$

for values of the time-index shift $j=1, 2, \ldots, N_p$. Alternatively, the elements of the set-point vector (I-71) can be redefined as filtered versions of the current set-point vector and of future j-step-ahead set-point vector values, often done for the purpose of modifying the reference trajectory in a fashion that is conducive to less aggressive control action.

In other embodiments, MPC Controller 110 can set up the Predictor System 150 so that it produces predictions of the future values of states and outputs by executing computer simulations based on computer code that solves on linear or nonlinear state and output equations, or based on programs that emulate the mass, species, energy, momentum, entropy, and force balance equations of Plant 105. The computer programs that can be used include computer-based numerical and symbolic mathematical algorithms, for example.

In other embodiments, MPC Controller 110 can implement MPC Technique I to cases where the state and output equations of the Model System 130 are nonlinear. For example, the state equation of the nonlinear Model System 130 can be of the form $$x(k+1)=f_{nl}(x(k), u(k),k) \quad (I\text{-}73)$$

where $f_{nl}$ is a nonlinear function. In this case the technique is applied using the nonlinear equation (I-73) instead of the preferred linear state-space equation (I-2). Analogously, the preferred linear output equation (I-4) of the Model System 130 can be replaced by a nonlinear output equation of the form $$y(k)=g_{nl}(x(k), u(k),k) \quad (I\text{-}74)$$

or of the form $$y(k)=g_{nl}(x(k),k) \quad (I\text{-}75)$$

where $g_{nl}$ is a nonlinear function. In an analogous fashion, the corresponding equations of the Prediction System 150 would be modified to make predictions based on the non-linear expressions (I-73) or (I-75).

In other exemplary embodiments, MPC Controller 110 can implement MPC Technique I supplemented by the inclusion of anti reset-windup techniques. The adoption of such techniques can be desirable in cases where the integral states grow to become very large in magnitude due to input or output saturation (i.e., when the input and/or outputs adopt a constant value equal to one of the bounds that define the CS). A number of techniques are documented in the open literature and are also available under proprietary care to deliver effective anti reset-windup protection. These techniques range from simple techniques that zero out the value of any element of the current first-integral-state vector z(k) whose magnitude exceeds a specified threshold, to model-based approaches that compensate for the difference between the ideal (though unfeasible) input vector prescribed by the controller and a measurement of the saturated value of the input vector actually delivered to the Plant 105 by an actuator. The technology available for deploying anti reset-windup mechanisms is well known to one skilled in the art.

In other embodiments the MPC Performance Index utilized by MPC Controller 110 in MPC Technique I can include additional terms. A possible case is where an MPC Performance Index is adapted to conform to the disclosed technique through the addition of the tracking-error cost (I-8) and first-integral-state cost (I-9). For example consider the MPC Performance Index $$PI(k) = \frac{1}{2}x(k+N_p)^T M x(k+N_p) + \quad (I\text{-}76)$$
$$\frac{1}{2}\sum_{j=1}^{N_p} y(k+j)^T Q_1 y(k+j) + \frac{1}{2}\sum_{j=1}^{N_c} u(k+j)^T R u(k+j) +$$
$$\sum_{j=1}^{N_p} m(k+j)^T x(k+j) + \sum_{j=1}^{N_c} n(k+j)^T u(k+j)$$

where the summation that includes the cost-weight matrix M is a known as a terminal-constraint cost, and the summation involving the weight vectors m and n are respectively a linear state cost and a linear input cost. The MPC Performance Index form given in equation (I-76) is consistent with performance indices in widespread adoption in industrial practice, for example, it contains several of the key terms in an MPC Performance Index disclosed in U.S. Pat. No. 7,197,485 B2. The MPC Performance Index (I-76) is transformed to an MPC Performance Index of the type $PI_I(k)$ of MPC Technique I by adding to the right hand side of equation (I-76), the quadratic summations $$\frac{1}{2}C_T(k) + \frac{1}{2}C_I(k) \quad (I\text{-}77)$$

where $C_T(k)$ is the tracking-error cost (I-8), $C_I(k)$ is the first-integral-state cost (I-9), and then subtracting from the right hand side of equation (I-77) the quadratic summation $$\frac{1}{2}\sum_{j=1}^{N_p} y(k+j)^T Q_1 y(k+j) \quad (I\text{-}78)$$

The deployment of MPC Technique I utilized by MPC Controller 110 then proceeds as described in this disclosure. Other performance indices lie under the scope of the disclosed technique after the execution of modifications analogous to those described herein for the case of Performance Index (I-76). Furthermore, one of skill in the art can establish that the MPC Performance Index (I-76) can be reduced to the form (0-39a) via an appropriate selection of weights that includes setting specific weights to zero.

In other embodiments of MPC Technique I, the user can choose to arbitrarily set equal to zero at least one of the state disturbance vector $\hat{d}(k)$ and the current output-disturbance-estimate vector $\hat{p}(k)$ appearing in the resulting control policy. Analogous choices can be made in the design of the Prediction System. Under such choices the MPC Technique I can deliver offset-free tracking and disturbance rejection.

MPC Technique II

Figure 3:
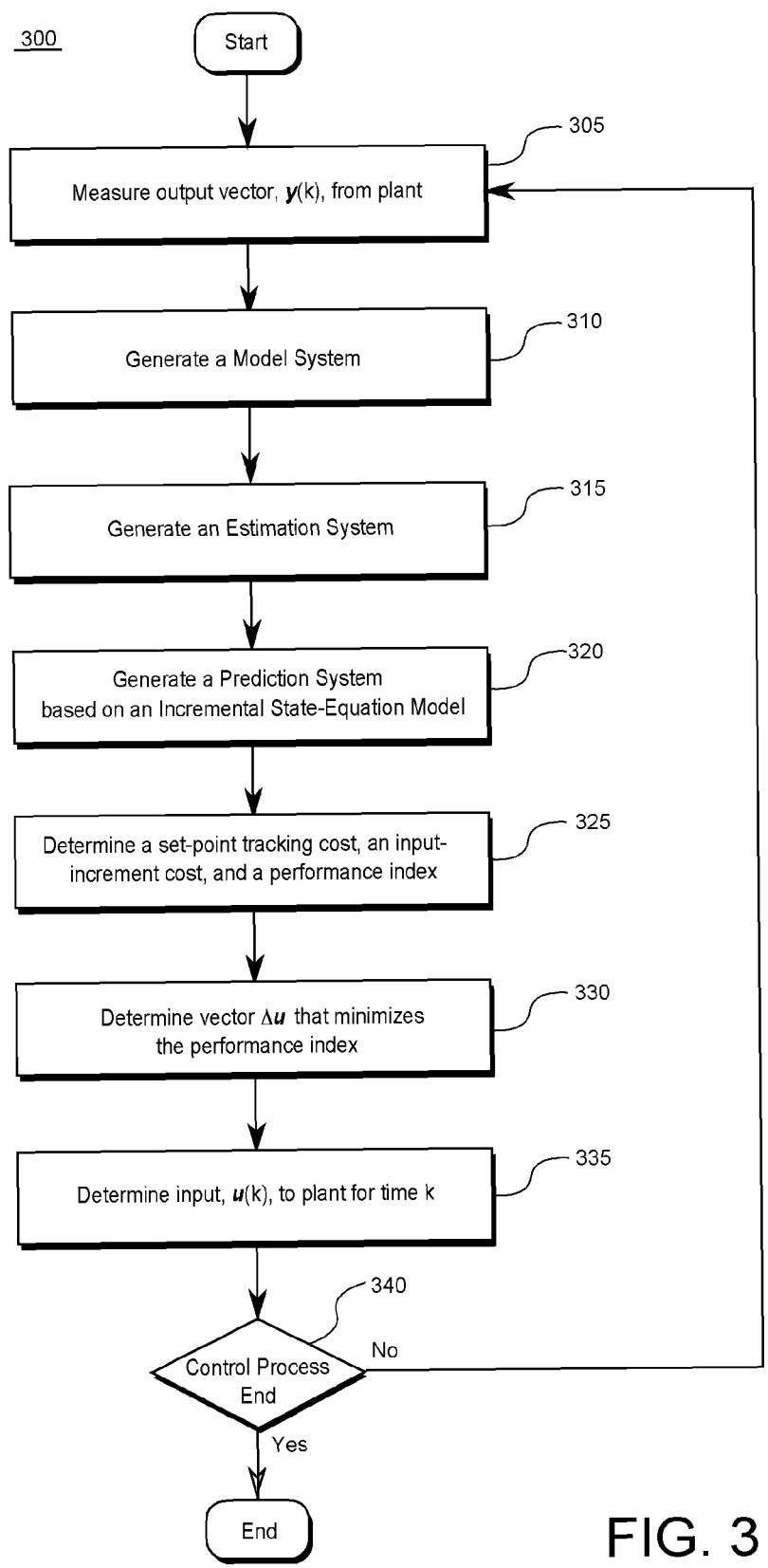
FIG. 3 is a flow diagram illustrating an exemplary MPC Technique II according to another embodiment.

According to the embodiment described herein as MPC Technique II, MPC Controller 110 can be configured to implement a predictive control technique that utilizes a quadratic input-increment cost term. FIG. 3 is a flow diagram illustrating a process flow 300 for MPC Controller 110 utilizing MPC Technique II. Technique II can use an Incremental Model System 130 featuring an incremental state equation of the form $$x(k+1)=(A+I)x(k)-Ax(k-1)+B\Delta u(k) \qquad \text{(II-1a)}$$

More precisely, the Prediction System 150 of MPC Technique II develops predictions compiled in a future state vector using the incremental state equation (II-1a). The technique can base its predictions of future output values utilizing either a standard output equation, or an incremental output equation of the form $$y(k+1)=y(k)+Cx(k)-Cx(k-1) \qquad \text{(II-1b)}$$

This disclosure includes two base-case embodiments of MPC Technique II. The first one, denoted as MPC Technique IIA, can be used when the states are measured. The second, denoted as MPC Technique IIB, can be used when the states are not measured but are estimated.

a) MPC Technique IIA: Measured States

MPC Technique IIA can be used when the states are measured. MPC Controller 110 can implement a process according to MPC Technique IIA that includes steps 305-335 carried out at the instant indicated by the time index k. The technique proceeds as described below.

MPC Controller 110 measures the current output vector y(k) from Plant 105, in step 305. In step 310, MPC Controller 110 can generate a Model System 130 for Plant 105. The Model System can consist of the matrices A, B, and C, and the equations $$x(k+1)=Ax(k)+Bu(k)+d(k) \qquad \text{(II-2)}$$

$$y(k)=Cx(k)+p(k) \qquad \text{(II-3)}$$

In step 315, MPC Controller 110 can generate an Estimation System 140 to produce an estimate of the value of the state vector. Estimation System 140 can assign to the current state-estimate vector $\hat{x}(k)$ the measured value of the state vector x(k) produced by sensor instruments located in Plant 105, or Estimation System 140 can assign to the current state-estimate vector $\hat{x}(k)$ the value of the current state vector obtained by solving x(k) in equation (II-3) for x(k) using available measurements of the current output vector y(k) and of the current output-disturbance vector p(k). In addition, Estimation System 140 can produce the values $\hat{x}(k)$ and $\hat{x}(k-1)$ of the estimated state-vector generated at the previous instants.

In step 320, MPC Controller 110 generates a Prediction System 150 for Plant 105. MPC Controller 110 can utilize the equations (II-2) to (II-3) comprising Model System 130 to produce the following equations that comprise an Incremental MPC Prediction System 150:

$$\hat{x}(k+j)=(A+I)\hat{x}(k+j-1)-A\hat{x}(k+j-2)+B\Delta u(k+j-1) \qquad \text{(II-4)}$$

$$\hat{y}(k+j)=\hat{y}(k+j-1)+C\hat{x}(k+j)-C\hat{x}(k+j-1) \qquad \text{(II-5)}$$

for values of the time-shift index j=1, 2, . . . , $N_p$, where $\hat{y}(k)=y(k)$, and where $\Delta u(k+j)=0$ for j=$N_c$, $N_c-1$, . . . , $N_p-1$. The Prediction System (II-4) to (II-5) is based on the incremental state equation (II-1a) and the incremental output equation (II-1b).

MPC Controller 110 determines a quadratic input-increment cost term, and an MPC Performance Index, in step 325. MPC Controller 110 can define the tracking-error cost term $$C_T(k) = \sum_{j=1}^{N_p} [r(k+j)-\hat{y}(k+j)]^T Q[r(k+j)-\hat{y}(k+j)] \qquad \text{(II-6)}$$

where Q is the tracking weight matrix, the quadratic input-increment cost term $$C_V(k) = \sum_{j=0}^{N_c-1} \Delta u(k+j)^T T \Delta u(k+j) \qquad \text{(II-7)}$$

where T is the quadratic input-increment weight matrix, and the MPC Performance Index $$PI_{II}(k)=C_T(k)+C_V(k) \qquad \text{(II-8)}$$

In step 330, the Optimization System 160 of MPC Controller 110 determines a vector u that minimizes the MPC Performance Index (II-8). The Optimization System 160 of MPC Controller 110 can solve the following optimization operation:

$$\Delta u = \text{argmin } PI_{II}(k) \qquad \text{(II-9)}$$

subject to the equations (II-4)-(II-5) of the Prediction System 150, and subject to the constraint restrictions $$\{\hat{x}, u, \Delta u, \hat{y}\} \in CS \qquad \text{(II-10)}$$

where the expression (II-9) represents the following statement: find the current-and-future input-increment vector $\Delta u$ that minimizes the value of the MPC Performance Index $PI_{II}(k)$.

MPC Controller 110 determines the current input vector u(k) to Plant 105 at instant k, and sends the current input vector u(k) to Plant 105, in step 335. MPC Controller 110 can use Row Selector 665 to extract vector $\Delta u(k)$ from the top p rows of the current-and-future input-increment vector solution $\Delta u$, and MPC Controller 110 can calculate the current input vector u(k) from the expression $$u(k)=u(k-1)+\Delta u(k) \qquad \text{(II-11)}$$

and then MPC Controller 110 can deploy current input vector u(k) at instant k as the input to Plant 105. MPC Controller 110 can utilize Row Selector 665 shown in FIG. 6 to perform required row-extraction operations.

At the next sampling instant, MPC Controller 110 determines if the control process of Plant 105 is at an end, in step 340. If the control process is not at an end, MPC Controller 110 repeats steps 305-335.

MPC Technique II can ensure the tracking of an arbitrary set-point sequence in a fashion that ensures zero offset, provided that the set-point sequence has a constant final value. In addition, MPC Technique II can deliver complete disturbance rejection when measured or unmeasured state disturbances and/or output disturbances with constant final value are present.

One of skill in the art can recognize that the MPC Performance Index (II-8) can be written in the form of MPC Performance Index (0-39a) by using the equivalent matrix-vector notation $$PI_{II}(k)=(r-\hat{y})^T Q_a(r-\hat{y})+\Delta u^T T_a \Delta u$$

where $T_a=\text{diag}(T, T, \ldots, T, T)$.

Analytical Control Policy for Unconstrained MPC Technique IIA

In one exemplary embodiment of MPC Technique IIA utilized by MPC Controller 110 the following conditions are met: the system-model matrices A, B, and C are constant, the cost-weight matrices Q and T are also constant, and the constraint-set condition (II-10) is ignored thus defining an unconstrained predictive control operation. Given that the constraints are not active in this case, the predicted future values of the state vector can be obtained by recursive substitution from the equations (II-4)-(II-5) of the Incremental MPC Prediction System 150 to yield the expression $$\begin{bmatrix} I & 0 & 0 & \cdots & 0 & 0 & 0 \\ -A-I & I & 0 & \cdots & 0 & 0 & 0 \\ A & -A-I & I & \cdots & 0 & 0 & 0 \\ 0 & A & -A-I & \cdots & 0 & 0 & 0 \\ \vdots & \vdots & \vdots & \ddots & \vdots & \vdots & \vdots \\ 0 & 0 & 0 & \cdots & A & -A-I & I \end{bmatrix} \begin{bmatrix} \hat{x}(k+1) \\ \hat{x}(k+2) \\ \hat{x}(k+3) \\ \hat{x}(k+4) \\ \vdots \\ \hat{x}(k+N_p) \end{bmatrix} = \quad \text{(II-12)}$$

$$\begin{bmatrix} A+I \\ -A \\ 0 \\ 0 \\ \vdots \\ 0 \end{bmatrix} \hat{x}(k) + \begin{bmatrix} -A \\ 0 \\ 0 \\ 0 \\ \vdots \\ 0 \end{bmatrix} \hat{x}(k-1) +$$

$$\begin{bmatrix} B & 0 & 0 & \cdots & 0 \\ 0 & B & 0 & \cdots & 0 \\ 0 & 0 & B & \cdots & 0 \\ 0 & 0 & 0 & \cdots & 0 \\ 0 & 0 & 0 & \ddots & 0 \\ 0 & 0 & 0 & \cdots & B \end{bmatrix} \begin{bmatrix} \Delta u(k) \\ \Delta u(k+1) \\ \Delta u(k+2) \\ \Delta u(k+3) \\ \vdots \\ \Delta u(k+N_c-1) \end{bmatrix}$$

Now use the matrix-inverse relationship $$\begin{bmatrix} I & 0 & 0 & \cdots & 0 & 0 & 0 \\ -A-I & I & 0 & \cdots & 0 & 0 & 0 \\ A & -A-I & I & \cdots & 0 & 0 & 0 \\ \vdots & \vdots & \vdots & \ddots & \vdots & \vdots & \vdots \\ 0 & 0 & 0 & \cdots & -A-I & I & 0 \\ 0 & 0 & 0 & \cdots & A & -A-I & I \end{bmatrix}^{-1} = \quad \text{(II-13)}$$

$$\begin{bmatrix} I & 0 & \cdots & 0 & 0 \\ \sum_{i=0}^{1} A^i & I & \cdots & 0 & 0 \\ \vdots & \vdots & \ddots & \vdots & \vdots \\ \sum_{i=0}^{N_p-2} A^i & \sum_{i=0}^{N_p-3} A^i & \cdots & I & 0 \\ \sum_{i=0}^{N_p-1} A^i & \sum_{i=0}^{N_p-2} A^i & \cdots & \sum_{i=0}^{1} A^i & I \end{bmatrix}$$

and proceed to pre-multiply equation (II-12) by the matrix given on the right-hand side of (II-13) to obtain $$\begin{bmatrix} \hat{x}(k+1) \\ \hat{x}(k+2) \\ \vdots \\ \hat{x}(k+N_p) \end{bmatrix} = \begin{bmatrix} \sum_{i=0}^{1} A^i \\ \sum_{i=0}^{2} A^i \\ \vdots \\ \sum_{i=0}^{N_p} A^i \end{bmatrix} \hat{x}(k) + \begin{bmatrix} I - \sum_{i=0}^{1} A^i \\ I - \sum_{i=0}^{2} A^i \\ \vdots \\ I - \sum_{i=0}^{N_p} A^i \end{bmatrix} \hat{x}(k-1) + \quad \text{(II-14)}$$

$$\begin{bmatrix} B & 0 & \cdots & 0 \\ \sum_{i=0}^{1} A^i B & B & \cdots & 0 \\ \vdots & \vdots & \ddots & \vdots \\ \sum_{i=0}^{N_p-1} A^i B & \sum_{i=0}^{N_p-2} A^i B & \cdots & \sum_{i=0}^{N_p-N_c} A^i B \end{bmatrix} \begin{bmatrix} \Delta u(k) \\ \Delta u(k+1) \\ \vdots \\ \Delta u(k+N_c-1) \end{bmatrix}$$

Now the vector of predicted future values of the output is obtained using the output equation (II-5) of the Prediction System 150 and the incremental state-predictor (II-14) to yield $$\begin{bmatrix} \hat{y}(k+1) \\ \hat{y}(k+2) \\ \vdots \\ \hat{y}(k+N_p) \end{bmatrix} = \begin{bmatrix} C\left(\sum_{i=0}^{1} A^i - I\right) \\ C\left(\sum_{i=0}^{2} A^i - I\right) \\ \vdots \\ C\left(\sum_{i=0}^{N_p} A^i - I\right) \end{bmatrix} (\hat{x}(k) - \hat{x}(k-1)) + \quad \text{(II-15)}$$

$$\begin{bmatrix} CB & 0 & \cdots & 0 \\ C\sum_{i=0}^{1} A^i B & CB & \cdots & 0 \\ \vdots & \vdots & \ddots & \vdots \\ C\sum_{i=0}^{N_p-1} A^i B & C\sum_{i=0}^{N_p-2} A^i B & \cdots & C\sum_{i=0}^{N_p-N_c} A^i B \end{bmatrix}$$

$$\begin{bmatrix} \Delta u(k) \\ \Delta u(k+1) \\ \vdots \\ \Delta u(k+N_c-1) \end{bmatrix} + \begin{bmatrix} I \\ I \\ \vdots \\ I \end{bmatrix} y(k)$$

Equation (II-15) can be rewritten in the compact vector-matrix form $$\hat{y} = C_{II}[\hat{x}(k) - \hat{x}(k-1)] + D_{II}\Delta u + E_{II}y(k) \quad \text{(II-16)}$$

where the matrices bearing the subscript II are the MPC Structural Matrices described in equations (0-45)-(0-47).

Next, the MPC Performance Index (II-8) is also expressed in vector-matrix form, replacing the summations terms in (II-8), yielding $$PI_{II}(k) = (r-\hat{y})^T Q_a (r-\hat{y}) + \Delta u^T T_a \Delta u \quad \text{(II-17)}$$

where $$Q_a = \text{diag}(Q, Q, \ldots, Q) \quad \text{(II-18)}$$

and $$T_a = \text{diag}(T, T, \ldots, T) \tag{II-19}$$

are block-diagonal matrices of appropriate dimensions. Substituting (II-16) into (II-17) leads to the following form for the MPC Performance Index for MPC Technique II:

$$PI_I(k) = [r - C_{II}(\hat{x}(k) - \hat{x}(k-1)) - D_{II}\Delta u - E_{II}y(k)]^T Q_a \times [r - C_{II}(\hat{x}(k) - \hat{x}(k-1)) - D_{II}\Delta u - E_{II}y(k)] + \Delta u^T R_a \Delta u \tag{II-20}$$

Now the unconstrained optimization operation (II-8) can be solved by the following algebraic and differential operations: (a) taking the derivative of the MPC Performance Index given in equation (II-20) with respect to the vector $\Delta u$, (b) equating the result to zero, (c) solving the resulting equation for the current input-increment vector $\Delta u$, (d) using Row Selector 665 to extract the top p rows of the current input-increment vector solution $\Delta u$ to obtain the elements of the current input-increment vector $\Delta u(k)$, and (e) calculating the current input vector from the expression $$u(k) = u(k-1) + \Delta u \tag{II-21}$$

These operations yield the following input-manipulation law that we call Exemplary Analytical Control Policy for Unconstrained MPC Technique IIA:

$$u(k) = u(k-1) + k_{II}^T [r - C_{II}(\hat{x}(k) - \hat{x}(k-1)) - E_{II}y(k)] \tag{II-22}$$

where the gain submatrix $k_{II}^T$ is defined as the top p rows of the gain matrix $$K_{II} = [D_{II}^T Q_a D_{II} + T_a]^{-1} D_{II}^T Q_a \tag{II-23}$$

MPC Controller 110 can utilize Row Selector 665 to perform required row-extraction operations.

MPC Controller 110 determines the current input vector u(k) to Plant 105 at instant k and sends the current input vector u(k) to Plant 105, in step 235. MPC Controller 110 can determine the value of the current input vector u(k) utilizing the unconstrained analytical control policy (II-22), and MPC Controller 110 can deploy the current input vector u(k) at instant k as the input to the Plant 105.

MPC Controller 110 can utilize the unconstrained predictive control policy (II-22) and apply it to the Plant 105, producing offset-free outputs when the dynamics of Plant 105 follow the disturbance-free expressions (0-3) and (0-4). Furthermore, the MPC Controller 110 can utilize the unconstrained predictive control policy (II-22) to also deliver offset-free output behavior when the dynamics of Plant 105 follow the disturbance-affected expressions (0-5) and (0-6), even though the MPC design procedure of MPC Technique II leading to the control policy (II-22) is executed ignoring the presence of state disturbances and of output disturbances.

b) MPC Technique IIB: Estimated States

MPC Technique IIB can be used when the states are estimated. MPC Controller 110 can implement a process according to Technique IIB that includes steps 305-335 carried out at the instant indicated by the time index k. The technique proceeds as described below.

The exemplary MPC Technique IIB is developed for the case where all disturbances are constant, a scenario of primary interest in the context of zero-offset performance.

MPC Controller 110 measures the current output vector y(k) from Plant 105, in step 305. In step 310, MPC Controller 110 can generate a Model System 130 for Plant 105. The Model System can consist of the matrices A, B, and C, and the equations $$x(k+1) = Ax(k) + Bu(k) + d(k) \tag{II-24}$$

$$d(k+1) = d(k) \tag{II-25}$$

$$p(k+1) = p(k) \tag{II-26}$$

$$y(k) = Cx(k) + p(k) \tag{II-27}$$

In step 315, MPC Controller 110 can generate an Estimation System 140 to produce an estimate of the value of the state vector. MPC Controller 110 can estimate the state, state-disturbance and output-disturbance vectors using the Estimation System 140 defined by conventional estimation equations such as $$\hat{x}(k+1) = A\hat{x}(k) + Bu(k) + L_x[y(k) - C\hat{x}(k) - \hat{p}(k)] \tag{II-28a}$$

$$\hat{d}(k+1) = \hat{d}(k) + L_d[y(k) - C\hat{x}(k) - \hat{p}(k)] \tag{II-28b}$$

$$\hat{p}(k+1) = \hat{p}(k) + L_p[y(k) - C\hat{x}(k) - \hat{p}(k)] \tag{II-28c}$$

or by the Incremental MPC Estimation System equation $$\hat{x}(k+1) = (A+I)\hat{x}(k) - A\hat{x}(k-1) + B\Delta u(k) + L_{IMES}[y(k) - y(k-1) - C\hat{x}(k) + C\hat{x}(k-1)] \tag{II-29}$$

along with the conventional output-disturbance estimation scheme $$\hat{p}(k+1) = \hat{p}(k) + L_p[y(k) - C\hat{x}(k) - \hat{p}(k)] \tag{II-30}$$

where y(k) is the current output vector, y(k−1) is the one-step-behind output vector, $\hat{p}(k)$ is the current output-disturbance-estimate vector, $\hat{x}(k)$ is current state-estimate vector, and $\hat{x}(k-1)$ is the one-step-behind state-estimate vector. In addition, Estimation System 140 can produce the value of the one-step-behind state-estimate vector at the previous instants, where the production of this value can involve reading it from computer memory or from readable media. Note that (II-29) is equivalent to (0-68), which can be used an alternative estimation scheme.

In step 320, MPC Controller 110 generates a Prediction System 150 for Plant 105. MPC Controller 110 can utilize the equations (II-24) to (II-27) comprising Model System 130 to produce the following equations that comprise an Incremental MPC Prediction System 150:

$$\hat{x}(k+j) = (A+I)\hat{x}(k+j-1) - A\hat{x}(k+j-2) + B\Delta u(k+j-1) \tag{II-31}$$

$$\hat{y}(k+j) = \hat{y}(k+j-1) + C\hat{x}(k+j) - C\hat{x}(k+j-1) \tag{II-32}$$

for values of the time-shift index j=1, 2, . . . , $N_p$, where $\hat{y}(k) = y(k)$, and where $\Delta u(k+j) = 0$ for j=$N_c$, $N_c+1$, . . . , $N_p-1$. The Prediction System (II-31) to (II-32) is based on the incremental state equation form (II-1a) and the incremental output equation (II-1b).

MPC Controller 110 determines a tracking-error cost term, a quadratic input-increment cost term, and an MPC Performance Index, in step 325. MPC Controller 110 can define the tracking-error cost term $$C_T(k) = \sum_{j=1}^{N_p} [r(k+j) - \hat{y}(k+j)]^T Q[r(k+j) - \hat{y}(k+j)] \tag{II-33}$$

where Q is the quadratic tracking-error weight matrix, the quadratic input-increment cost term $$C_V(k) = \sum_{j=0}^{N_c-1} \Delta u(k+j)^T T \Delta u(k+j) \tag{II-34}$$

where T is the quadratic input-increment weight matrix, and the MPC Performance Index $$PI_{II}(k) = C_T(k) + C_V(k) \tag{II-35}$$

In step 330, the Optimization System 160 of MPC Controller 110 determines the vector $\Delta u$ that minimizes the MPC Performance Index (II-35). The Optimization System 160 of MPC Controller 110 can solve the following optimization operation:

$$\Delta u = \arg\min PI_{II}(k) \tag{II-36}$$

subject to the equations (II-31)-(II-32) of the Prediction System 150, and subject to the constraint restrictions $$\{\hat{x}, u, \Delta u, \hat{y}\} \in CS \tag{II-37}$$

where the expression (II-36) represents the following statement: find the solution vector $\Delta u$ that minimizes the value of the MPC Performance Index $PI_{II}(k)$. The vectors $\hat{x}$, $u$, $\Delta u$, and $\hat{y}$ appearing in (II-37) are defined as indicated in equations (0-10)-(0-13).

MPC Controller 110 determines the current input vector $u(k)$ to Plant 105 at instant k, and sends the current input vector $u(k)$ to Plant 105, in step 335. MPC Controller 110 can utilize Row Selector 665 to extract vector $\Delta u(k)$ from the top p rows of the current-and-future input-increment vector solution $\Delta u$, MPC Controller 110 can calculate the current input vector $u(k)$ from the expression $$u(k) = u(k-1) + \Delta u(k) \tag{II-38}$$

and then MPC Controller 110 can deploy the current input vector $u(k)$ at instant k as the input to the Plant 105. MPC Controller 110 can utilize Row Selector 665 shown in FIG. 6 can be utilized to perform required row-extraction operations.

At the next sampling instant, MPC Controller 110 determines if the control process of Plant 105 is at an end, in step 340. If the control process is not at an end, MPC controller repeats steps 305-335.

Analytical Control Policy for Unconstrained MPC Technique IIB

In one exemplary embodiment of MPC Technique IIB with state estimation utilized by MPC Controller 110 the following conditions are met: the system matrices A, B, and C are constant, the cost-weight matrices Q and T are also constant, and the constraint-set condition (II-37) is ignored thus defining an unconstrained predictive control operation. Furthermore, state and output disturbances with final constant values can be present in the Model System 130, as represented by the expressions (II-24) to (II-27), and, for the purpose of illustration of the technique, it is assumed that state values are estimated using the Estimation System 140 defined by conventional estimation given by equations (II-28a) to (II-28c).

Given that the constraints are not active in this case, the predicted future values of the state can be obtained by recursive substitution from the state equations (II-31) of the Prediction System 150 to yield the expression $$\begin{bmatrix} \hat{x}(k+1) \\ \hat{x}(k+2) \\ \vdots \\ \hat{x}(k+N_p) \end{bmatrix} = \begin{bmatrix} \sum_{i=0}^{1} A^i \\ \sum_{i=0}^{2} A^i \\ \vdots \\ \sum_{i=0}^{N_p} A^i \end{bmatrix} \hat{x}(k) + \begin{bmatrix} I - \sum_{i=0}^{1} A^i \\ I - \sum_{i=0}^{2} A^i \\ \vdots \\ I - \sum_{i=0}^{N_p} A^i \end{bmatrix} \hat{x}(k-1) + \tag{II-41}$$

$$\begin{bmatrix} B & 0 & \cdots & 0 \\ \sum_{i=0}^{1} A^i B & B & \cdots & 0 \\ \vdots & \vdots & \ddots & \vdots \\ \sum_{i=0}^{N_p-1} A^i B & \sum_{i=0}^{N_p-2} A^i B & \cdots & \sum_{i=0}^{N_p-N_c} A^i B \end{bmatrix} \begin{bmatrix} \Delta u(k) \\ \Delta u(k+1) \\ \vdots \\ \Delta u(k+N_c-1) \end{bmatrix}$$

which is derived in a fashion analogous to the procedure used to derive equation (II-14).

Now the vector of predicted future values of the output is obtained using equation (II-32) of the Prediction System 150 and incremental the state-predictor (II-41) to yield $$\begin{bmatrix} \hat{y}(k+1) \\ \hat{y}(k+2) \\ \vdots \\ \hat{y}(k+N_p) \end{bmatrix} = \begin{bmatrix} C\left(\sum_{i=0}^{1} A^i - I\right) \\ C\left(\sum_{i=0}^{2} A^i - I\right) \\ \vdots \\ C\left(\sum_{i=0}^{N_p} A^i - I\right) \end{bmatrix} (\hat{x}(k) - \hat{x}(k-1)) + \tag{II-42}$$

$$\begin{bmatrix} CB & 0 & \cdots & 0 \\ C\sum_{i=0}^{1} A^i B & CB & \cdots & 0 \\ \vdots & \vdots & \ddots & \vdots \\ C\sum_{i=0}^{N_p-1} A^i B & C\sum_{i=0}^{N_p-2} A^i B & \cdots & C\sum_{i=0}^{N_p-N_c} A^i B \end{bmatrix} \begin{bmatrix} \Delta u(k) \\ \Delta u(k+1) \\ \vdots \\ \Delta u(k+N_c-1) \end{bmatrix} + \begin{bmatrix} I \\ I \\ \vdots \\ I \end{bmatrix} y(k)$$

Equation (II-42) can be rewritten in the compact vector-matrix form $$\hat{y} = C_{II}[\hat{x}(k) - \hat{x}(k-1)] + D_{II}\Delta u + E_{II} y(k) \tag{II-43}$$

where the matrices bearing the subscript II are the MPC Structural Matrices defined in equations (0-45)-(0-46), and (0-47).

Next, the MPC Performance Index (II-35) is also expressed in the following vector-matrix form. replacing the summations terms in (II-35), yielding $$PI_{II}(k) = (r - \hat{y})^T Q_a (r - \hat{y}) + \Delta u^T T_a \Delta u \tag{II-44}$$

Substituting (II-42) into (II-44) leads to the following form for the MPC Performance Index for MPC Technique II:

$$PI_I(k) = [r - C_{II}(\hat{x}(k) - \hat{x}(k-1)) - D_{II}\Delta u - E_{II} y(k)]^T Q_a \times [r - C_{II}(\hat{x}(k) - \hat{x}(k-1)) - D_{II}\Delta u - E_{II} y(k)] + \Delta u^T R_a \Delta u \tag{II-45}$$

The ensuing operations to obtain the current and future input-increment vector solution $\Delta u$ and the current control-increment vector $\Delta u(k)$ are analogous to those used for deriving equation (II-22), namely (II-45) is subjected to a series of algebraic and differential operations for the purpose of identifying a minimizer. These operations yield the following input-manipulation law that we call Exemplary Analytical Control Policy for Unconstrained MPC Technique IIB:

$$u(k)=u(k-1)+k_{II}^T[r-C_{II}(\hat{x}(k)-\hat{x}(k-1))-E_{II}\hat{p}(k)] \quad \text{(II-46)}$$

where the gain submatrix $k_{II}^T$ is defined as the top p rows of the gain matrix $K_{II}$ given in equation (II-23).

MPC Controller 110 determines the current input vector u(k) to Plant 105 at instant k and sends the current input vector u(k) to Plant 105, in step 335. MPC Controller 110 can determine the value of the current input vector u(k) utilizing the unconstrained analytical control policy (II-46), and MPC Controller 110 can deploy u(k) at instant k as the input to the Plant 105.

MPC Controller 110 can utilize the unconstrained predictive control policy with state estimation (II-46) and apply it to the Plant 105, producing offset-free outputs when the dynamics of Plant 105 follow the disturbance-free expressions (0-3) and (0-4). Furthermore, the MPC Controller 110 can utilize the unconstrained predictive control policy (II-46) to also deliver offset-free output behavior when the dynamics of Plant 105 follow the disturbance-affected expressions (0-5) and (0-6).

c) Other Embodiments of MPC Technique II

The description of MPC Technique II and its analytical variations MPC Technique IIA and MPC Technique IIB are exemplary embodiments of the disclosure, and are given in sufficient detail so that those skilled in the art can be enabled to practice this embodiment. It is understood that other embodiments can be utilized, and that changes can be made without departing from the scope of this disclosure. A non-exhaustive discussion of modified embodiments is given below to better illustrate the interpretation and implementation of MPC Technique II in MPC Controller 110. In addition, embodiments previously described in the context of MPC Technique I are also relevant to MPC Technique II, and are herein incorporated in their entirety.

In an embodiment of Technique II, the Prediction System 150 is based on an incremental state equation and a standard output equation, and includes the prediction equation $$\hat{y}=C_{II}^0\hat{x}(k)+C_{II}\hat{x}(k-1)+D_{II}\Delta u+E_{II}\hat{p}(k) \quad \text{(II-47)}$$

resulting in the analytical control policy of MPC Technique II $$u(k)=u(k-1)+k_{II}^T[r-C_{II}^0\hat{x}(k)-C_{II}\hat{x}(k-1)-E_{II}\hat{p}(k)] \quad \text{(II-48)}$$

where the gain submatrix $k_{II}^T$ is defined as the top p rows of the gain matrix $K_{II}$ given in (II-23).

In other embodiments, MPC Controller 110 can implement MPC Technique I for cases where the Prediction System 150 includes of the equations $$\hat{x}=h_x+H_x\Delta u \quad \text{(II-49a)}$$

$$\hat{y}=h_y+H_y\Delta u \quad \text{(II-49b)}$$

$$z=h_z-H_z\hat{y} \quad \text{(II-50a)}$$

$$v=h_v-H_v\hat{y} \quad \text{(II-50b)}$$

$$w=h_w-H_w\hat{y} \quad \text{(II-50c)}$$

where vectors $h_y$, $h_x$, $h_z$, $h_v$, and $h_w$, and matrices $H_y$, $H_x$, $H_z$, $H_v$, and $H_w$ do not depend on the input vector u nor on the current-and-future incremental-input vector $\Delta u$, and can depend on the current, past, and future values all the other variables, including states, outputs, and disturbances, and on all the other variables, including states, outputs, disturbances, and where the Optimization System 160 includes the MPC Performance Index (0-39a), resulting in the following General Analytical Control Policy for MPC Technique II:

$$\Delta u = k_\Delta^T\{H_y^T[Q_a(r-h_y)+H_z^TZ_a(h_z-H_zh_y)+H_w^TW_a(h_w-H_wh_y)+H_v^TV_a(h_v-H_vh_y)]+H_x^T[-x_a-X_ah_x]-F_a^TS_af_a+\Delta_0^TT_a\Delta_1u(k-1)-H_y^Tq_a-\Delta_0^Tt_a-r_a\} \quad \text{(II-52)}$$

where the gain submatrix $k_{\Delta T}$ is defined as the top p rows of the gain matrix $$K_\Delta=\{H_y^T(Q_a+H_z^TZ_aH_z+H_w^TW_aH_w+H_v^TV_aH_v)H_y+H_x^TX_aH_x+F_a^TS_aF_a+\Delta_0^TT_a\Delta_0+R_a\}^+ \quad \text{(II-53)}$$

where the superscript notation "+" denotes a generalized matrix-inverse operation. MPC Controller 110 can utilize Row Selector 665 to perform required row-extraction operations. Note that the output predictor equation (II-49a) is a general form that can be adopted by future state vectors derived using an Incremental State Space Equation. The General Analytical Control Policy (I-52) is also applicable to the case of MPC Technique III.

In the preferred embodiment of MPC Technique II, cost-weight matrices Q, and T are diagonal, positive-definite matrices. If some of the diagonal entries of matrix Q are set to zero, thus making the matrix positive semidefinite, selected states associated with the zero entries of the matrix can develop undesirable offset. In other embodiments, the matrices can be chosen to have a nondiagonal structure, and/or to change their value in time. The cost-weight matrices can adopt particular values that are highly dependent on the dynamics of the specific Plant 105, hence defining alternative embodiments of the technique.

MPC Technique III

Figure 4:
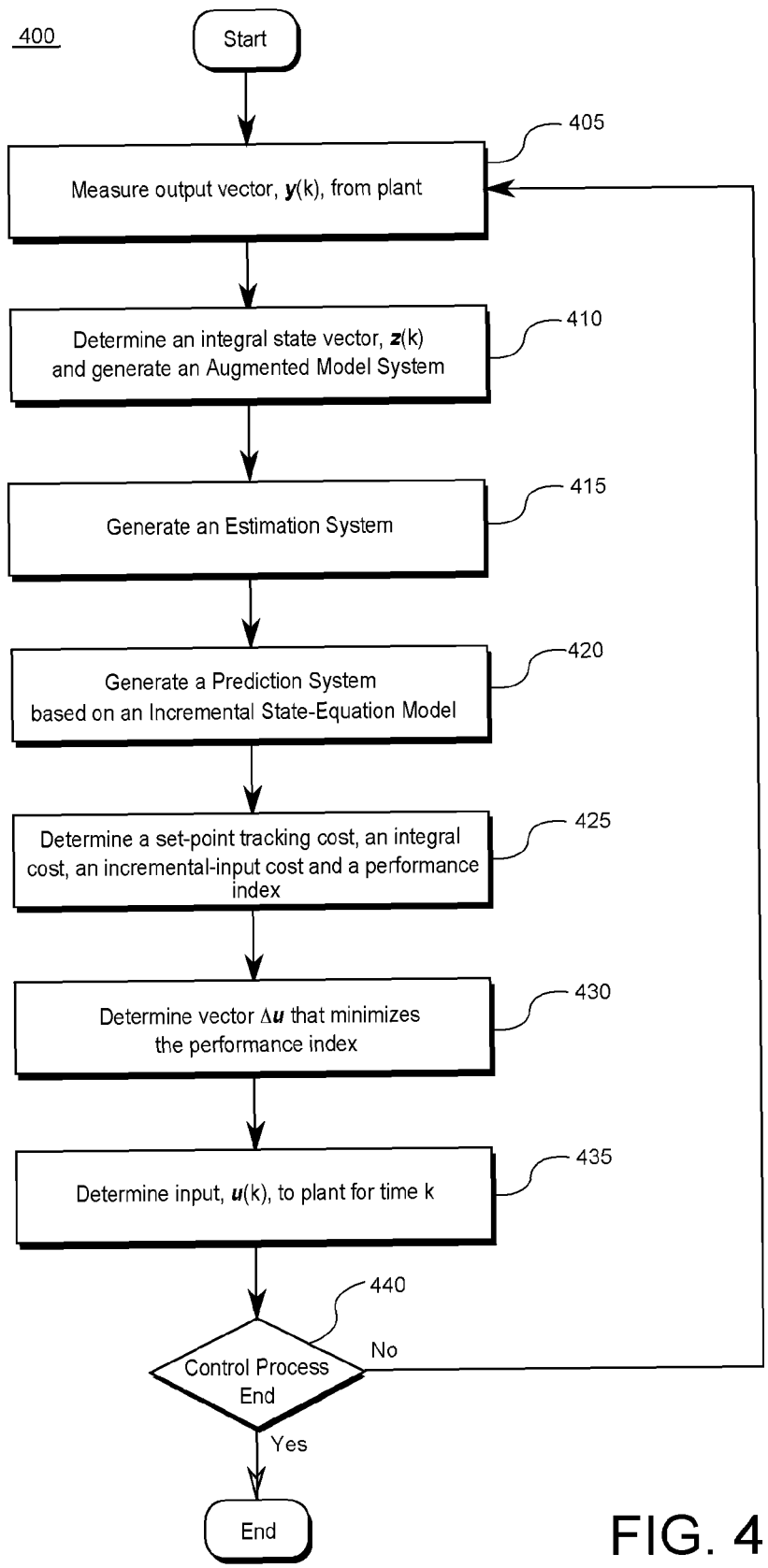
FIG. 4 is a flow diagram illustrating an exemplary MPC Technique III according to another embodiment.
Figure 5:
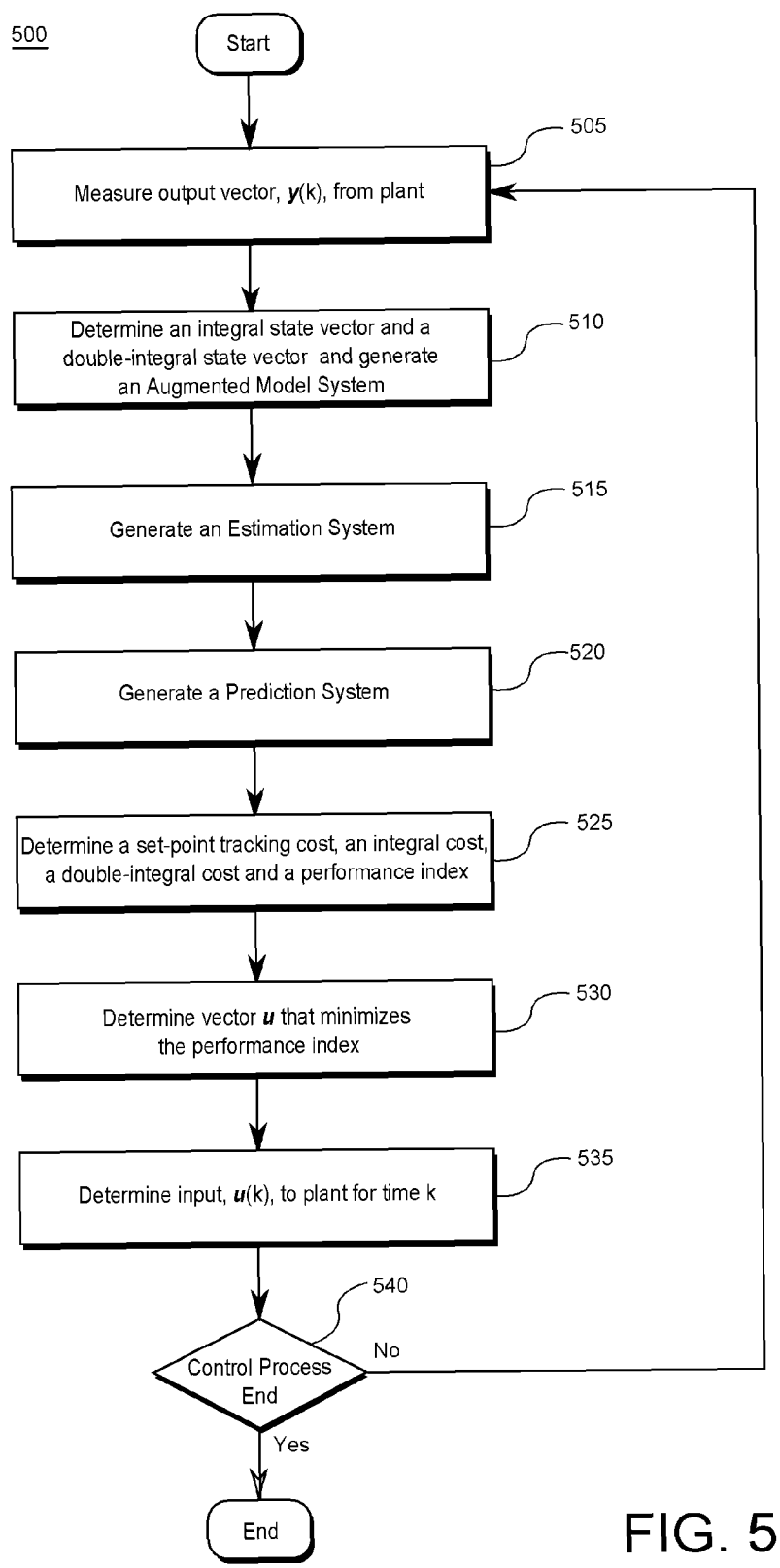
FIG. 5 is a flow diagram illustrating an exemplary MPC Technique IV according to another embodiment.

According to the embodiment described herein as MPC Technique III, an MPC Controller 110 can be configured as a combination of Techniques I and II. FIG. 4 is a flow diagram illustrating a process flow 400 for MPC Controller 110 utilizing MPC Technique III.

MPC Controller 110 can implement process 400 according to MPC Technique III that includes steps 405-435 carried out at the instant indicated by the time index k.

MPC Controller 110 measures the output vector y(k) from Plant 105, in step 405. MPC Controller 110 in step 410 can construct a current first-integral-state vector z(k) using the integral state equation (I-1) and can generate an Augmented Model System 130 for Plant 105. The Augmented Model System 130 can consist of the matrices A, B, and C, and the equations $$x(k+1)=Ax(k)+Bu(k)+d(k) \quad \text{(III-1a)}$$

$$z(k+1)=z(k)+r(k)-y(k) \quad \text{(III-1b)}$$

$$d(k+1)=d(k) \quad \text{(III-1c)}$$

$$p(k+1)=p(k) \quad \text{(III-1d)}$$

$$y(k)=Cx(k)+p(k) \quad \text{(III-2)}$$

In step 415, MPC Controller 110 can generate an Estimation System 140 to produce an estimate of the value of the state vector. Estimation System 140 can assign to the current state-estimate vector $\hat{x}(k)$ the value of the current state vector x(k) produced by sensor instruments located in Plant 105, or Estimation System 140 can assign to the variable $\hat{x}(k)$ the value of the state vector obtained by solving equation (III-2) for x(k) using available measurements of the current output vector y(k) and of the current output-disturbance vector p(k). Alternatively, Estimation System 140 can use a conventional estimation scheme (such as that described by equations (II-28a)-(II-28c) or the IMES scheme given in (0-63) or (0-68), along with an output-disturbance estimator such as that given in (0-32) or a suitable variation of (0-32). In addition, Estimation System 140 can produce the values $\hat{x}(k)$ and $\hat{x}(k-1)$ of the estimated state-vector generated at the previous instants.

In step 420, MPC Controller 110 generates a Prediction System 150 for Plant 105. MPC Controller 110 can utilize the equations (III-1a) to (III-2) comprising Model System 130 to produce the following equations that comprise an Incremental Augmented Prediction System 150:

$$\hat{x}(k+j)=(A+I)\hat{x}(k+j-1)-A\hat{x}(k+j-2)+B\Delta u(k+j-1) \quad \text{(III-3)}$$

$$z(k+j)=z(k+j-1)+r(k+j-1)-\hat{y}(k+j-1) \quad \text{(III-4)}$$

$$\hat{y}(k+j)=C\hat{x}(k+j)+\hat{p}(k) \quad \text{(III-5)}$$

for values of the time-shift index $j=1, 2, \ldots, N_p$, where $\hat{y}(k)=y(k)$, and where $\Delta u(k+j)=0$ for $j=N_c, N_c+1, \ldots, N_p-1$. Furthermore, the predictor equation (III-5) can use the value of the current output-disturbance-estimate vector $\hat{p}(k)$ available from the Estimation System 140 or from measurements, or can be deployed after setting $$\hat{p}(k)=0 \quad \text{(III-6)}$$

which corresponds to a situation where estimation is ignored. This Prediction-System (III-3) to (III-5) is based on the incremental state equation form (II-1a) and on the standard output equation (III-2).

MPC Controller 110 determines a first-integral-state cost term, a quadratic input-increment cost term, and an MPC Performance Index, in step 425. MPC Controller 110 can define the MPC Performance Index $$PI_{II}(k)=C_T(k)+C_I(k)+C_V(k) \quad \text{(III-7)}$$

where $C_T(k)$, $C_I(k)$ and $C_V(k)$ are respectively the tracking-error cost term (I-8), the first-integral-state cost term (I-9) and the quadratic input-increment cost term (II-7).

In step 430 the Optimization System 160 of MPC Controller 110 determines a vector $\Delta u$ that minimizes the MPC Performance Index (III-7). The Optimization System 160 of MPC Controller 110 can solve the following optimization operation:

$$\Delta u=\text{argmin } PI_{III}(k) \quad \text{(III-8)}$$

subject to the equations (III-3)-(III-5) of the Prediction System 150, and subject to the constraint restrictions $$\{\hat{x}, u, \Delta u, \hat{y}\} \in CS \quad \text{(III-9)}$$

where the expression (III-8) represents the following statement: find the current-and-future vector solution u that minimizes the value of the MPC Performance Index $PI_{III}(k)$. The vectors $\hat{x}$, $u$, $\Delta u$, and $\hat{y}$ are defined as indicated in equations (0-10)-(0-13).

MPC Controller 110 determines the current input-increment vector $\Delta u(k)$ to Plant 105 for time k, and sends the current input vector $u(k)$ to Plant 105, in step 435. MPC Controller 110 obtains the current input-increment vector $\Delta u(k)$ by utilizing Row Selector 665 to extract the top p rows of the current-and-future input-increment vector solution $\Delta u$, calculates the current input vector $u(k)$ from the expression $$u(k)=u(k-1)+\Delta u(k) \quad \text{(III-10)}$$

and then MPC Controller 110 can deploy the current input vector $u(k)$ at instant k as the input to Plant 105.

At the next sampling instant, MPC Controller 110 determines if the control process of Plant 105 is at an end, in step 440. If the control process is not at an end, MPC controller repeats steps 405-435.

MPC Technique III can ensure the tracking of an arbitrary set-point sequence in a fashion that ensures zero offset, provided that the set-point sequence has a constant final value. In addition, MPC Technique III can deliver complete disturbance rejection when measured or unmeasured state disturbances and/or output disturbances with constant final value are present. Furthermore, MPC Technique III can deliver offset-free tracking of a ramp set-point, provided that the Prediction System 150 includes an incremental form of the state equation, as in the exemplary case of equation (III-3).

One of skill in the art can recognize that the MPC Performance Index (III-7) can be written can be written in the form of MPC Performance Index (0-39a) by adopting a compact matrix-vector notation $$PI_{III}(k)=(r-\hat{y})^T Q_a (r-\hat{y})+\Delta^T T_a \Delta u+z^T Z_a z$$

Analytical Control Policy for Unconstrained MPC Technique III

In one exemplary embodiment of MPC Technique III utilized by MPC Controller 110 the following conditions are met: the system-model matrices A, B, and C are constant, the cost-weight matrices Q, R, S, and T are also constant, and the constraint-set condition (III-9) is ignored thus defining an unconstrained predictive control operation. Given that the constraints are not active in this case, the predicted future values of the state can be obtained by recursive substitution from the state equations (III-3) and the integral-state equation (III-4) of the Prediction System 150, and combining the results with the output equations (III-5). In this case, Prediction System 150 includes an Integral state equation and a standard output equation to yield the expressions, and the recursive-substitution operations yield the vectors $$\hat{y}=\{C_{II}{}^0 \hat{x}(k)+C_{II}\hat{x}(k-1)-D_{II}\Delta_1 u(k-1)+E_{II}\hat{p}(k)\}+D_{II}\Delta_0 u \quad \text{(III-11)}$$

and $$z=\{M_I[z(k)+r(k)-y(k)]+N_I r\}-N_I \hat{y} \quad \text{(III-12)}$$

respectively describing the future output vector $\hat{y}$, and the future first-integral-state vector z, where matrices bearing the subindices I and II are the MPC Structural Matrices defined in (0-45), (0-46), (0-42), and (0-43).

Next the MPC Performance Index (III-7) is expressed in vector-matrix form, and the unconstrained optimization operation (III-8) can be solved to obtain a current input vector described in the following Exemplary Analytical Control Policy for Unconstrained MPC Technique IIIB:

$$u=k_{III\Delta-1}{}^T[r-C_{II}{}^0\hat{x}(k)-C_{II}\hat{x}(k-1)+D_{II}\Delta_1 u(k-1)-E_{II}\hat{p}(k)]+k_{III\Delta-2}{}^T u(k-1)+k_{III\Delta-3}{}^T z(k)+k_{III\Delta-3}[r(k)-y(k)] \quad \text{(III-13)}$$

where the gain sub-matrices $k_{III\Delta-1}{}^T$, $k_{III\Delta-2}{}^T$, and $k_{III\Delta-3}{}^T$ can be respectively obtained from the top p rows of the following gain matrices $$K_{III\Delta-1}=[\Delta_0{}^T D_{II}{}^T(Q_a+N_I{}^T Z_a N_I)D_{II}\Delta_0+\Delta_0{}^T T_a \Delta_0]^{-1}(Q_a+N_I{}^T Z_a N_I) \quad \text{(III-14a)}$$

$$K_{III\Delta-2}=[\Delta_0{}^T D_{II}{}^T(Q_a+N_I{}^T Z_a N_I)D_{II}\Delta_0+\Delta_0{}^T T_a \Delta_0]^{-1}\Delta_0{}^T T_a \Delta_1 \quad \text{(III-14b)}$$

$$K_{III\Delta-3}=[\Delta_0{}^T D_{II}{}^T(Q_a+N_I{}^T Z_a N_I)D_{II}\Delta_0+\Delta_0{}^T T_a \Delta_0]^{-1}\Delta_0{}^T D_{II}{}^T N_I{}^T Z_a M_I \quad \text{(III-14c)}$$

MPC Controller 110 can utilize Row Selector 665 to perform required row-extraction operations.

MPC Controller 110 determines current input vector $u(k)$ to Plant 105 at instant k and sends the current input vector $u(k)$ to Plant 105, in step 435. MPC Controller 110 can determine the value of the current input vector $u(k)$ utilizing the unconstrained analytical control policy (III-13), and MPC Controller 110 can deploy $u(k)$ at instant k as the input to the Plant 105.

The relationship $\hat{p}(k)=0$ is adopted when the Estimation System 140 is not configured to produce an estimate of the output disturbance, and when this zero identity is used in equation (III-13), then equation (III-13) becomes the Exemplary Analytical Control Policy for Unconstrained MPC Technique IIIA.

a) Other Embodiments of MPC Technique III

The description of MPC Technique III and its analytical variations MPC Technique IIIA and MPC Technique IIIB are exemplary embodiments of the disclosure, and are given in sufficient detail so that those skilled in the art can be enabled to practice this embodiment. It is understood that other embodiments can be utilized, and that changes can be made without departing from the scope of this disclosure. A non-exhaustive discussion of modified embodiments is given below to better illustrate the interpretation and implementation of MPC Technique III in MPC Controller 110. In addition, the embodiments previously described in the context of MPC Techniques I and II are also relevant to MPC Technique III, and are herein incorporated in their entirety.

In an embodiment of MPC Technique III, the Prediction System 150 is based on a standard state equation and a standard output equation, and includes the prediction equation $$\hat{y} = \{C_I \hat{x}(k) + E_{II} \hat{p}(k) + F_I \hat{d}(k)\} + D_{II} u \qquad \text{(III-15)}$$

resulting in the analytical control policy for MPC Technique III $$u = k_{III\text{-}1}^T [r - C_I \hat{x}(k) - E_{II} \hat{p}(k) - F_I \hat{d}(k)] + k_{III\text{-}2}^T u(k-1) + k_{III\text{-}3}^T z(k) + k_{III\text{-}3}^T [r(k) - y(k)] \qquad \text{(III-16)}$$

where gain sub-matrices $k_{III\text{-}1}^T$, $k_{III\text{-}2}^T$, and $k_{III\text{-}3}^T$ can be respectively obtained from the top p row of the following gain matrices:

$$K_{III\text{-}1} = [D_I^T (Q_a + N_I^T Z_a N_I) D_I + \Delta_0^T T_a \Delta_0]^{-1} D_I^T (Q_a + N_I^T Z_a N_I) \qquad \text{(III-17)}$$

$$K_{III\text{-}2} = [D_I^T (Q_a + N_I^T Z_a N_I) D_I + \Delta_0^T T_a \Delta_0]^{-1} \Delta_0^T T_a \Delta_1 \qquad \text{(III-18a)}$$

$$K_{III\text{-}3} = [D_I^T (Q_a + N_I^T Z_a N_I) D_I + \Delta_0^T T_a \Delta_0]^{-1} D_I^T N_I^T Z_a M_I \qquad \text{(III-18b)}$$

MPC Controller 110 can utilize Row Selector 665 to perform required row-extraction operations.

In another embodiment of MPC Technique III, the Prediction System 150 is based on a standard state equation and an incremental output equation, and includes the prediction equation $$\hat{y} = \{E_{II} y(k) + (C_I - E_I C) \hat{x}(k) + F_I \hat{d}(k)\} + D_{II} u \qquad \text{(III-19)}$$

resulting in the analytical control policy for MPC Technique III $$u = k_{III\text{-}1}^T [r - E_{II} y(k) - (C_I - E_I C) \hat{x}(k) - F_I \hat{d}(k)] + k_{III\text{-}2}^T u(k-1) + k_{III\text{-}3}^T z(k) + k_{III\text{-}3}^T [r(k) - y(k)] \qquad \text{(III-20)}$$

where the gain sub-matrices $k_{III\text{-}1}^T$, $k_{III\text{-}2}^T$, and $k_{III\text{-}3}^T$ can be respectively obtained from the top p row of the gain matrices given in (III-17), (III-18a), and (III-18b). MPC Controller 110 can utilize Row Selector 665 to perform required row-extraction operations.

In another embodiment of MPC Technique III, the Prediction System 150 is based on an incremental state equation and an incremental output equation, and includes the prediction equation $$\hat{y} = \{C_{II}[\hat{x}(k) - \hat{x}(k-1)] D_{II} \Delta_1 u(k-1) + E_{II} y(k)\} + D_{II} \Delta_0 u \qquad \text{(III-21)}$$

resulting in the analytical control policy for MPC Technique III $$u = K_{III\Delta\text{-}1}[r - C_{II}[\hat{x}(k) - \hat{x}(k-1)] + D_{II} \Delta_1 u(k-1) - E_{II} y(k)] + K_{III\Delta\text{-}2} u(k-1) + K_{III\Delta\text{-}3} z(k) + K_{III\Delta\text{-}3}[r(k) - y(k)] \qquad \text{(III-22)}$$

where the gain sub-matrices $k_{III\Delta\text{-}1}^T$, $k_{III\Delta\text{-}2}^T$, and $k_{III\Delta\text{-}3}^T$ can be respectively obtained from the top p row of the gain matrices given in (III-14a), (III-14b), and (III-14c). MPC Controller 110 can utilize Row Selector 665 to perform required row-extraction operations.

MPC Technique IV

According to the embodiment described herein as MPC Technique IV, an MPC controller can be configured as an augmentation of MPC Technique I whereby a second and a third integral state can be added to the Model System 130 and to the Prediction System 140. FIG. 6 is a flow diagram illustrating a process flow 500 for MPC Controller 110 utilizing MPC Technique IV.

MPC Controller 110 can implement process 500 according to MPC Technique IV that includes steps 505-535 carried out at the instant indicated by the time index k.

MPC Controller 110 measures the current output vector y(k) from Plant 105, in step 505. MPC Controller 110 can construct a first-integral-state vector using the integral state equation $$z(k+1) = z(k) + r(k) - y(k) \qquad \text{(IV-1)}$$

and a second-integral-state vector using the second-integral state equation $$w(k+1) = w(k) + z(k) \qquad \text{(IV-2)}$$

where z(k) is the current first-integral-state vector and w(k) is the current second-integral-state 21vector, and in step 510 MPC Controller 110 can generate a Model System 130 for Plant 105. The Model System 130 can consist of the matrices A, B, and C, and the equations $$x(k+1) = Ax(k) + Bu(k) + d(k) \qquad \text{(IV-3)}$$

$$z(k+1) = z(k) + r(k) - y(k) \qquad \text{(IV-4)}$$

$$w(k+1) = w(k) + z(k) \qquad \text{(IV-5)}$$

$$y(k) = Cx(k) + p(k) \qquad \text{(IV-6)}$$

In step 515, MPC Controller 110 can generate an Estimation System 140 to produce an estimate $\hat{x}(k)$ for the measured state vector x(k). Estimation System 140 can assign to the variable $\hat{x}(k)$ the value of the state vector x(k) produced by sensor instruments located in Plant 105, or Estimation System 140 can assign to the variable $\hat{x}(k)$ the value of the state vector obtained by solving equation (IV-6) for x(k) using available measurements of the current output vector y(k) and of the current output-disturbance vector p(k). Alternatively, Estimation System 140 can use a conventional estimation scheme (such as that described by equations (II-28a)-(II-28c) or the IMES scheme given in (0-63) or (0-68), along with an output-disturbance estimator such as that given in (0-32) or a suitable variation of (0-32).

In step 520, MPC Controller 110 generates a Prediction System 150 for Plant 105. MPC Controller 110 can utilize the following equations to define an Augmented Prediction System 150:

$$\hat{x}(k+j) = A\hat{x}(k+j-1) + Bu(k+j-1) + \hat{d}(k) \qquad \text{(IV-7)}$$

$$z(k+j) = z(k+j-1) + r(k+j-1) - \hat{y}(k+j-1) \qquad \text{(IV-8)}$$

$$w(k+j) = w(k+j-1) + z(k+j-1) \qquad \text{(IV-9)}$$

$$\hat{y}(k+j) = C\hat{x}(k+j) + \hat{p}(k) \qquad \text{(IV-10)}$$

for values of the time-shift index j=1, 2, . . . , $N_p$, and where $\hat{y}(k) = y(k)$, and $u(k+j) = u(k+N_c-1)$ for $j = N_c, N_c+1, \ldots, N_p-1$. In the prediction equations (IV-7) and (IV-10) it is assumed that the state and output disturbances remain constant according to the relationships $d(k+j) = \hat{d}(k)$ and $p(k+j) = \hat{p}(k)$. Furthermore, the perdition equations (IV-7) and (IV-10) can use values of $\hat{d}(k)$ and $\hat{p}(k)$ available from the Estimation System 140 or from measurements, or can set $$\hat{d}(k)=0 \text{ and/or } \hat{p}(k)=0 \qquad \text{(IV-11)}$$

which corresponds to a scenario where all or some of the estimation results are ignored.

MPC Controller 110 determines a tracking-error cost term, a first-integral-state cost term, a second-integral-state cost term, and an MPC Performance Index, in step 525. MPC Controller 110 can define the second-integral-state cost term $$C_{IV}(k) = \sum_{j=1}^{N_p} w(k+j)^T W w(k+j) \qquad \text{(IV-12)}$$

where W is the second-integral weight matrix, and can define the MPC Performance Index $$PI_{IV}(k) = C_T(k) + \sum_{j=0}^{N_p-1} u(k+j)^T R u(k+j) + C_I(k) + C_{IV}(k) \qquad \text{(IV-13)}$$

where R is the quadratic input weight matrix, and where $C_T(k)$ and $C_I(k)$ are respectively the tracking-error cost term (I-8) and the first-integral-state cost term (I-9).

In step 530, the Optimization System 160 of MPC Controller 110 determines a vector u that minimizes the MPC Performance Index (IV-13). MPC Controller 110 can solve the following optimization operation:

$$u = \operatorname{argmin} PI_{IV}(k) \qquad \text{(IV-14)}$$

subject to the equations (IV-7)-(IV-10) of the Prediction System 150, and subject to the constraint restrictions $$\{\hat{x}, u, \Delta u, \hat{y}\} \in CS \qquad \text{(IV-15)}$$

where the expression (IV-14) represents the following statement: find the current-and-future vector solution u that minimizes the value of the MPC Performance Index $PI_{IV}(k)$. The vectors $\hat{x}$, u, $\Delta u$, and $\hat{y}$ appearing in (IV-15) are defined as indicated in equations (0-10)-(0-13).

MPC Controller 110 determines a current input vector u(k) to Plant 105 at time k, and sends the current input vector u(k) to Plant 110, in step 535. MPC Controller 110 can utilize Row Selector 665 to extract vector u(k) from the top p rows of the current-and-future input vector solution u, and MPC Controller 110 can deploy the current input vector u(k) at instant k as the input to Plant 105. MPC Controller 110 can utilize Row Selector 665 shown in FIG. 6 can be utilized to perform required row-extraction operations.

At the next sampling instant, MPC Controller 110 determines if the control process of Plant 105 is at an end, in step 540. If the control process is not at an end, MPC Controller 110 repeats steps 505-535.

Because of the presence of the second-integrator in the Model System 130 defined through equations (IV-3)-(IV-6), the MPC Technique IV utilized by MPC Controller 110 has the capability of tracking set-point sequences of a ramp type in a fashion that ensures zero offset. Furthermore, MPC Technique IV ensures the tracking of an arbitrary set-point sequence in a fashion that ensures zero offset, provided that the set-point sequence has a constant final value, and ensures attaining zero offset when an unmeasured output-disturbance or state-disturbance with final value is present.

One of skill in the art can recognize that the MPC Performance Index (IV-13) can be written in the form of MPC Performance Index (0-39a) by using the equivalent matrix-vector notation $$PI_{IV}(k) = (r-\hat{y})^T Q_a (r-\hat{y}) + u^T R_a u + z^T Z_a z + w^T Q_a w$$

where $W_a = \operatorname{diag}\{W, W, \ldots, W, W\}$.

An alternative embodiment of MPC Technique IV includes modifying step 520 to formulate an Augmented Incremental MPC Prediction System, and then modifying step 530 to solve the optimization operation with predictions that make use of the Augmented Incremental MPC Prediction System. In step 520 of such embodiment, MPC Controller 110 can utilize the following equations to define an Incremental MPC Prediction System 150:

$$\hat{x}(k+j) = (A+I)\hat{x}(k+j-1) - A\hat{x}(k+j-2) + B\Delta u(k+j-1) \qquad \text{(IV-16)}$$

$$z(k+j) = z(k+j-1) + r(k+j-1) - \hat{y}(k+j-1) \qquad \text{(IV-17)}$$

$$w(k+j) = w(k+j-1) + z(k+j-1) \qquad \text{(IV-18)}$$

$$\hat{y}(k+j) = C\hat{x}(k+j) + \hat{p}(k) \qquad \text{(IV-19)}$$

for $j=1, 2, \ldots, N_p$, where $\hat{y}(k) = y(k)$, and where $\Delta u(k+j) = 0$ for $j = N_c, N_c-1, \ldots, N_p-1$.

It will be obvious to one of skill in the art that the number of integral equations in the prediction model can be increased following the pattern described above. For example, a third-integral prediction equation of the form $v(k+j) = v(k+j-1) + w(k+j-1)$ can be appended to (IV-16)-(IV-19), where v(k) is the current third-integral-state vector.

In step 530, the Optimization System 160 of MPC Controller 110 determines the vector $\Delta u$ that minimizes the MPC Performance Index (IV-13) subject to the equations (IV-16)-(IV-19) of the Prediction System 150, and subject to the constraint restrictions given in the expression (IV-15). Vector $\Delta u(k)$ is obtained by utilizing Row Selector 665 to extract the top p rows of the current-and-future input-increment $\Delta u$, and then MPC Controller 110 can calculate the current input vector u(k) from the expression $u(k) = u(k-1) + \Delta u(k)$, and can deploy the current input vector u(k) at instant k as the input to the plant in step 535.

MPC Technique IV can ensure the tracking of an arbitrary set-point sequence in a fashion that ensures zero offset, provided that the set-point sequence has a constant final value or is of ramp type. In addition, MPC Technique VI can deliver complete disturbance rejection when measured or unmeasured state disturbances and/or output disturbances with constant final value are present. Furthermore, MPC Technique IV can deliver offset-free tracking of a parabolic set-point sequence, provided that the Prediction System 150 includes a third-integral-state equation.

In one exemplary embodiment of MPC Technique III utilized by MPC Controller 110, utilizes a Model System 130 that includes the third-integral-state equation $v(k+1) = v(k) + w(k)$, the MPC Performance Index adopts the form $$PI_{IV}(k) = (r-\hat{y})^T Q_a (r-\hat{y}) + u^T R_a u + z^T Z_a z + w^T W_a w + v^T V_a v \qquad \text{(IV-19a)}$$

and the following conditions are met: the system-model matrices A, B, and C are constant, the augmented quadratic weight matrices $Q_a$, $R_a$, $Z_a$, $W_a$, and $V_a$ are also constant, and the constraint set-condition (IV-15) is ignored thus defining an unconstrained predictive control operation. The Prediction System in this case is based on an incremental state equation and a standard input equation. Given that the constraints are not active in this case, the predicted future values of the state can be obtained by recursive substitution from state equations of the Prediction System 150 defined in (IV-7)-(IV-9), and combining the results with the output equations (IV-10) to yield the expressions $$\hat{y} = \left\{ \begin{array}{c} C_{II}^0 \hat{x}(k) + C_{II}\hat{x}(k-1) - \\ D_{II}\Delta_1 u(k-1) + E_{II}\hat{p}(k) \end{array} \right\} + D_{II}\Delta_0 u \quad \text{(IV-20)}$$

$$z = \{M_I[z(k) + r(k) - y(k)] + N_I r\} - N_I \hat{y} \quad \text{(IV-21)}$$

$$w = \{M_I[w(k) + z(k)]\} + N_I z \quad \text{(IV-22)}$$
$$= \left\{ \begin{array}{c} (N_I + I)M_I z(k) + M_I w(k) + \\ N_I M_I [r(k) - y(k)] + N_I^2 r \end{array} \right\} - N_I^2 \hat{y}$$

and $$v = \{M_I[v(k) + w(k)]\} + N_I w \quad \text{(IV-22b)}$$
$$= \left\{ \begin{array}{c} N_I(N_I+I)M_I z(k) + (N_I+I)M_I w(k) + \\ M_I v(k) + N_I^2 M_I [r(k) - y(k)] + N_I^3 r \end{array} \right\} - N_I^3 \hat{y}$$

respectively describing the future output vector $\hat{y}$, the future first-integral-state vector z, the future second-integral-state vector w, and the future third-integral-state vector v, where matrices bearing the subscript I are the MPC Structural Matrices defined in equations (0-40) through (0-43).

The MPC Performance Index (IV-13) is expressed in vector-matrix form, and the unconstrained optimization operation (IV-14) can be solved to obtain a current input vector described in the following Exemplary Analytical Control Policy for Unconstrained MPC Technique IVB:

$$u = k_{IV\Delta\text{-}1}^T [r - C_{II}^0 \hat{x}(k) - C_{II}\hat{x}(k-1) + D_{II}\Delta_1 u(k-1) - E_{II}\hat{p}(k)] + k_{IV\Delta\text{-}2}^T z(k) + k_{IV\Delta\text{-}3}^T w(k) + k_{IV\Delta\text{-}4}^T v(k) + k_{IV\Delta\text{-}5}^T [r(k) - y(k)] \quad \text{(IV-23)}$$

where the gain sub-matrices $k_{IV\Delta\text{-}1}^T$, $k_{IV\Delta\text{-}2}^T$, $k_{IV\Delta\text{-}3}^T$, $k_{IV\Delta\text{-}4}^T$, and $k_{IV\Delta\text{-}5}^T$ can be respectively extracted from the top p rows of the following gain matrices:

$$K_{IV\Delta\text{-}1} = K_{IV\Delta}\Delta_0^T D_{II}^T [Q_a + N_I^T Z_a N_I + (N_I^2)^T W_a N_I^2 + (N_I^3)^T V_a N_I^3] \quad \text{(IV-24)}$$

$$K_{IV\Delta\text{-}2} = K_{IV\Delta}\Delta_0^T D_{II}^T [N_I^T Z_a M_I + (N_I^2)^T W_a (N_I + I)M_I + (N_I^3)^T V_a N_I (N_I + I)M_I] \quad \text{(IV-25)}$$

$$K_{VI\Delta\text{-}3} = K_{IV\Delta}\Delta_0^T D_{II}^T [(N_I^2)^T W_a M_I + (N_I^3)^T V_a (N_I + I)M_I] \quad \text{(IV-26)}$$

$$K_{IV\Delta\text{-}4} = K_{IV\Delta}\Delta_0^T D_{II}^T (N_I^3)^T V_a M_I \quad \text{(IV-26a)}$$

$$K_{IV\Delta\text{-}5} = K_{IV\Delta}\Delta_0^T D_{II}^T [N_I^T Z_a M_I + (N_I^2)^T W_a N_I M_I + (N_I^3)^T V_a N_I^2 M_I] \quad \text{(IV-26b)}$$

where $$K_{IV\Delta} = \{\Delta_0^T D_{II}^T [Q_a + N_I^T Z_a N_I + (N_I^2)^T V_a N_I^2 + (N_I^3)^T V_a N_I^3] D_{II}\Delta_0 + R_a\}^{-1} \quad \text{(IV-26c)}$$

MPC Controller 110 can utilize Row Selector 665 to perform required row-extraction operations.

MPC Controller 110 determines the current input vector u(k) to Plant 105 at instant k and sends the current input vector u(k) to Plant 105, in step 435. MPC Controller 110 can determine the value of the current input vector u(k) utilizing the unconstrained analytical control policy (IV-23), and MPC Controller 110 can deploy u(k) at instant k as the input to the Plant 105.

The relationships $\hat{d}(k)=0$ and $\hat{p}(k)=0$ are adopted when the Estimation System 140 is not configured to produce estimates of the state and output disturbances, and when these zero identities are used in equation (IV-23), equation (IV-23) reduces to the following form that we denote as Exemplary Analytical Control Policy for Unconstrained MPC Technique IVA $$u = k_{IV\Delta\text{-}1}^T [r - C_{II}^0 \hat{x}(k) - C_{II}\hat{x}(k-1) + D_{II}\Delta_1 u(k-1)] + k_{IV\Delta\text{-}2}^T z(k) + k_{IV\Delta\text{-}3}^T w(k) + k_{IV\Delta\text{-}4}^T v(k) + k_{IV\Delta\text{-}5}^T [r(k) - y(k)] \quad \text{(IV-26d)}$$

The description of MPC Technique VI and its analytical variations MPC Technique IVA and MPC Technique IVB are exemplary embodiment of the disclosure, and are given in sufficient detail so that those skilled in the art can be enabled to practice this embodiment. It is understood that other embodiments can be utilized, and that changes can be made without departing from the scope of this disclosure. A non-exhaustive discussion of modified embodiments is given below to better illustrate the interpretation and implementation of MPC Technique IV in MPC Controller 110. In addition, the embodiments previously described in the context of MPC Techniques I, II, and III are also relevant to MPC Technique IV, and are herein incorporated in their entirety.

In an embodiment of Technique IV, the MPC Performance Index is of the form (IV-19a), the Prediction System 150 is based on a standard state equation and a standard output equation, and includes the prediction equation $$\hat{y} = \{C_I\hat{x}(k) + E_I\hat{p}(k) + F_I\hat{d}(k)\} + D_I u \quad \text{(IV-27)}$$

resulting in the analytical control policy for MPC Technique IV $$u = k_{IV\text{-}1}^T [r - C_I\hat{x}(k) - E_I\hat{p}(k) - F_I\hat{d}(k)] + k_{IV\text{-}2}^T z(k) + k_{IV\text{-}3}^T w(k) + k_{IV\text{-}4}^T v(k) + k_{IV\text{-}5}^T [r(k) - y(k)] \quad \text{(IV-28)}$$

where the gain sub-matrices $k_{IV\text{-}1}^T$, $k_{IV\text{-}2}^T$, $k_{IV\text{-}3}^T$, $k_{IV\text{-}4}^T$, and $k_{IV\text{-}5}^T$ can be respectively extracted from the top p rows of the following gain matrices:

$$K_{IV\text{-}1} = K_{IV} D_I^T [Q_a + N_I^T Z_a N_I + (N_I^2)^T W_a N_I^2 + (N_I^3)^T V_a N_I^3] \quad \text{(IV-28a)}$$

$$K_{IV\text{-}2} = K_{IV} D_I^T [N_I^T Z_a M_I + (N_I^2)^T W_a (N_I + I)M_I + (N_I^3)^T V_a N_I (N_I + I)M_I] \quad \text{(IV-28b)}$$

$$K_{IV\text{-}3} = K_{IV} D_I^T [(N_I^2)^T W_a M_I + (N_I^3)^T V_a (N_I + I)M_I] \quad \text{(IV-28c)}$$

$$K_{IV\text{-}4} = K_{IV} D_I^T (N_I^3)^T V_a M_I \quad \text{(IV-28d)}$$

$$K_{IV\text{-}5} = K_{IV} D_I^T [N_I^T Z_a M_I + (N_I^2)^T W_a N_I M_I + (N_I^3)^T V_a N_I^2 M_I] \quad \text{(IV-28e)}$$

where $$K_{IV} = \{D_I^T [Q_a + N_I^T Z_a N_I + (N_I^2)^T W_a N_I^2 + (N_I^3)^T V_a N_I^3] D_I + R_a\}^{-1} \quad \text{(IV-28f)}$$

MPC Controller 110 can utilize Row Selector 665 to perform required row-extraction operations.

In another embodiment of Technique IV, the MPC Performance Index is of the form (IV-19a), the Prediction System 150 is based the Prediction System 150 is based on a standard state equation and an integral output equation, and includes the prediction equation $$\hat{y} = \{E_I y(k) + (C_I - E_I C)\hat{x}(k) + F_I\hat{d}(k)\} + D_I u \quad \text{(IV-29)}$$

resulting in the analytical control policy for MPC Technique IV $$u = k_{IV\text{-}1}^T [r - E_I y(k) - (C_I - E_I C)\hat{x}(k) - F_I\hat{d}(k)] + k_{IV\text{-}2}^T z(k) + k_{IV\text{-}3}^T w(k) + k_{IV\text{-}4}^T v(k) + k_{IV\text{-}5}^T [r(k) - y(k)] \quad \text{(IV-30)}$$

where the gain sub-matrices $k_{IV\text{-}1}^T$, $k_{IV\text{-}2}^T$, $k_{IV\text{-}3}^T$, $k_{IV\text{-}4}^T$, and $k_{IV\text{-}5}^T$ can be respectively extracted from the top p rows of the gain matrices given in equations (IV-28a) to (IV-28e). MPC Controller 110 can utilize Row Selector 665 to perform required row-extraction operations.

In another embodiment of Technique IV, the MPC Performance Index is of the form (IV-19a), the Prediction System 150 is based on an incremental state equation and an incremental output equation, and includes the prediction equation $$\hat{y} = \{C_{II}[\hat{x}(k-1)] - D_{II}\Delta_1 u(k-1) + E_{II}y(k)\} + D_{II}\Delta_0 u \quad \text{(IV-34)}$$

resulting in the analytical control policy for MPC Technique IV $$u = k_{IV\Delta\text{-}1}^T[r - C_{II}[\hat{x}(k) - \hat{x}(k-1)] + D_{II}\Delta_1 u(k-1) - E_{II}y(k)] + k_{IV\Delta\text{-}2}^T z(k) + k_{IV\Delta\text{-}3}^T w(k) + k_{IV\Delta\text{-}4}^T v(k) + k_{IV\Delta\text{-}5}^T [r(k) - y(k)] \quad \text{(IV-35)}$$

where the gain sub-matrices $k_{IV\Delta\text{-}1}^T$, $k_{IV\Delta\text{-}2}^T$, $k_{IV\Delta\text{-}3}^T$, $k_{IV\Delta\text{-}4}^T$, and $k_{IV\Delta\text{-}5}^T$ from the top p rows of the gain matrices given in equations (IV-24) to (IV-26b).

Embodiments of MPC Technique IV that require estimation of states, state disturbances, and/or output disturbances can be realized through an adaptation of the Estimation-Systems schemes illustrated in an exemplary fashion for MPC Techniques I, II, and III in this disclosure.

EXAMPLES

Four examples are provided to illustrate the application of the MPC techniques disclosed in this invention.

Example 1

This example illustrates design steps and the performance of MPC Technique I. The Plant 105 considered is in this example the tank-reactor model investigated in Pannocchia, Gabriele and James B. Rawlings, "Disturbance Models for Offset-Free Model-Predictive Control", *AIChE Journal*, Vol. 49, No. 2, pp. 426-437, 2003, which has been used as a paradigm to illustrate the challenges that conventional MPC designs face when attempting to deliver offset free performance.

The Model System 130 for the tank-reactor is given by the equations $$x(k+1) = Ax(k) + Bu(k) + G_d d(k) \quad \text{(E1-1)}$$

$$y(k) = Cx(k) \quad \text{(E1-2)}$$

where $$A = \begin{bmatrix} 0.2511 & -3.368 \times 10^{-3} & -7.056 \times 10^{-4} \\ 11.06 & 0.3296 & -2.545 \\ 0 & 0 & 1 \end{bmatrix},$$

$$B = \begin{bmatrix} -5.426 \times 10^{-3} & 1.530 \times 10^{-5} \\ 1.297 & 0.1218 \\ 0 & -6.592 \times 10^{-2} \end{bmatrix} C = \begin{bmatrix} 1 & 0 & 0 \\ 0 & 1 & 0 \\ 0 & 0 & 1 \end{bmatrix},$$

$$G_d = \begin{bmatrix} -1.762 \times 10^{-5} \\ 7.784 \times 10^{-2} \\ 6.592 \times 10^{-2} \end{bmatrix}$$

and where the elements of the state vector x(k) are the reactant concentration $x_1(k)$, the reactor temperature $x_2(k)$, and the liquid level $x_3(k)$. The elements of the current input vector u(k) are the coolant temperature, $u_1$, and feed flow rate $u_2$; and d(k) is an unmeasured state disturbance representing a variation in the inlet flow rate. The problem statement indicates that all three elements of the output vector y(k) are measured; however, the process description indicates that only the components of the controlled vector $y_c(k)$ with components $y_{c1}$ and $y_{c2}$, defined through the relationship $$y_c(k) = Ex(k) \quad \text{(E1-3)}$$

are required to track a set-point trajectory with zero offset, where $$E = \begin{bmatrix} 1 & 0 & 0 \\ 0 & 0 & 1 \end{bmatrix} \quad \text{(E1-4)}$$

We illustrate the application of MPC Technique I for the design of an offset-free controller. Step 210 includes constructing an Augmented Model System 130 by adding the integral-state equation $$z(k+1) = z(k) + r(k) - Ey(k) \quad \text{(E1-5)}$$

to equations (E1-1) and (E1-2), where r(k) is the vector of set-point signals that must be tracked.

Step 215 is executed by creating an Estimation System 140, which produces a measured state-estimate $\hat{x}(k)$. This is accomplished by recognizing that since $y_1(k)$, $y_2(k)$, and $y_3(k)$ are measured, they can be denoted as $\hat{y}_1(k)$, $\hat{y}_2(k)$, and $\hat{y}_3(k)$, respectively, and then using equation (E1-2) to establish that $\hat{x}_1(k) = \hat{y}_1(k)$, $\hat{x}_2(k) = \hat{y}_2(k)$, and $\hat{x}_3(k) = \hat{y}_3(k)$.

Step 220 is executed by creating a Prediction System 150 comprised of equations (I-5)-(I-7) to produce the required future-values of values $\hat{y}(k+j)$ and $z(k+j)$. Note that the Prediction System 150 used in this embodiment of MPC Technique I does not make use of the disturbance d(k), or of its current estimate $\hat{d}(k)$, or of the disturbance matrix $G_d$. Then step 225 is executed by introducing the MPC Performance Index $$PI_I(k) = \sum_{j=1}^{N_p} [r(k+j) - E\hat{y}(k+j)]^T Q [r(k+j) - E\hat{y}(k+j)] + \sum_{j=0}^{N_p-1} u(k+j)^T R u(k+j) + \sum_{j=1}^{N_p} z(k+j)^T Z z(k+j) \quad \text{(E1-6)}$$

The prediction and control horizons are set as $N_p = 12$ and $N_c = 3$, respectively, and the cost weighting matrices are specified as $$Q = \begin{bmatrix} 10 & 0 \\ 0 & 1 \end{bmatrix}, R = \begin{bmatrix} 0.5 & 0 \\ 0 & 0.5 \end{bmatrix}, \text{ and } Z = \begin{bmatrix} 10 & 0 \\ 0 & 1 \end{bmatrix} \quad \text{(E1-7)}$$

Under conditions of unconstrained control the minimization of the MPC Performance Index (E1-5) yields the control policy for MPC Technique I $$u(k) = (k_I^T + k_z^T N_I)[r - E_a C_I \hat{x}(k)] + k_z^T M_I[z(k) + r(k) - Ey(k)] \quad \text{(E1-8)}$$

which is formally analogous to (I-23), where $$E_a = \text{diag}(E, E, \ldots, E) \quad \text{(E1-9)}$$

where the entries of the matrices $C_I$ (of dimensions 36×3), $M_I$ (24×2), and $N_I$ (24×24) are computed as indicated in (0-40) and (0-43), and where the gain submatrices $k_I^T$ and $k_z^T$, each comprised of 2 rows and 24 columns, are the first two rows of the matrices given in (I-24) and (I-25).

For the purposes of establishing a base-line for comparison, this example introduces a conventional the MPC design, as proposed in prior art, by defining $$S = \begin{bmatrix} 0 & 0 \\ 0 & 0 \end{bmatrix} \quad (E1\text{-}11)$$

in the MPC Performance Index (E1-6), and determines the variables required to construct the MPC Performance Index (E1-6) using the prediction system $$\hat{x}(k+j)=A\hat{x}(k+j-1)+Bu(k+j-1)+G_d\hat{d}(k)$$

$$\hat{y}(k+j)=C\hat{x}(k+j) \quad (E1\text{-}12)$$

In contrast to MPC Technique I, which does not require the use of a state estimator to ensure offset-free behavior, conventional MPC designs typically involve a state estimator so that the predictions yielded by (E1-12) account for the effect of the unmeasured disturbance (which is assumed to be constant or asymptotically constant). Failure to include such disturbance estimates often leads conventional MPC designs to experience even greater steady-state offset behavior. This example uses the conventional estimation scheme $$\hat{x}(k+1)=A\hat{x}(k)+Bu(k)+G_d\hat{d}(k)+L_x[y(k)-C\hat{x}(k)]$$

$$\hat{d}(k+1)=\hat{d}(k)+L_d[y(k)-C\hat{x}(k)] \quad (E1\text{-}13)$$

where $L_x$=diag(0.3, 0.3, 0.3) and $L_d$=diag(0.1, 0.1, 0.1).

Figure 10:
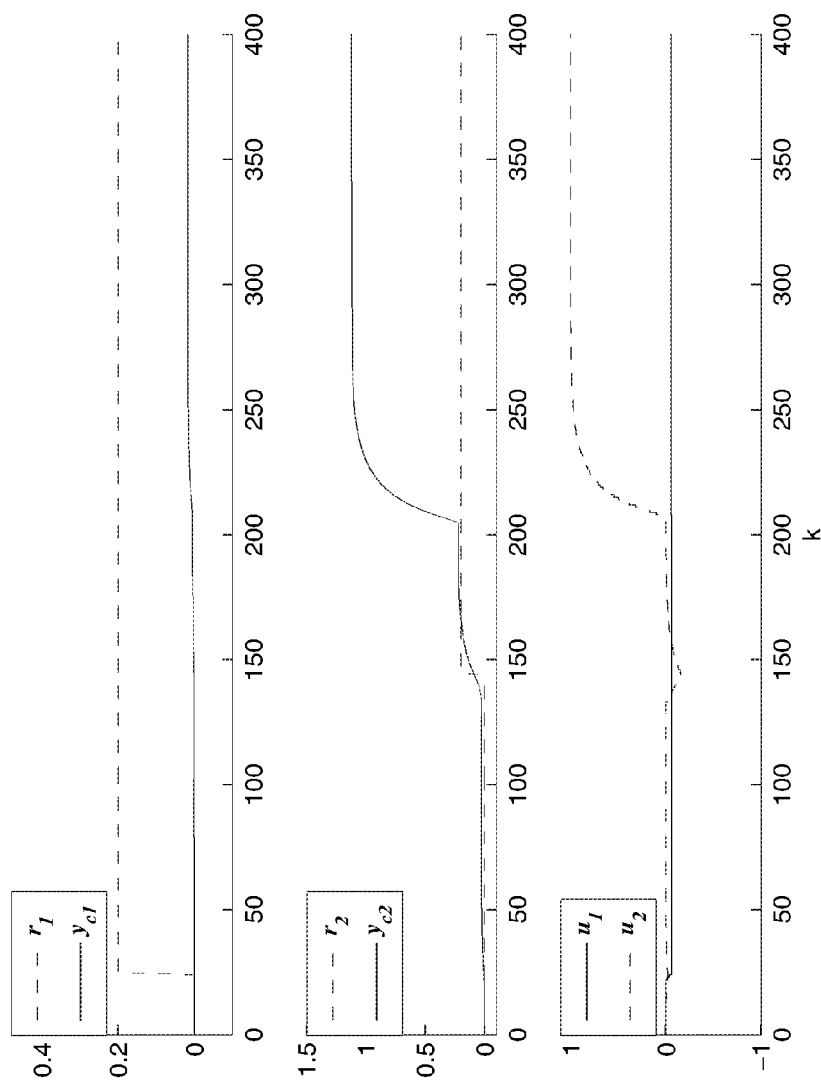
FIG. 10 illustrates the control of a chemical reactor subject to step changes in set-point in the presence of a step disturbance, demonstrating the prior art, where an MPC controller designed using a conventional technique demonstrates poor performance, characterized by an offset with respect to the set points, and by its inability to reject the effects of an injected disturbance.

FIG. 10 shows the response of the controlled outputs $y_{c1}$ and $y_{c2}$ of the Plant (E1-1)-(E1-2) when using the conventional MPC strategy that results by adopting a zero value for the S matrix, as indicated in (E1-11). Step changes in set point are introduced for of the controlled outputs, and a constant disturbance d(k)=1 is injected at sampling instant k=205; prior to that instant the disturbance value is zero. FIG. 10 confirms that the conventional MPC controller performs poorly as a set-point tracking and as a disturbance-rejection scheme. Note that the first output develops significant offset, and an undesirable amount of offset is still prominent long after instant k=205 corresponding to the instant when the disturbance enters the plant. The second controlled output does not experience offset with respect to the first constant value of the set-point trajectory because the reactor model includes an integrator, and hence the conventional MPC design's failure to introduce an integrator in the controller is compensated by the fact that the plant itself contains an integrator. Note, however, that the presence of a plant integrator does not assist the conventional MPC controller to effectively reject the effect of the disturbance injection, leading to an undesirable offset effect.

Figure 11:
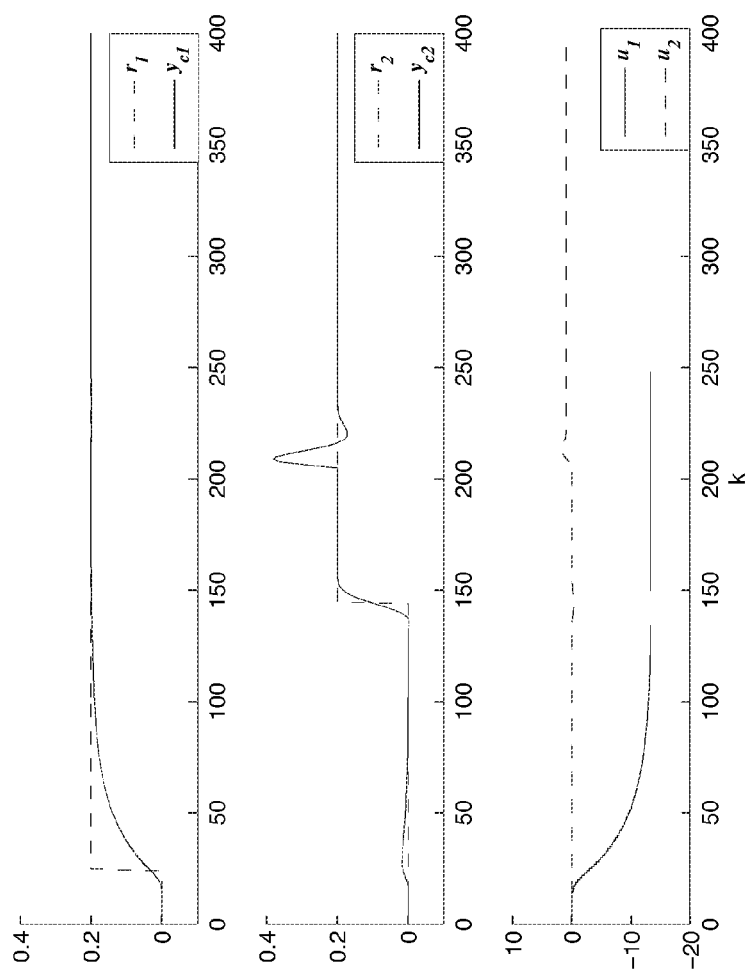
FIG. 11 illustrates the control of a chemical reactor subjected to step changes in set point in the presence of a step disturbance, demonstrating the superior offset-free set-point tracking and disturbance-rejection performance of MPC Technique I.

FIG. 11 shows the response of the controlled outputs $y_{c1}$ and $y_{c2}$ the same Plant (E1-1)-(E1-2) when using the MPC controller (E1-8) designed according to MPC Technique I. The cost weighting matrices and horizons remain the same as in the conventional MPC case, except for the integral cost weight matrix S, which adopts the form given in (E1-7). The figure demonstrates that the MPC Technique I of this invention delivers excellent performance. It effectively eliminates offset from each of the tracked outputs, and after only a brief transient it also achieves the complete rejection of the effect of the disturbance injected at k=205, leading to the prompt attainment of perfect tracking with zero offset.

Example 2

This example illustrates design steps and the performance of MPC Technique II. This example uses the tank-reactor Plant presented in Example 1, also subject to the injection of the same unmeasured state disturbance at instant k=205. The prediction and control horizons are set as $N_p$=12 and $N_c$=3, respectively, the MPC Performance Index is $$PI_{II}(k) = \sum_{j=1}^{N_p} [r(k+j) - E\hat{y}(k+j)]^T Q[r(k+j) - E\hat{y}(k+j)] + \quad (E2\text{-}1)$$

$$\sum_{j=0}^{N_c} \Delta u(k+j)^T T \Delta u(k+j)$$

and the cost weighting matrices are specified as $$Q = \begin{bmatrix} 10 & 0 \\ 0 & 1 \end{bmatrix} \text{ and } T = \begin{bmatrix} 0.5 & 0 \\ 0 & 0.5 \end{bmatrix} \quad (E2\text{-}2)$$

State estimation is accomplished via the Incremental MPC Estimation System comprised of the equation $$\hat{x}(k+1)=(A+I)\hat{x}(k)-A\hat{x}(k-1)+B\Delta u(k)+L_{IMES}[y(k)-y(k-1)-C\hat{x}(k)+C\hat{x}(k-1)] \quad (E2\text{-}3)$$

where $$L_{IMES}=\text{diag}(0.3, 0.3, 0.3) \quad (E2\text{-}4)$$

and the Incremental MPC Prediction System is comprised of the equations $$\hat{x}(k+j)=(A+I)\hat{x}(k+j-1)-A\hat{x}(k+j-2)+B\Delta u(k+j-1)$$

$$\hat{y}(k+j)=y(k+j-1)+C\hat{x}(k+j)-C\hat{x}(k+j-1) \quad (E2\text{-}5)$$

Under conditions of unconstrained control the minimization of the MPC Performance Index (E2-1) yields the control policy for MPC Technique II $$u(k)=u(k-1)+k_{II}^T[r-E_aC_{II}(\hat{x}(k)-\hat{x}(k-1)-E_{II}Ey(k)] \quad (E2\text{-}6)$$

which is formally analogous to (II-22), where the entries of the matrices $C_{II}$ (of dimensions 36×36) and $E_{II}$ (24×2) are computed as indicated in (0-45) and (0-47).

Figure 12:
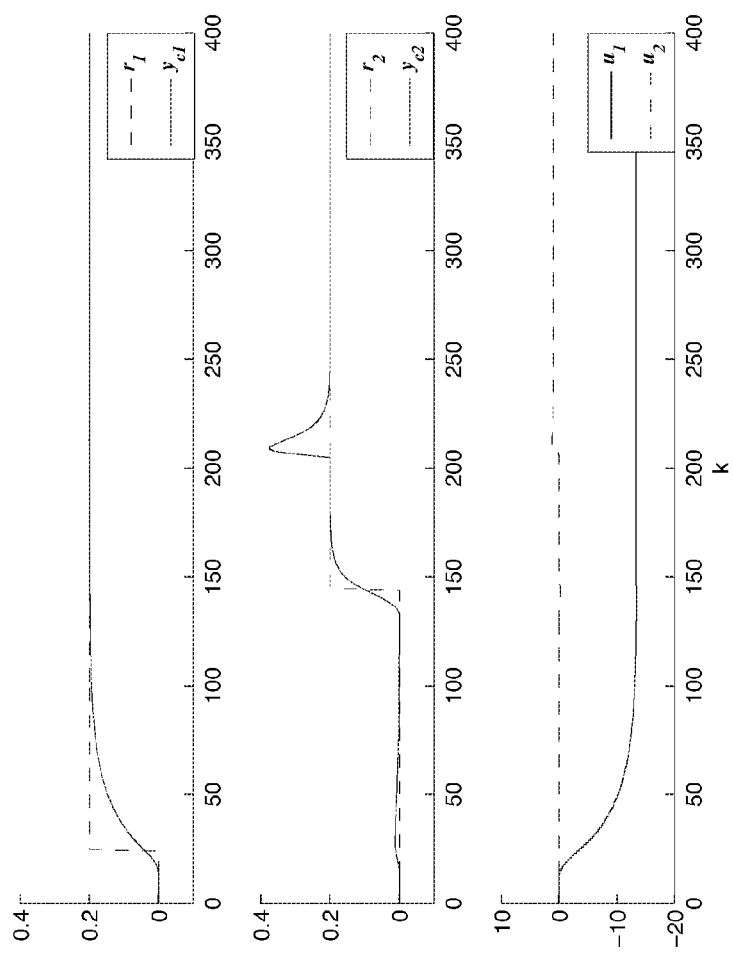
FIG. 12 illustrates the control of a chemical reactor subjected to step changes in set point in the presence of a step disturbance, demonstrating the superior offset-free set-point tracking and disturbance-rejection performance of MPC Technique II.

FIG. 12 shows the responses of the controlled outputs $y_{c1}$ and $y_{c2}$ of the Plant when using the MPC controller (E2-6) according to MPC Technique II. Step changes in set point are introduced for of the controlled outputs, and a constant disturbance d(k)=1 is injected at sampling instant k=205; prior to that instant the disturbance is zero. Note that the responses demonstrate that MPC Technique II effectively eliminates offset from each of the tracked outputs. Furthermore, the figure also demonstrates that MPC Technique II also realize the effective rejection of the effect of the disturbance injected at instant k=205 leading to a prompt achievement of perfect tracking with zero offset.

Example 3

This example illustrates design steps and the performance of MPC Technique III. The Plant 105 considered is investigated in example #4 of the paper by Muske, K. R., and J. B. Rawlings, "Model Predictive Control with Linear Models," AIChE J., 39, 262(1993), which has been used as a sample Model System to illustrate the challenges that conventional MPC designs face when attempting to deliver offset free performance in the context of multiple-input/multiple-output plants.

The Model System 130 for this example is given by the equations $$x(k+1)=Ax(k)+Bu(k)+G_d d(k) \quad (E3\text{-}1)$$

$$y(k)=Cx(k) \quad (E3\text{-}2)$$

where d(k) is a scalar state perturbation, and where $$A = \begin{bmatrix} 0.5 & 0 & 0 & 0 \\ 0 & 0.6 & 0 & 0 \\ 0 & 0 & 0.5 & 0 \\ 0 & 0 & 0 & 0.6 \end{bmatrix}, B = \begin{bmatrix} 0.5 & 0 \\ 0 & 0.4 \\ 0.25 & 0 \\ 0 & 0.6 \end{bmatrix} \quad (E3\text{-}3)$$

$$C = \begin{bmatrix} 1 & 1 & 0 & 0 \\ 0 & 0 & 1 & 1 \end{bmatrix}, G_d = \begin{bmatrix} 1 & 0 & 0 \\ 0 & 1 & 0 \\ 0 & 0 & 1 \end{bmatrix} \quad (E3\text{-}4)$$

We illustrate the application of MPC Technique III for the design of an offset-free controller. Step 410 includes constructing an Augmented Model System 130 consisting of an incremental state equation, an integral-state equation, and a standard output equation, respectively of the form $$x(k+1)=(A+I)x(k)-A\hat{x}(k-1)+B\Delta u(k)$$

$$z(k+1)=z(k)+r(k)-y(k)$$

$$y(k)=Cx(k) \quad (E3\text{-}5)$$

Then, step 415 is executed by creating the Incremental MPC Estimation System 140 of the form $$\hat{x}(k+1)=(A+I)\hat{x}(k)-A\hat{x}(k-1)+B\Delta u(k)+L_{IMES}\epsilon(k) \quad (E3\text{-}6)$$

where $$\epsilon(k)=y(k)-y(k-1)-C\hat{x}(k)+C\hat{x}(k-1) \quad (E3\text{-}7)$$

and where we specify $$L_{IMES}=\text{diag}(0.2, 0.2, 0.2\ 0.2) \quad (E3\text{-}8)$$

Step 420 is executed by creating a Prediction System 150 comprised of equations $$\hat{x}(k+j)=(A+I)\hat{x}(k+j-1)-A\hat{x}(k-2)+B\Delta u(k+j-1)$$

$$z(k+j)=z(k+j-1)+r(k+j-1)-\hat{y}(k+j-1) \quad (E3\text{-}9)$$

$$\hat{y}(k+j)=C\hat{x}(k+j) \quad (E3\text{-}9)$$

and step 425 is executed by introducing the MPC Performance Index $$PI_{III}(k) = \sum_{j=1}^{N_p} [r(k+j) - \hat{y}(k+j)]^T Q[r(k+j) - \hat{y}(k+j)] + \quad (E3\text{-}10)$$

$$\sum_{j=0}^{N_c} \Delta u(k+j)^T T \Delta u(k+j) + \sum_{j=1}^{N_p} z(k+j)^T Z z(k+j)$$

The prediction and control horizons are set as $N_p=5$ and $N_c=4$, respectively, and the cost weighting matrices are specified as $$Q = \begin{bmatrix} 0.5 & 0 \\ 0 & 0.5 \end{bmatrix}, T = \begin{bmatrix} 1 & 0 \\ 0 & 1 \end{bmatrix}, \text{ and } Z = \begin{bmatrix} 0.5 & 0 \\ 0 & 0.3 \end{bmatrix} \quad (E3\text{-}11)$$

Under conditions of unconstrained control the minimization of the MPC Performance Index (E3-7) yields the control policy for MPC Technique III $$u=k_{III\Delta\text{-}1}^T[r-C_{II}^0\hat{x}(k-1)+D_{II}\Delta_1 u(k-1)]+k_{III\Delta\text{-}2}^T u(k-1)+ \\ k_{III\Delta\text{-}3}^T z(k)+k_{III\Delta\text{-}3}^T[r(k)-y(k)] \quad (E3\text{-}12)$$

which is analogous to (III-13) (after recognizing that in this example p(k) =0), where the entries of the matrices $C_{II}^0$ (of dimensions 10×4), $C_{II}$ (10×4), $E_I$ (10×2), $N_I$ (10×10) and $M_I$ (10×2) are computed as indicated in (0-44), (0-45), (0-42), and (0-43), respectively.

Figure 13:
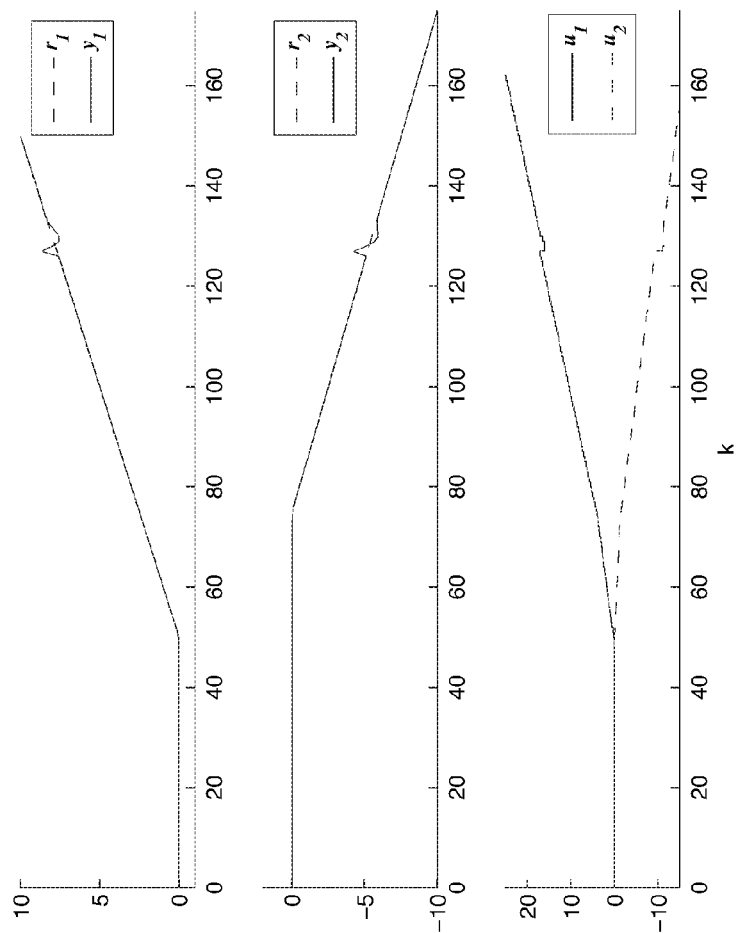
FIG. 13 illustrates the control of a multiple-input/multiple-output plant subjected to ramp changes in set point in the presence of a step disturbance, illustrating the superior offset-free set-point tracking and disturbance-rejection performance of MPC Technique III.

FIG. 13 shows the responses of the controlled outputs $y_1$ and $y_2$ of the plant when using the MPC controller (E3-12) according to MPC Technique III. The specified set-point trajectory includes an initial constant value followed by a ramp of constant slope. Step changes in set point are introduced for of the controlled outputs, and a constant disturbance d(k)=1 is injected at sampling instant k=125; prior to that instant the disturbance is zero. The figure demonstrates that MPC Technique III effectively eliminates offset from each of the tracked outputs, realizing trajectories that follow the set points with no error except for unavoidable initial transients when the set points change in value. In addition, the figure also demonstrates that MPC Technique III also effectively rejects the effect of the disturbance injected at instant k=125, quickly returning the outputs to the target ramp after the onset of the disturbance.

Example 4

This example illustrates design steps and the performance of MPC Technique IV. This example uses the Plant presented in Example 3, also subject to the injection of the same unmeasured state disturbance at instant k=125.

We illustrate the application of MPC Technique IV for the design of an offset-free controller. Step 510 involves the definition of an Augmented Model System 130 consisting of a standard state equation, and integral-state equation, a double-integral state equation, and a standard output equation, respectively of the form $$x(k+1)=Ax(k-1)+Bu(k-1)+G_d d(k)$$

$$z(k+1)=z(k)+r(k)-y(k)$$

$$w(k+1)=w(k)+z(k)$$

$$y(k)=Cx(k) \quad (E4\text{-}1)$$

State estimation in step 515 is carried out as in the case of Example 3, using the Incremental MPC State Estimator System 140 defined in (E3-6)-(E3-8), and step 520 is executed adopting a Prediction System 150 is comprised of the equations $$\hat{x}(k+j)=A\hat{x}(k+j-1)+Bu(k+j-1)$$

$$z(k+j)=z(k+j-1)+r(k+j-1)-\hat{y}(k+j-1)$$

$$w(k+j)=w(k+j-1)+z(k+j-1)$$

$$\hat{y}(k+j)=C\hat{x}(k+j) \quad (E4\text{-}4)$$

Note that in the prediction scheme (E4-4) we deliberately set $\hat{d}(k)=0$, even though the state-disturbance vector is d(k) actually nonzero. The purpose of this design choice is to illustrate the fact that MPC Technique VI, as well as the other techniques disclosed in this document, can deliver offset-free control even when the MPC controller design is carried out under the incorrect assumption that no disturbances are present.

Step 525 is executed by introducing the MPC Performance Index $$PI_{IV}(k) = \sum_{j=1}^{N_p} [r(k+j) - \hat{y}(k+j)]^T Q[r(k+j) - \hat{y}(k+j)] + \qquad (E4\text{-}5)$$

$$\sum_{j=1}^{N_p} u(k+j)^T Ru(k+j) +$$

$$\sum_{j=1}^{N_p} z(k+j)^T Zz(k+j) + \sum_{j=1}^{N_p} w(k+j)^T Ww(k+j)$$

The prediction and control horizons are set as $N_p=5$ and $N_c=4$, respectively, and the cost weighting matrices are specified as $$Q = \begin{bmatrix} 1 & 0 \\ 0 & 1 \end{bmatrix}, R = \begin{bmatrix} 0.5 & 0 \\ 0 & 0.5 \end{bmatrix}, Z = \begin{bmatrix} 1 & 0 \\ 0 & 1 \end{bmatrix}, \text{ and } W = \begin{bmatrix} 0.5 & 0 \\ 0 & 0.5 \end{bmatrix} \qquad (E4\text{-}6)$$

Under conditions of unconstrained control the minimization of the MPC Performance Index (E4-5) yields the control policy for MPC Technique IV $$u = k_{IV\text{-}1}^T[r - C_I\hat{x}(k)] + k_{IV\text{-}2}^T z(k) + k_{IV\text{-}3}^T w(k) + k_{IV\text{-}4}^T v(k) + k_{IV\text{-}5}^T[r(k) - y(k)] \qquad (E4\text{-}7)$$

which is analogous to (IV-28) (after recognizing that in this example $\hat{p}=0$ and that we arbitrarily specified that $\hat{d}(k)=0$ for control-design purposes), where the entries of the matrices $C_I$ (of dimensions 10×4), $M_I$ (10×2), and $N_I$ (10×10) are computed as indicated in (0-40).

Figure 14:
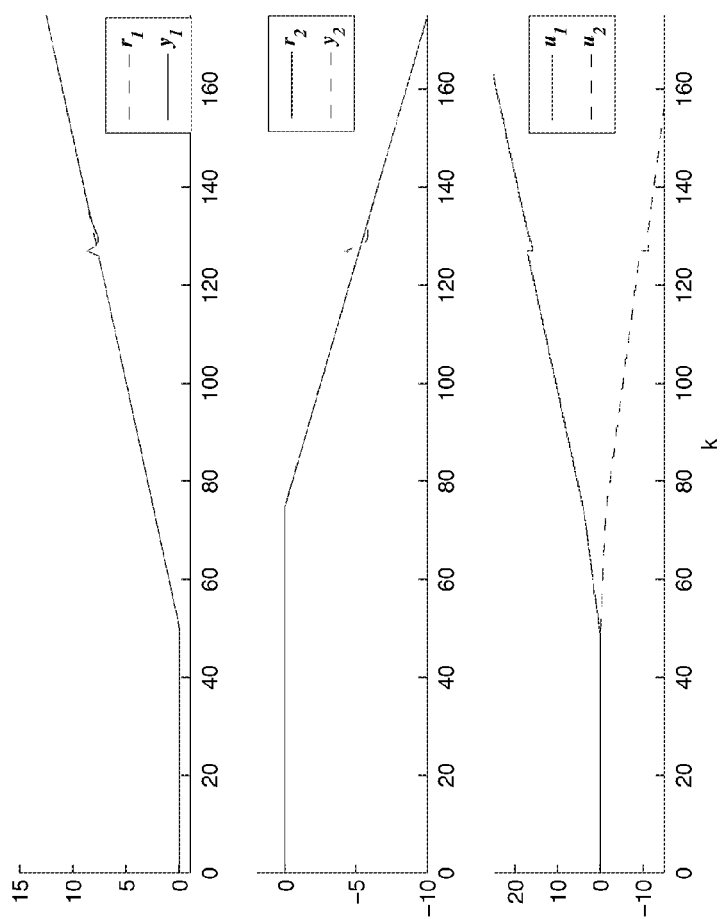
FIG. 14 illustrates the control of a multiple-input/multiple-output plant subjected to ramp changes in set point in the presence of a step disturbance, illustrating the superior offset-free set-point tracking and disturbance-rejection performance of MPC Technique IV.

FIG. 14 shows the responses of the controlled outputs $y_1$ and $y_2$ of the Plant when using the MPC controller (E4-7) according to MPC Technique IV. The specified set-point trajectory includes an initial constant value followed by a ramp of constant slope. Step changes in set point are introduced for of the controlled outputs, and a constant disturbance $d(k)=1$ is injected at sampling instant k=125; prior to that instant the disturbance is zero. The figure demonstrates that the MPC Technique IV is able to deliver offset-free set-point tracking, and to effect a complete disturbance rejection.

Other embodiments will be apparent to those skilled in the art from consideration of the specification and practice of the examples disclosed herein. It is intended that the specification and examples be considered as exemplary only, with a true scope and spirit of the invention being indicated by the following claims.

What is claimed is:

1. A method for real-time electronic control of a plant, the method comprising:
    obtaining output signals representing parameter values of the plant;
    determining, by an MPC controller, an integral-state vector based at least in part on the output signals and set point values associated with the output signals;
    determining, by the MPC controller with a prediction model, a future output value and a future state value of the plant based at least in part on the output signals, a current state vector of the plant, and the integral-state vector, the prediction model including an integral-state equation; and
    generating, by the MPC controller, a plant control signal based at least in part on a performance index associated with the prediction model, the performance index including an integral-state cost term, wherein the determined plant control signal corresponds to a minimum value of the performance index.

2. The method of claim 1, wherein the determined plant control signal corresponds to the minimum performance index subject to a constraint set.

3. The method of claim 1, further comprising transmitting the plant control signal to the plant.

4. The method of claim 1, wherein the prediction model further includes at least one disturbance term.

5. The method of claim 1, wherein the integral-state cost term includes an integral-state weight matrix that is nonzero.

6. The method of claim 5, wherein the prediction model further includes:
    a standard state equation; and
    an output equation chosen from a standard output equation, an incremental output equation, and a nonlinear output equation.

7. The method of claim 5, wherein the prediction model further includes:
    an incremental-state equation; and
    an output equation chosen from a standard output equation, an incremental output equation, and a nonlinear output equation.

8. The method of claim 5, wherein the prediction model further includes a nonlinear state equation and a nonlinear output equation.

9. The method of claim 5, wherein the performance index further includes:
    a tracking-error cost term including a tracking-error weight matrix that is nonzero; and
    an input cost term including an input weight matrix that is nonzero.

10. The method of claim 5, wherein the integral-state cost term includes a plurality of integral-state weight matrices, at least one of the plurality of integral-state weight matrices being nonzero.

11. The method of claim 1, wherein the prediction model further includes an incremental-state equation and the performance index further includes an input-increment cost term.

12. The method of claim 1, wherein the prediction model further includes a double-integral-state equation and the performance index further includes a double-integral-state cost term.

13. The method of claim 1, further comprising determining a plurality of future output values and a plurality of future state values of the plant based at least in part on a control horizon and a prediction horizon.

14. The method of claim 1, wherein the plant is an apparatus.

15. A system for controlling a process of a plant, the system comprising:
    a plurality of measurement devices, each measurement device configured to measure a process variable and provide an electronic output signal representing the process variable;
    a processor coupled to the measurement devices and configured to:
        obtain the electronic signal from each measurement device,
        receive one or more set points values associated with the electronic output signals, and
        provide a plurality of process control signals for controlling the process; and
    a storage coupled to the processor and configured to store software instructions and data; wherein the storage contains a sequence of software instructions that, when executed by the processor, cause the processor to perform the steps including:
- determining an integral-state vector based at least in part on the electronic output signals and the set point values,
- determining, with a prediction model, a future output value and a future state value of the plant based at least in part on the electronic output signals, a current state vector of the plant, and the integral-state vector, the prediction model including an integral-state equation, and
- generating the plurality of process control signals based at least in part on a performance index associated with the prediction model, the performance index including an integral-state cost term, wherein the determined process control signals correspond to a minimum performance index.

16. The system of claim 15, wherein the determined process control signals correspond to the minimum performance index subject to a constraint set.

17. The system of claim 15, wherein the processor further comprises a plurality of outputs configured to provide the plurality of process control signals to a plurality of plant actuators associated with the process.

18. The system of claim 17, further comprising the plurality of plant actuators associated with the process, each plant actuator configured to receive at least one of the plurality of process control signals.

19. A method for real-time electronic control of a plant, the method comprising:
- obtaining output signals representing parameter values of the plant;
- determining, by an MPC controller, a current-state vector of the plant based at least in part on the output signals;
- determining, by the MPC controller with a prediction model, a future output value and a future state value of the plant based at least in part on the output signals and the current state vector, the prediction model including an incremental-state equation; and
- generating, by the MPC controller, a plant control signal based at least in part on a performance index associated with the prediction model, the performance index including an input-increment cost term, wherein the determined plant control signal corresponds to a minimum value of the performance index.

20. The method of claim 19, wherein the determined plant control signal corresponds to the minimum performance index subject to a constraint set.

21. The method of claim 19 wherein the input-increment cost term includes an input-increment weight matrix that is nonzero.

22. The method of claim 19, wherein the prediction model further includes an integral-state equation and the performance index further includes an integral-state cost term.

23. The method of claim 19, wherein the prediction model further includes an output equation chosen from a standard output equation, an incremental output equation, and a nonlinear output equation.

24. A system for controlling a process of a plant, the system comprising:
- a plurality of measurement devices, each measurement device configured to measure a process variable and provide an electronic output signal representing the process variable;
- a processor coupled to the measurement devices and configured to:
  - obtain the electronic signal from each measurement device,
  - receive one or more set points values associated with the electronic output signals, and
  - provide a plurality of process control signals for controlling the process; and
- a storage coupled to the processor and configured to store software instructions and data; wherein the storage contains a sequence of software instructions that, when executed by the processor, cause the processor to perform the steps including:
  - determining a current-state vector of the plant based at least in part on the electronic output signals,
  - determining, with a prediction model, a future output value and a future state value of the plant based at least in part on the electronic output signals and the current state vector, the prediction model including an incremental-state equation, and
  - generating the plurality of process control signals based at least in part on a performance index associated with the prediction model, the performance index including an input-increment cost term, wherein the determined plant control signals correspond to a minimum performance index.

25. The system of claim 24, wherein the determined process control signals correspond to the minimum performance index subject to a constraint set.

* * * * *